US012474534B2

(12) United States Patent
Geens et al.

(10) Patent No.: US 12,474,534 B2
(45) Date of Patent: Nov. 18, 2025

(54) FIBER OPTIC ENCLOSURE WITH ABILITY TO CUSTOMIZE AND/OR UPGRADE

(71) Applicant: COMMSCOPE TECHNOLOGIES LLC, Hickory, NC (US)

(72) Inventors: Johan Geens, Bunsbeek (BE); Kristof Vastmans, Kessel-Lo (BE); Bart Vos, Geel (BE); Barry Wayne Allen, Siler City, NC (US); Pieter Vermeulen, Westerlo (BE)

(73) Assignee: Commscope Technologies LLC, Hickory, NC (US)

( * ) Notice: Subject to any disclaimer, the term of this patent is extended or adjusted under 35 U.S.C. 154(b) by 124 days.

(21) Appl. No.: 17/920,324

(22) PCT Filed: Apr. 20, 2021

(86) PCT No.: PCT/US2021/028222
§ 371 (c)(1),
(2) Date: Oct. 20, 2022

(87) PCT Pub. No.: WO2021/216594
PCT Pub. Date: Oct. 28, 2021

(65) Prior Publication Data
US 2023/0194815 A1 Jun. 22, 2023

Related U.S. Application Data

(60) Provisional application No. 63/012,743, filed on Apr. 20, 2020, provisional application No. 63/012,689, (Continued)

(51) Int. Cl.
G02B 6/44 (2006.01)
(52) U.S. Cl.
CPC .................. G02B 6/4444 (2013.01)

(58) Field of Classification Search
CPC ... G02B 6/4446; G02B 6/4444; H02G 15/013
See application file for complete search history.

(56) References Cited

U.S. PATENT DOCUMENTS 5,235,134 A  8/1993  Jaycox
6,046,406 A  4/2000  Milanowski et al.
(Continued)

FOREIGN PATENT DOCUMENTS

EP  0 442 941 B1  1/1995
EP  0 587 616 B1  7/1996
(Continued)

OTHER PUBLICATIONS

Extended European Search Report for Application No. 21792292.1 mailed May 3, 2024.
(Continued)

Primary Examiner — Eric Wong
(74) Attorney, Agent, or Firm — MERCHANT & GOULD P.C.

(57) ABSTRACT

Certain aspects of the present disclosure relate to a telecommunication enclosure having a configuration that can be readily customized in the factory to satisfy customer specifications and can also be readily upgraded in the field. In certain examples, the telecommunication enclosure includes a main housing defining a plurality access ports. A plurality of different add-on components can selectively be coupled to the main housing at the access ports in sealed relation to the main housing. The add-on components can include visual indicators which are visible from outside the main housing when the add-on components are mounted to the main housing.

17 Claims, 41 Drawing Sheets

Related U.S. Application Data filed on Apr. 20, 2020, provisional application No. 63/012,767, filed on Apr. 20, 2020, provisional application No. 63/012,776, filed on Apr. 20, 2020.

(56) References Cited

U.S. PATENT DOCUMENTS

| | | |
|---|---|---|
| 7,264,402 B2 | 9/2007 | Theuerkorn et al. |
| 7,568,844 B2 | 8/2009 | Luther et al. |
| 7,744,288 B2 | 6/2010 | Lu et al. |
| 9,122,021 B2 | 9/2015 | Elenbaas et al. |
| 9,557,493 B2 | 1/2017 | Wu et al. |
| 10,502,920 B2 | 12/2019 | Coenegracht et al. |
| 11,169,350 B2 | 11/2021 | Coenegracht et al. |
| 11,300,745 B2 * | 4/2022 | Aznag ............... G02B 6/44775 |
| 2013/0077928 A1 | 3/2013 | Hsing |
| 2014/0226945 A1 | 8/2014 | Claessens et al. |
| 2015/0168664 A1 * | 6/2015 | Coenegracht ........ H02G 15/013 385/135 |

FOREIGN PATENT DOCUMENTS

| | | |
|---|---|---|
| WO | 2013/174992 A1 | 11/2013 |
| WO | 2018/192917 A1 | 10/2018 |
| WO | 2019/241230 A1 | 12/2019 |

OTHER PUBLICATIONS

International Search Report and Written Opinion of the International Searching Authority for International Patent Application No. PCT/US2021/028222 mailed Aug. 13, 2021, 8 pages.

* cited by examiner

FIBER OPTIC ENCLOSURE WITH ABILITY TO CUSTOMIZE AND/OR UPGRADE

CROSS-REFERENCE TO RELATED APPLICATIONS

This application is a National Stage Application of PCT/US2021/028222, filed on Apr. 20, 2021, which claims the benefit of U.S. Patent Application Ser. No. 63/012,689, filed on Apr. 20, 2020, and claims the benefit of U.S. Patent Application Ser. No. 63/012,767, filed on Apr. 20, 2020, and claims the benefit of U.S. Patent Application Ser. No. 63/012,776, filed on Apr. 20, 2020, and claims the benefit of U.S. Patent Application Ser. No. 63/012,743, filed on Apr. 20, 2020, the disclosures of which are incorporated herein by reference in their entireties. To the extent appropriate, a claim of priority to made to the above referenced applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers. It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941 B1 and document EP 0587616 B1. Both of these documents disclose gel-type cable seals that are pressurized through the use of threaded actuators. Document U.S. Pat. No. 6,046,406 discloses a cable seal that is pressurized through the use of an actuator including a cam lever. While pressurized cable seals have generally proven to be effective, improvements in this area are still needed.

SUMMARY

Some aspects of the disclosure are directed to an enclosure to which one or more add-on components can be detachably and sealingly mounted. The enclosure defines a main housing in which one or more communications components (e.g., optical components, electrical components, electronic components, etc.) can be disposed.

In certain implementations, the main housing is defined by cooperation between a base and a cover. In certain examples, the cover is sealed to the base with a first gasket (e.g., an O-ring, an H-seal, a flat ring, etc.). In an example, the cover is a dome style cover. In certain examples, the base defines one or more access ports. One or more add-on components can be detachably installed at one or more of the access ports of the base. The base can be secured to the cover by latches, a clamp ring, fasteners or other structures capable of providing a detachable connection between the base and the dome.

Certain aspects of the present disclosure relate to a telecommunication enclosure (e.g., a splice enclosure such as a high density splice enclosure having a plurality of trays for supporting optical splices) having a configuration that can be readily customized in the factory to satisfy customer specifications and can also be readily upgraded in the field. In certain examples, the telecommunication enclosure includes a main housing (e.g., which may be defined by a dome and a base) defining a plurality access ports. A plurality of different add-on components can selectively be coupled to the main housing at the access ports in sealed relation to the main housing. The add-on components can provide different functionalities such as cable sealing functionality, storage functionality, value-added passive optical functionality, hardened demateable connectivity functionality, power supply functionality, wireless communication functionality, heat transfer functionality, signal and power conversion functionality, and other functionalities.

Certain aspects of the present disclosure relate to a cable pass-through sleeve that detachably mounts to the end piece at a mounting location corresponding to the access port. The cable pass-through sleeve has a first end and an opposite second end. The first end of the cable pass-through sleeve is configured to detachably connect to the end piece at the mounting location. The sleeve is positioned to surround the access port when connected to the end piece at the mounting location. In another aspect there is an access port gasket that surrounds the access port for sealing between the first end of the cable pass-through sleeve and the end piece when the cable pass-through sleeve is mounted at the mounting location of the end piece.

Aspects of the present disclosure also relate to providing visual identifiers on add-on components which are readily visible from outside the main housing of an enclosure when the add-on components are mounted to the main housing. In certain examples, the visual identifiers function as a customer or service provider identifiers. In certain examples, the visual identifiers functions to identify a function of each add-on component. In certain examples, the visual identifiers are provided by markings, symbols, numbers or colors integrated with or applied to add-on housings of the add-on components.

Some aspect of the disclosure are directed to a communication enclosure including a main housing including. The main housing includes a housing body having an open end. Another aspect of the communications enclosure is an end piece that detachably mounts to the housing body at the open end of the housing body for closing the open end of the housing body. The end piece defines at least one access port. The main housing additionally includes a main housing gasket for sealing between the end piece and the housing body when the end piece is mounted at the open end of the housing body.

An additional aspect of the communications enclosure includes a cable pass-through sleeve that detachably mounts to the end piece at a mounting location corresponding to the access port. The cable pass-through sleeve has a first end and an opposite second end. The first end of the cable pass-through sleeve is configured to detachably connect to the end piece at the mounting location. The sleeve is positioned to surround the access port when connected to the end piece at the mounting location. In another aspect there is an access port gasket that surrounds the access port for sealing between the first end of the cable pass-through sleeve and the end piece when the cable pass-through sleeve is mounted at the mounting location of the end piece.

An additional aspect of the communications enclosure includes a cable sealing gel block that mounts in the cable pass-through sleeve. The cable sealing gel block includes first and second gel pressurization structures which define cable pass-through locations. There is a volume of gel positioned axially between the first and second gel pressurization structures, and an actuator for forcing the first and second gel pressurization structures axially toward one another to pressurize the volume of gel. When the volume of gel of the cable sealing gel block is pressurized while the cable sealing gel block is installed in the cable pass-through sleeve, a circumferential exterior of the volume of gel provides circumferential sealing with respect to a circumferential interior of the cable pass-through sleeve and the volume of gel also conforms about and seals about cables routed through the cable sealing gel block.

In some examples, the actuator includes a trigger that is used to pressurize the volume of gel, wherein the trigger is accessible at the second end of the sleeve when the cable sealing gel block is installed in the cable pass-through sleeve.

In some examples, the cable sealing gel block loads into the cable pass-through sleeve through the first end of the cable pass-through sleeve, and the second end of the cable pass-through sleeve includes a gel block retention lip for axially retaining the cable sealing gel block within the cable pass-through sleeve.

In some examples, the cable sealing gel block is too large to fit through the access port.

In some examples, the cable sealing gel block is required to be loaded into the cable pass-through sleeve before the cable pass-through sleeve is connected to the end piece, and wherein the cable pass-through sleeve is required to be detached from the end piece to remove the cable sealing gel block from the cable pass-through sleeve.

In some examples, the housing body is a dome having a closed end opposite the open end, and the end piece is a base.

In some examples, the first end of the cable pass-through sleeve is connected to the end piece by fasteners.

In some examples, the access port defines a central port axis, wherein the fasteners include threaded studs that extend through the end piece and are individually sealed relative to the end piece, and wherein the threaded studs are circumferentially spaced about the central port axis.

In some examples, the cable pass-through sleeve includes outer radial projections at the first end of the cable pass-through sleeve. The radial projections each define a stud receptacle for receiving one of the threaded studs, and wherein once the threaded studs have been received within the stud receptacles the first end of the cable pass-through sleeve can be clamped against an exterior side of the end piece by threading nuts on the threaded studs.

In some examples, the stud receptacles are open-sided receivers, and wherein the studs can be installed in the open-sided receivers by positioning the cable pass-through sleeve over the access port in co-axial alignment with the central port axis and then rotating the cable pass-through sleeve about the central port axis until the threaded studs are received within the open-sided receivers.

In some examples, the open-sided receivers are hooks.

In some examples, the fasteners are ground wire terminals.

In some examples, the ground wire terminals each include a threaded stud having a first threaded end projecting inwardly from an interior side of the end piece, a second threaded end projecting outwardly from an exterior side of the end piece, and an intermediate flange that abuts the interior side of the end piece.

In some examples, fastener seals are compressed between the intermediate flanges and the interior side of the end piece.

In some examples, each threaded stud is part of a connection assembly. Each connection assembly includes: one of the threaded studs; a first nut that threads on the first threaded end of the threaded stub for securing a terminal lug of an interior grounding wire to the threaded stud; a second nut that threads on the second threaded end of the threaded stud for securing a terminal lug of an exterior grounding wire to the threaded stud and for abutting the intermediate flange against the interior side of the end piece such that the threaded stud is secured to the end piece; and a third nut threaded on the second end of the threaded stud for securing the cable pass-through sleeve to the threaded stud.

In some examples, the cable pass-through sleeve defines stud receptacles for receiving the second threaded ends of the threaded studs, and wherein the first end of the cable pass-through sleeve is pressed against the exterior side of the end piece by threading the third nuts on the second threaded ends of the threaded studs.

In some examples, the exterior side of the end piece defines recessed regions for receiving the terminal lugs of the exterior grounding wires and for receiving portions of the exterior grounding wires.

In some examples, the end piece defines a plurality of the access ports.

In some examples the access port is a first access port surrounded by the access port gasket, and wherein the end piece also defines a second access port surrounded by another access port gasket and a third access port surrounded by a further access port gasket.

In some examples, the cable pass-through sleeve is a first cable pass-through sleeve that detachably mounts at the first access port and seals against the corresponding access port gasket, a second cable pass-through sleeve detachably mounts at the second access port and seals against the corresponding access port gasket, and a blank cover mounts at the third access port and seals against the corresponding access port gasket.

In some examples, at least two of the first, second and third access ports have different sizes or shapes.

In some examples, at least two of the first, second and third access ports have different cross-dimensions.

In some examples, the first, second and third access ports are circular and at least two of the first, second and third access ports have different diameters.

In some examples, the end piece also has latches for detachably securing the end piece to the main housing body.

In some examples, the main housing body and the end piece mate at an interface having a generally rectangular shape.

Another aspect of this disclosure relates to a telecommunication enclosure. The main housing includes a housing body having an open end. The housing also includes an end piece that detachably mounts to the housing body at the open end of the housing body for closing the open end of the housing body. The end piece defines a plurality of access ports. In another aspect the telecommunications enclosure includes a main housing gasket for sealing between the end piece and the housing body when the end piece is mounted at the open end of the housing body. The end piece includes a plurality of access port gaskets, each of the access port gaskets surrounding one of the access ports. The telecommunications enclosure also includes a plurality of add-on components adapted to be detachably coupled to the end piece at the access ports with the access port gaskets providing sealing between the end piece and the add-on components, wherein when the add-on components are coupled to the end piece, each add-on component is positioned at a different one of the access ports.

In some examples, the access port gaskets are either mounted to the end piece or carried with the add-on components.

In some examples, at least two of the access ports have different sizes or shapes.

In some examples, at least one of the add-on components includes a blank cover.

In some examples, the cable pass-through sleeve contains a cable sealing unit including sealing gel and an actuator for pressurizing the sealing gel within the cable pass-through sleeve to seal about one or more cables routed through the cable pass-through sleeve.

In some examples, a cable is routed through the cable pass-through sleeve is sealed relative to the cable pass-through sleeve by a shape memory sleeve bonded about an exterior of the cable and about an exterior of the cable pass-through sleeve.

In some examples, the add-on components are detachably coupled to the end piece by threaded fasteners.

In some examples, the threaded fasteners include a plurality of threaded studs spaced circumferentially about each of the access ports.

In some examples, the threaded studs are extend through the end piece and a secured to the end piece.

In some examples, the threaded studs are each sealed with respect to the end piece.

In some examples, the threaded studs function as grounding terminals.

In some examples, the fiber organizer includes a tower coupled to the end piece, wherein the splice trays are pivotally connected to the tower.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
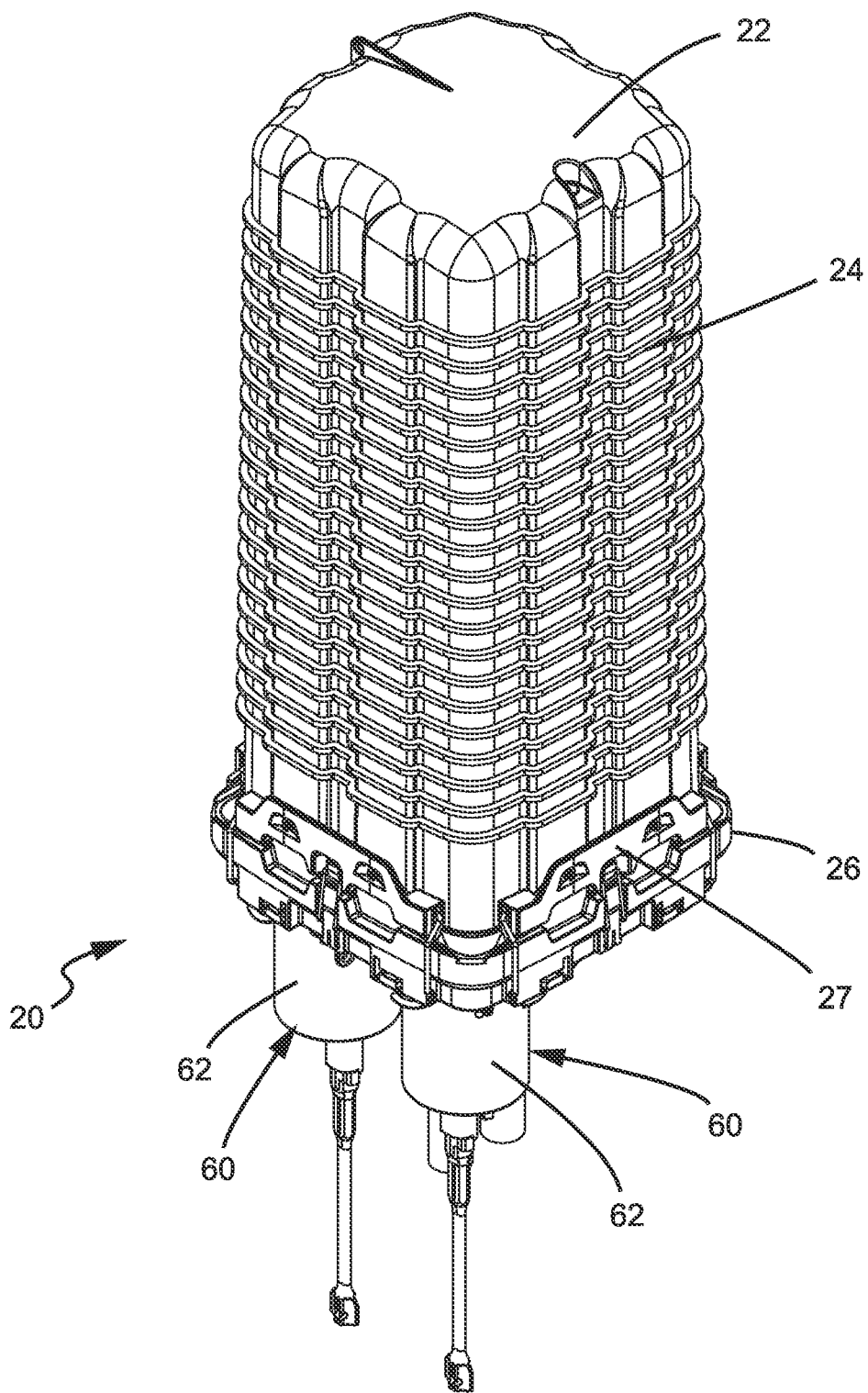
FIG. 1 is a top, perspective view of an example communications enclosure including a main body mounted to a base that holds plurality of add-on features, the communications enclosure being configured in accordance with the principles of the present disclosure.

Reference will now be made in detail to example aspects of the present disclosure that are illustrated in the accompanying drawings. Wherever possible, the same reference numbers will be used throughout the drawings to refer to the same or like parts.

Certain aspects of the present disclosure relate to systems, methods and enclosure configurations for enhancing the ability to customize a telecommunication enclosure in the factory to satisfy customer specifications and also to upgraded a telecommunications enclosure in the field. In certain examples, the ability to customize and upgrade an enclosure is enhanced by providing a main housing of the enclosure with a plurality of separate access ports each including a separate connection location for allowing separate add-on components (e.g., modules) to be added to the main housing. A plurality of different add-on components can be individually coupled to the main housing at the access ports in sealed relation to the main housing.

Certain add-on components can provide cable sealing functionality for sealing cables (e.g., optical cables, electrical cables, hybrid optical and electrical cables) routed into and out of the main housing. Different types of cable sealing add-on modules can be provided for sealing different cable sizes and shapes. Cable sealing modules utilizing different sealing techniques (e.g., pressurized gel sealing, sealing via shape memory sleeve, etc.) can also be provided. Add-on components providing value added optical functionality such as passive optical power splitting functionality, wavelength division multiplexing functionality and optical power tapping functionality can further be provided. In certain examples, add-on components can provide sealing functionality for blown fiber tubes. In certain examples, add-on components can include optical and/or electrical jumpers for providing optical communication and/or power to a radio transceiver such as a radio head for a small cell or a wireless router for a WiFi network. In certain examples, the add-on components can include demateable hardened connection locations for optically connecting to optical fibers routed through the main housing. In certain examples, the add-on components can provide active electronic functionality. In certain examples, the add-on components can include conversion circuitry for converting between alternating current (AC) and direct current (DC) or for converting between different voltage levels (e.g., voltage reduction or voltage boosting). In certain examples, the add-on components can provide for over-voltage protection. In certain examples, the add-on components can include a battery or batteries. In certain examples, the add-on components can include wireless communication functionality such as radio transceivers and/or antennae. In certain examples, the add-on components can provide heat transfer functionality for providing cooling of the main housing and/or the add-on components. In certain examples, the add-on components can provide storage functionality outside the main housing for storing items such as spare equipment (e.g., enclosure mounting hardware, splice protection sleeves, etc.). In certain examples, add-on components accordance with the principles of the present disclosure can add functionality to an enclosure which complements the existing functionality (e.g., high density splicing) of the enclosure without occupying volume of the main housing of the enclosure.

Figure 2:
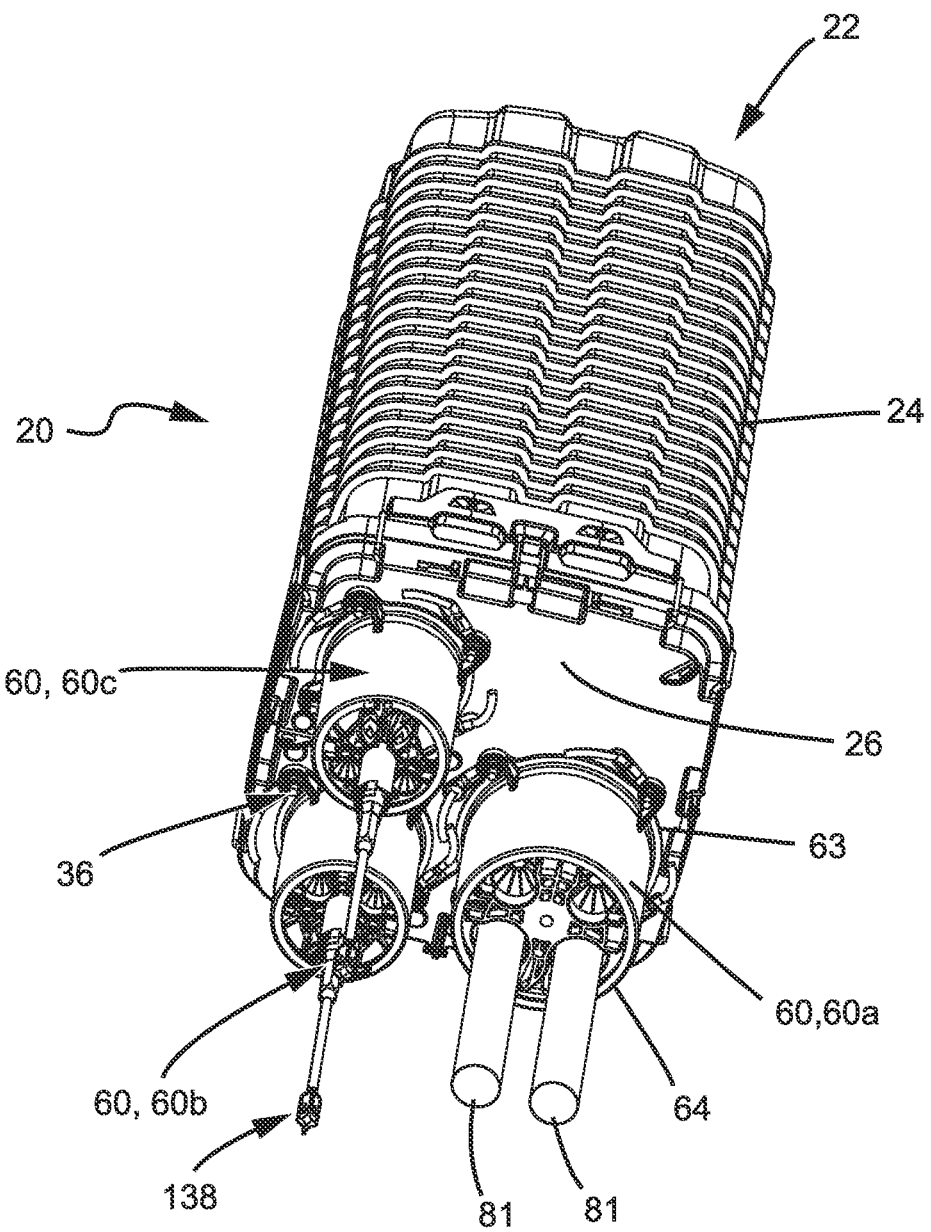
FIG. 2 is a bottom perspective view of the communications enclosure of FIG. 1.
Figure 3:
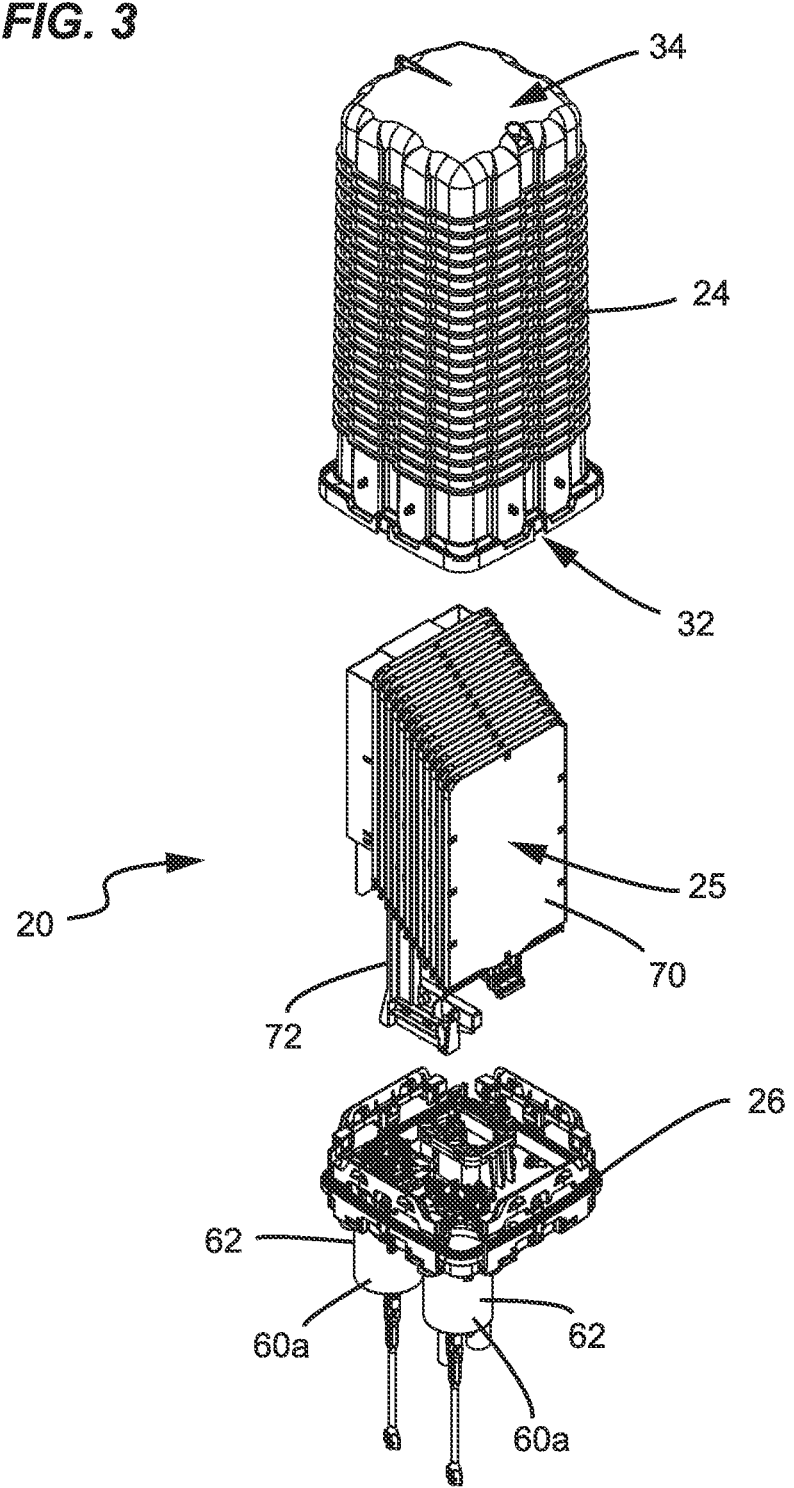
FIG. 3 is an exploded view of the enclosure of FIG. 1.

FIGS. 1-3 depict a telecommunication enclosure 20 configured in accordance with the principles of the present disclosure. The enclosure 20 includes a main housing 22 having a housing body 24 and an end piece 26. In a preferred example, the end piece 26 detachably connects to the housing body 24 (e.g., via latches 27 or other structure such as fasteners or a ring clamp) and environmental sealing is provided between the end piece 26 and the housing body 24 when the parts are coupled together. The end piece 26 defines at least one access port 36 (e.g., see FIG. 6). In certain implementations, a respective add-on component 60 can be detachably coupled (e.g., sealingly coupled) to the end piece 26 at each of the access ports 36.

As will be described herein, a plurality of different types of add-on components 60 can selectively be coupled to the main housing 22 at the access ports 36 in sealed relation to the main housing 22. In various implementations, the different types of add-on components 60 can provide different functionalities such as cable sealing functionality, storage functionality, value-added passive optical functionality, hardened demateable connectivity functionality, power supply functionality, wireless communication functionality, heat transfer functionality, signal and power conversion functionality, and other functionalities. Each of the add-on components 60 includes a sleeve 62 (e.g., a shell such as a canister having open first and second ends 63, 64). The sleeve 62 can be a one-piece, molded plastic part. The different functionality is provided by disposing different types of components within the sleeve 62 as will be discussed herein.

FIG. 3 shows an exploded view of the communications enclosure 20. The communications enclosure 20 is shown with a fiber optic organizer 25 disposed between the end piece 26 and the housing body 24. The fiber organizer 25 includes fiber management trays 70 carried on a tower 72 connectable to the end piece 26. In certain implementations, the fiber optic organizer 25 is mountable in different position inside of the housing 22 as will be described in more detail herein.

Figure 4:
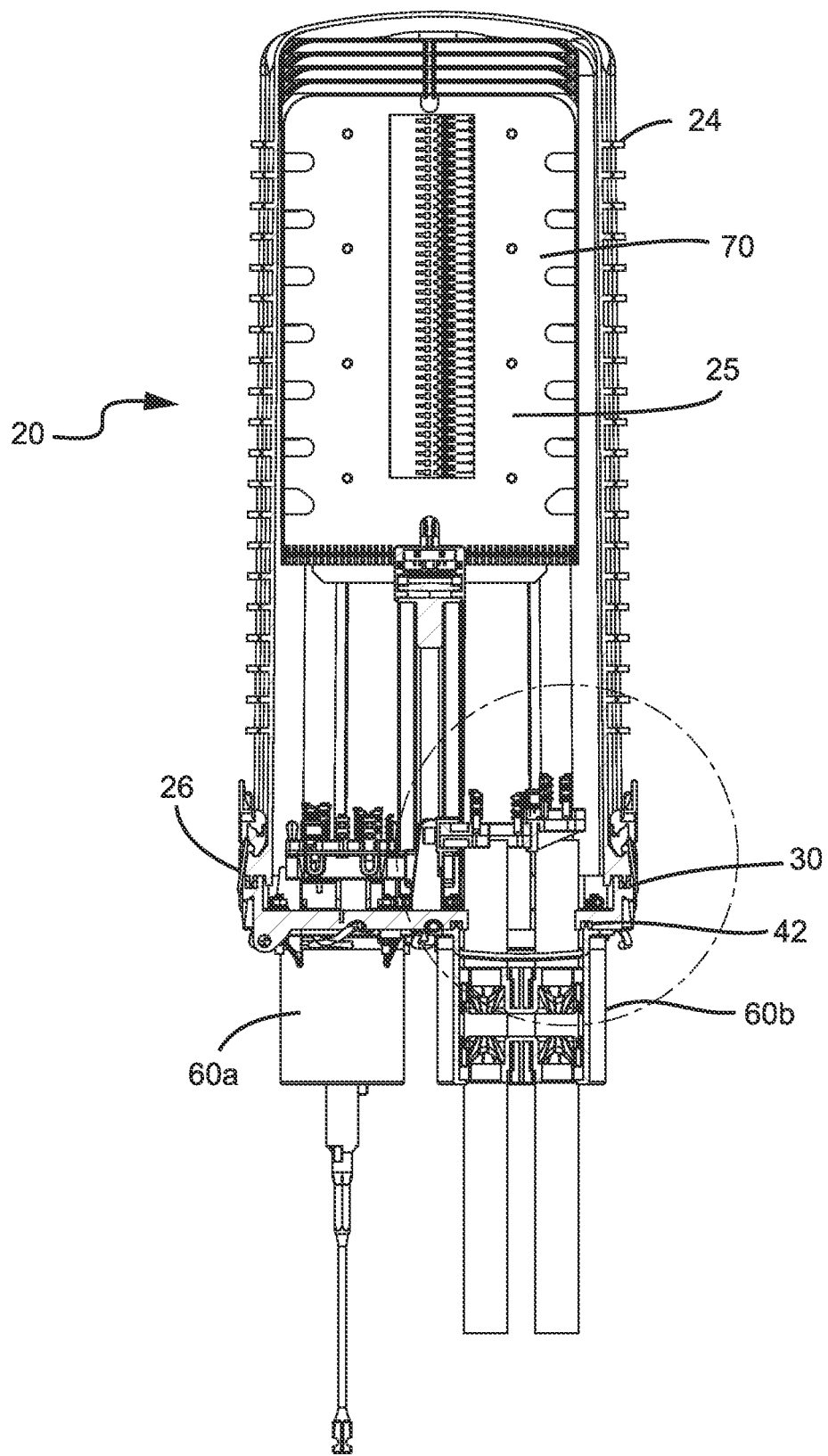
FIG. 4 is a cross-sectional view of the enclosure of FIG. 1.
Figure 5:
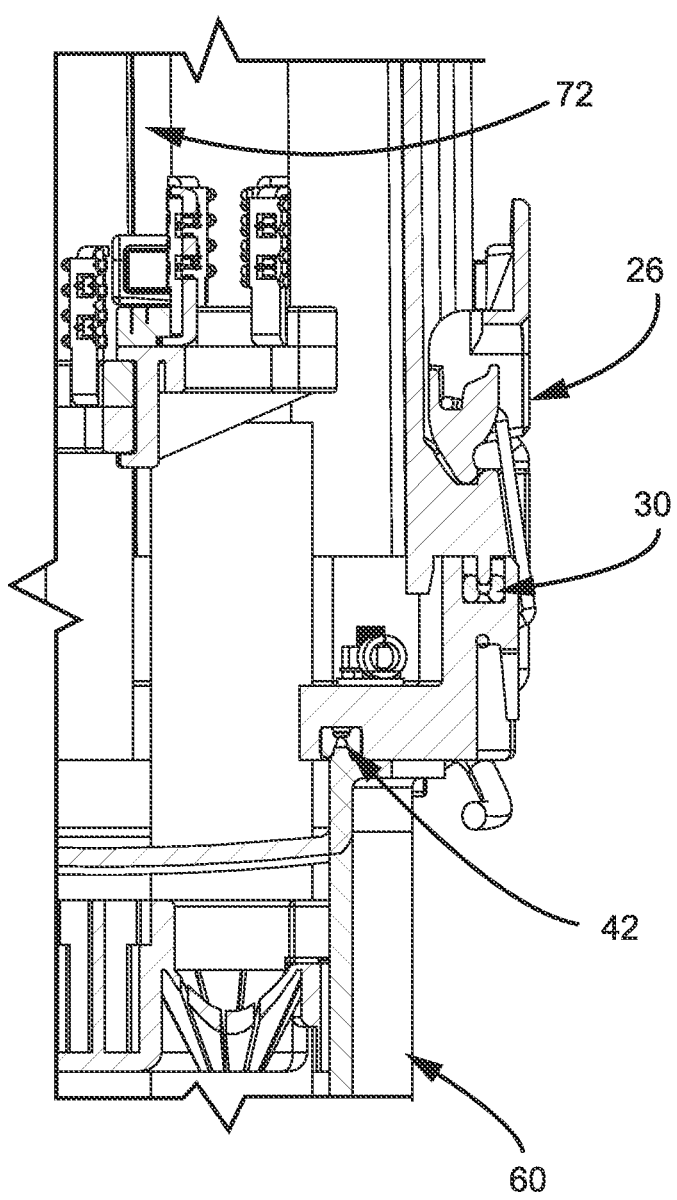
FIG. 5 is a detailed view of a portion of FIG. 4.

As shown at FIGS. 4 and 5, sealing between the end piece 26 and the housing body 24 can be provided by a gasket 30 such as a ring style gasket. In the depicted example, the gasket 30 has an H-shaped transverse cross-sectional profile, but in other examples the gasket can have a round transverse cross-sectional profile (e.g., like a traditional o-ring), or other transverse cross-sectional profiles such as oval, rectangular, square, u-shaped or other shapes. The detachable connection interface between the end piece 26 and the housing body 24 allows the interior of the main housing 22 to be accessed (e.g., for optical splicing, repair, etc.) without requiring cable sealing associated with the end piece 26 to be disassembled or otherwise disturbed.

In the depicted example, the main housing 22 has a butt-ended configuration in which the housing body 24 is a dome having an open end 32 positioned opposite from a closed end 34 (e.g., see FIG. 3), and the end piece 26 is a base for closing the open end 32 of the dome. In certain examples, the end piece 26 defines locations where cables (e.g., cables 81 of FIG. 2) can enter and exit the interior of the main housing 22. In a butt-ended configurations, all of the cables enter and exit the enclosure 20 through only one end of the enclosure 20. In other examples, the main housing 22 can have a pass-through configuration in which end pieces can be mounted at opposite ends of the housing body for allowing cables to enter and exit the housing at both opposite ends of the housing. Of course, other housing configurations also are within the scope of the present disclosure.

Figure 6:
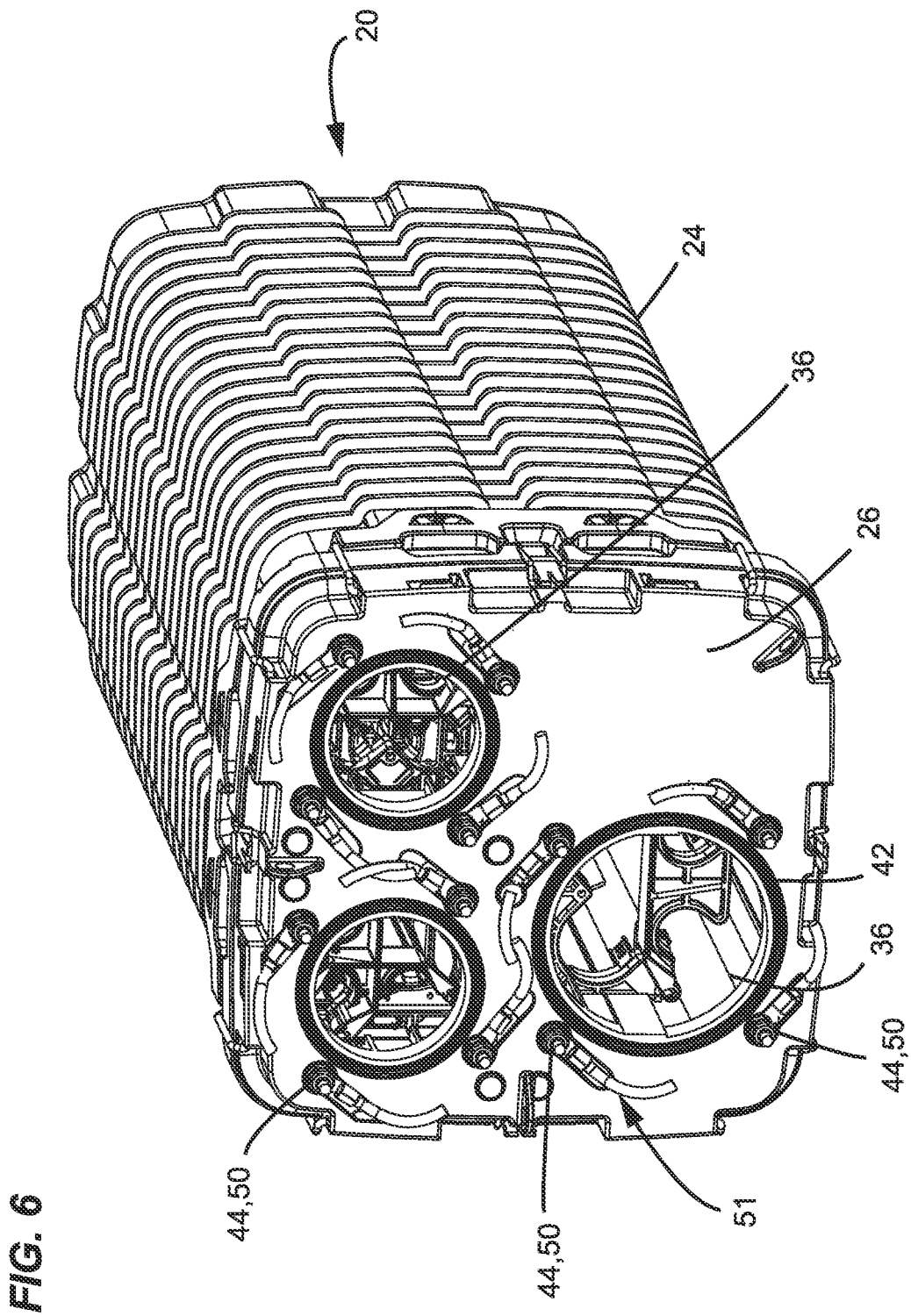
FIG. 6 is a perspective view of the communications enclosure of FIG. 1 with the add-on features removed.
Figure 7:
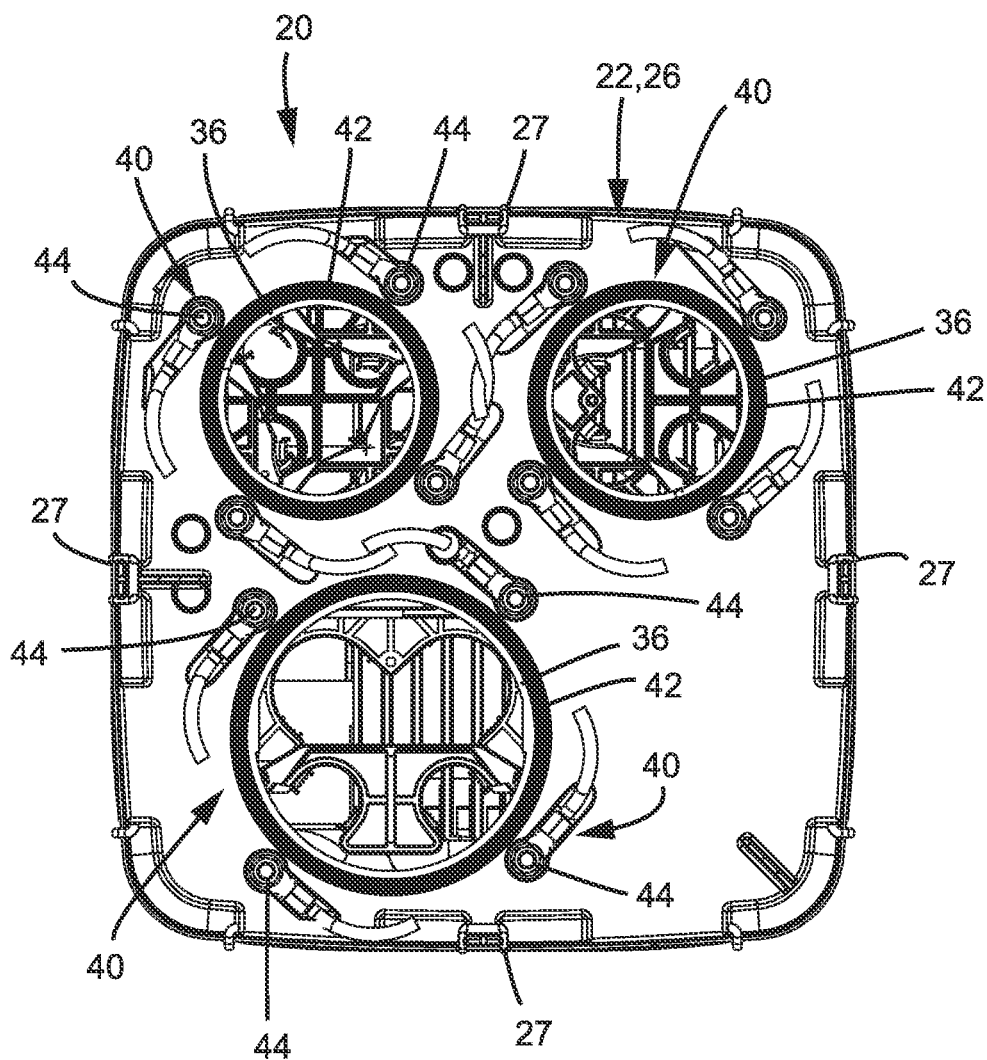
FIG. 7 is a bottom perspective view of the communications enclosure of FIG. 6.
Figure 8:
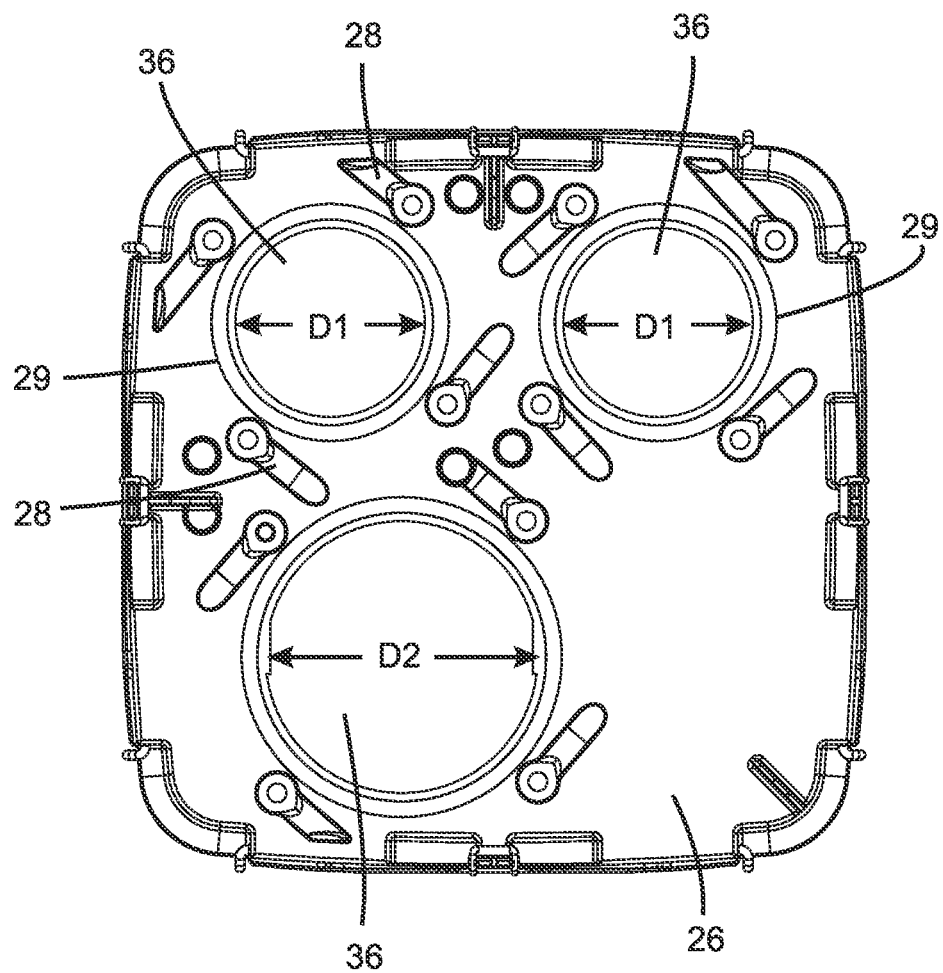
FIG. 8 shows a bottom view of an end piece suitable for use in the communications enclosure of FIG. 1.

Referring to FIGS. 6-8, the end piece 26 defines a plurality of access ports 36. Each of the access ports 36 includes an opening through the end piece 26 for providing access to the interior of the main housing 22. The access ports 36 can have different shapes and sizes depending upon the situation and the add-on feature that is desired. In certain examples, the access ports 36 can all be the same size. In certain examples, at least two of the access ports 36 are different sizes. In certain examples, at least two of the access ports 36 can have the same size. As depicted in FIGS. 6-8, the access ports 36 include three access ports with two of the access ports 36 having the same cross-dimension D1 while the third access ports 36 has a larger cross-dimension D2 than the other two access ports 36 (see FIG. 8). The two access ports 36 with the same cross dimension D1 also have the same diameter, and the access port 36 with the other cross-dimension D2 has a different diameter. Of course, other numbers and sizes of access ports also can be provided in alternative examples.

Figure 9:
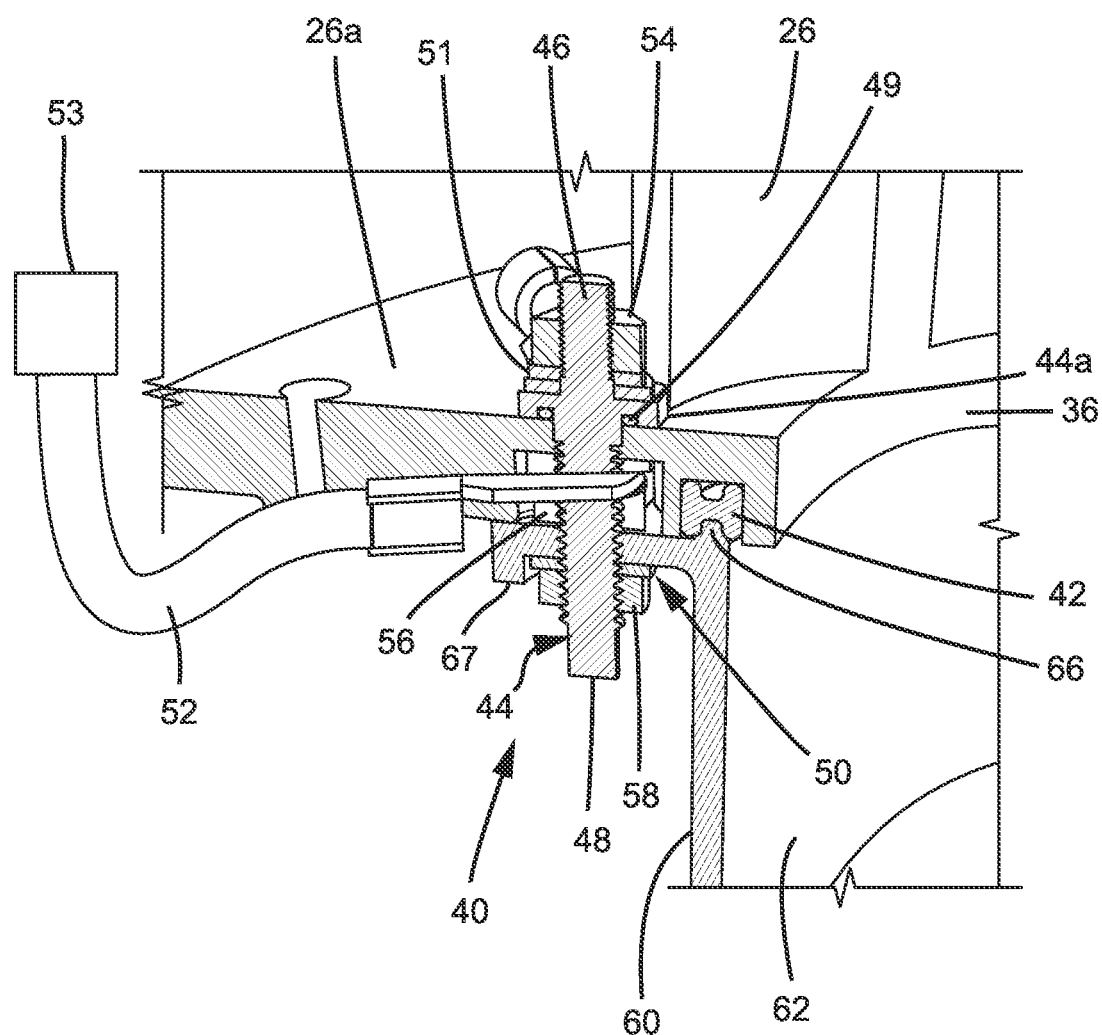
FIG. 9 is a cross-sectional view showing an example fastening assembly for use in securing add-on components to the main housing of FIG. 1.
Figure 10:
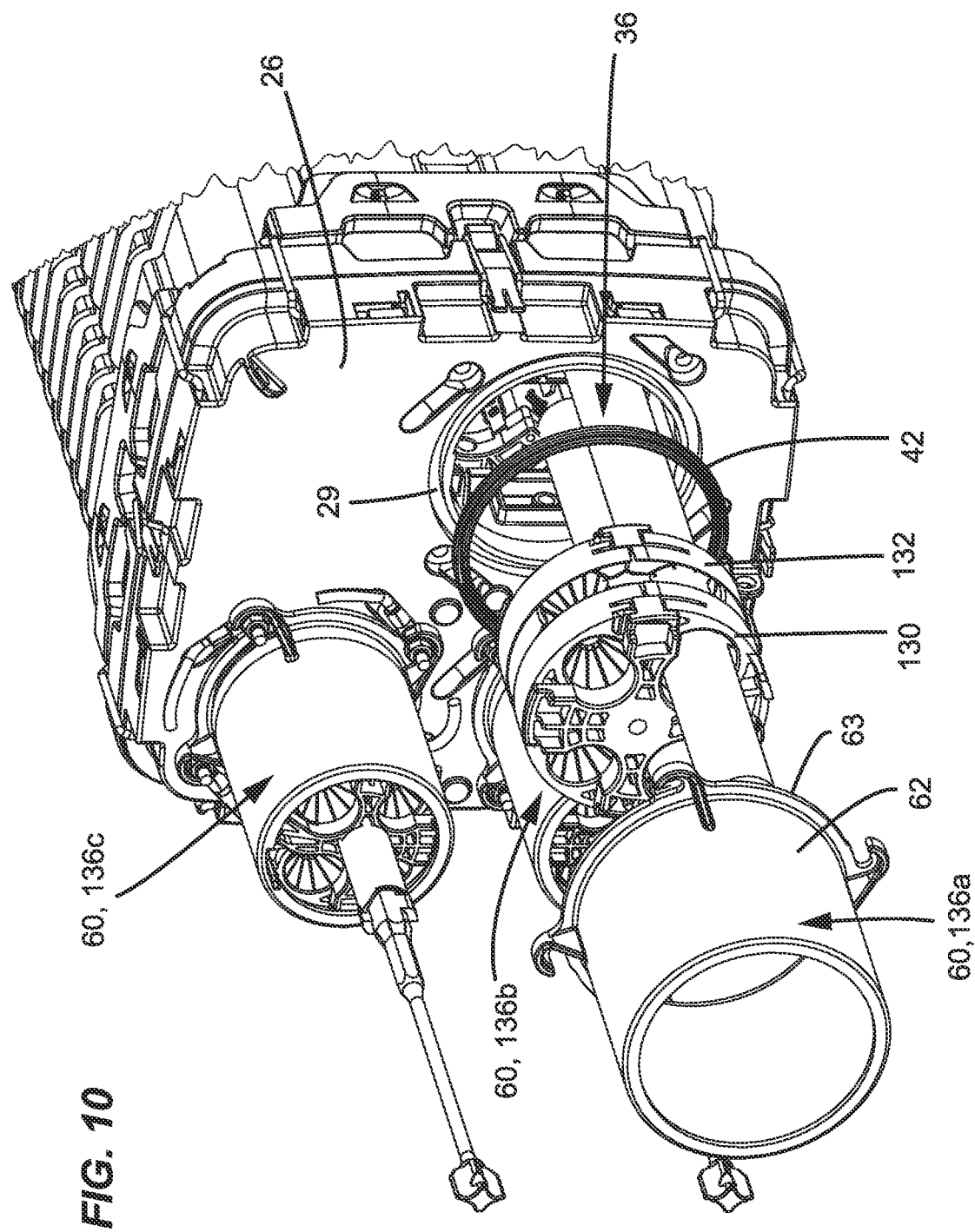
FIG. 10 is a sectional perspective view of the communications enclosure of FIG. 1 with an exploded view of an add-on feature.
Figure 11:
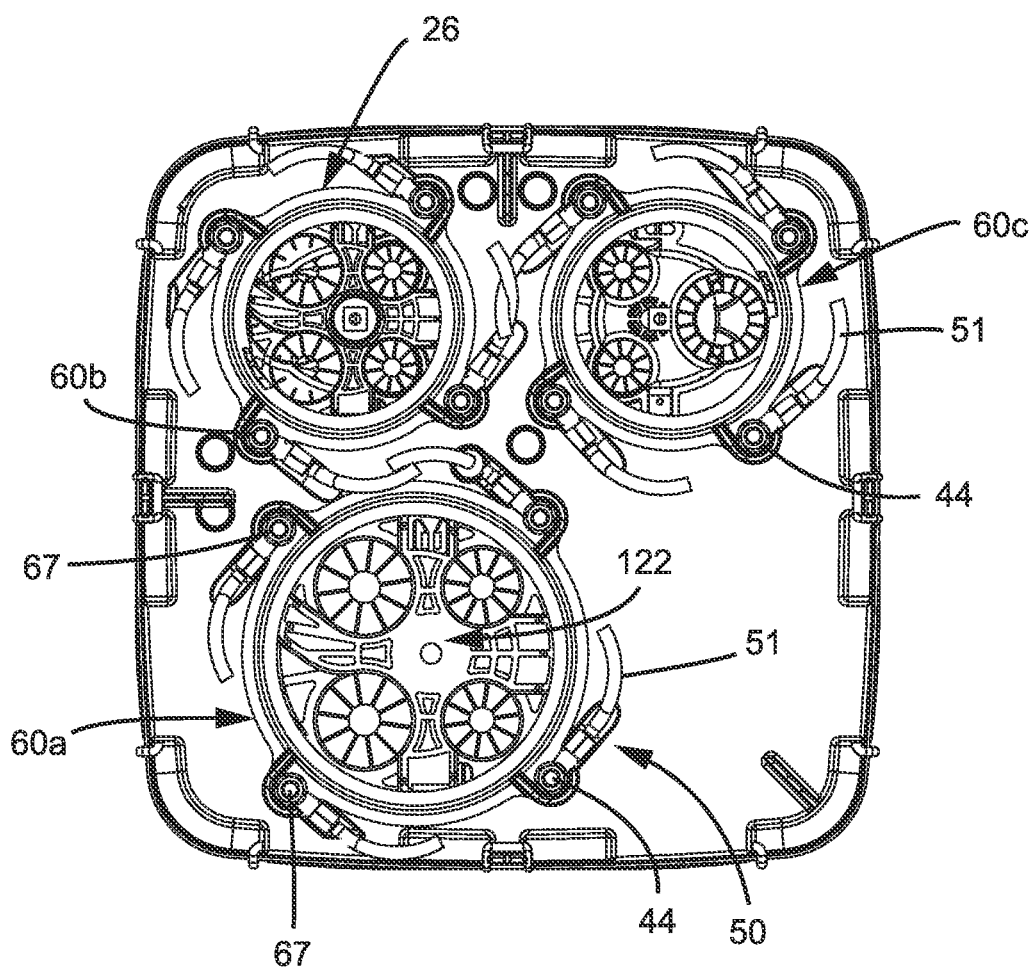
FIG. 11 is a bottom view of the communications enclosure of FIG. 1 with the cables removed for ease in viewing.

Referring to FIGS. 9-11, the end piece 26 includes a mechanical connection and sealing form factor 40 corresponding to each of the access ports 36. Each mechanical connection and sealing form factor 40 provides mechanical connection and sealing between the access port 36 and the sleeve 62 of the respective add-on component 60. The mechanical connection and sealing form factors 40 can vary in size corresponding to the size of their respective access ports 36. In the depicted example, each mechanical connection and sealing form factor 40 includes a dedicated seal 42 surrounding the corresponding access port 36, and a plurality of mechanical fasteners 44. In certain examples, the mechanical fasteners 44 can be positioned in a pattern or arrangement about the corresponding access port 36 so as to be spaced about the exterior of a circumference or perimeter of the corresponding access port 36. The separate seals 42 corresponding to each of the access ports 36 are depicted as gaskets such as a ring-style gaskets. In the depicted example, each of the gasket seals 42 has an H-shaped transverse cross-sectional profile (see FIGS. 5 and 9), but in other examples the gaskets can have a round transverse cross-sectional profile (e.g., like a traditional o-ring), or other transverse cross-sectional profiles such as oval, rectangular, square, u-shaped or other shapes. In the depicted example, the seals 42 are mounted to or otherwise carried with the end piece 26. For example, the seals 42 are shown mounted within annular grooves 29 that individually surround each of the access ports 36 (e.g., see FIG. 10). In other examples, rather than being mounted to the end piece 26, the seals 42 can be mounted on and carried with add-on components configured to mount to the end piece 26 at the access ports 36. Such add-on components can include mechanical connection form factors that complement with (e.g., interlock with, engage with, mate with, etc.) the mechanical connection form factors of the access ports to allow the add-on components to be detachably connected to the end piece 26 at the access ports 36.

The mechanical fasteners 44 of the mechanical connection form factor are depicted as including threaded fasteners (e.g., threaded studs) that extend through the end piece 26. In one example, the threaded fasteners are externally threaded fasteners such as bolts. In FIG. 11, the threaded studs 44 are shown circumferentially spaced around the access port 36, which defines a central port axis. In the example depicted in FIG. 9, the mechanical fasteners are externally threaded fasteners such as threaded studs that extend through the end piece 26 and have inner threaded ends 46 inside the main housing 22 and outer threaded ends 48 outside the main housing 22 (see FIG. 9). The fasteners 44 also have intermediate flanges 44a that abuts the interior side 26a of the end piece 26. The fasteners 44 are depicted as being sealed with respect to the end piece 26 (e.g., through compression between the intermediate flange 44a and the interior side 26a) by seals 49 (see FIG. 9).

In some examples, in addition to functioning to secure add-on components to the main housing 22, the fasteners 44 can also function as ground connection locations (e.g., ground wire terminals) 50. For example, internal grounding wires 51 electrically connected to electrically conductive layers of cables routed into the enclosure can be connected to the inner threaded ends 46 and external grounding wires 52 for connection to electrical earth ground (e.g., through a grounding panel 53) can be connected to the outer threaded ends 48. Internally threaded fasteners (e.g., nuts) can be threaded on the inner and outer threaded end 46, 48 to provide wire securement, anchoring of the fasteners 44 relative to the main housing 22 and securement of add-on components onto the fasteners 44. Referring to FIG. 9, each fastener 44 can be part of a fastener assembly including a first nut 54, a second nut 56 and a third nut 58 that thread onto the fastener 44. The first nut 54 holds the fastener 44 to the base 26. In certain examples, the first nut 54 can function to secure a terminal lug of the internal grounding wire 51 to the inner threaded end 46. The second nut 56 can be used for anchoring the fastener 44 to the end piece 26 and for securing a terminal lug of the external ground wire 52 to the outer threaded end 48. When the second nut 56 is threaded on the outer threaded end 48 of the fastener 44, a wall of the main housing 22 is clamped between the nut 56 and an inner flange 59 of the fastener 44 to provide anchoring of the fastener 44. The third nut 58 holds the add-on component 60 to the base 26. In certain examples, the third nut 58 is threaded on the outer end 48 to secure add-on components in place on the fasteners 44. In one example, threaded the third nuts 58 on the fasteners 44 functions to clamp an add-on component against the main housing and preferably presses a sealing feature (e.g., a sealing surface, a sealing projection) against the seal 42 surrounding the corresponding access port 36.

In other examples, the ground connection locations are offset from the fasteners 44 (e.g., see FIGS. 43-46). For example, the end piece 26 of the main housing 22 may define a grounding region 190 at which a plurality of openings 192 are defined (e.g., see FIGS. 44 and 45). One or more grounding posts 194 (e.g., threaded studs) extend through the openings between the interior of the housing 22 and the exterior of the housing 22. External grounding wires 52 can be connected to the outer ends of the grounding posts 194 and internal grounding wires 51 can be connected to inner ends of the grounding posts 194 to electrically connect conductive layers of cables routed into the enclosure 20 to ground. In certain examples, a grounding panel 53 can be mounted at the grounding region 190 to electrically connect the grounding posts 194 to each other (e.g., see FIG. 46). Connecting the grounding posts 194 using the grounding panel 53 allows the cables to all be grounded with a single ground wire between the grounding panel 53 and an earth ground connection. Alternatively, maintaining electrical isolation of the grounding posts 194 (see FIG. 43) allows for tracing of the cables using a toner.

As shown in FIGS. 10-13, the first ends 63 of the sleeves 62 of the add-on components 60, 60a, 60b, 60c each include mechanical connection and sealing form factors 65 that that complement (e.g., are adapted to interlock with, engage with, mate with, register with, etc.) the mechanical connection and sealing form factors 40 corresponding to the access ports 36. In the example shown in FIG. 9, the mechanical connection and sealing form factors 65 of the add-on component 60 has a projecting rib 66 that engages the access port gasket 42. In certain examples, the projecting rib is an axial sealing ring that projects axially from the first end 63 of the sleeve 62 and is adapted to sealingly engage the seal 42 of a corresponding one of the access ports 36 when the add-on component 60 is mounted to the housing 22 at the access port 36. In other implementations, the access port gaskets 42 can be carried by add-on components 60 mounted to the base 26 at the access ports 36. In such implementations, the base 26 may define projecting ribs around each port 36. The interface between the seal 42 and the sealing ring 66 provides sealing between the sleeve 62 and the end piece 26.

The mechanical connection and sealing form factors 65 also include fastener receptacles 67 (FIG. 12) provided at outer flanges 68 of the sleeves 62 at the first ends 63 of the sleeves 62. For example, each add-on component sleeve 62 may have outer radial projections that each define a stud receptacle 67 for receiving one of the threaded studs 44. In certain examples, the stud receptacles 67 on the sleeve 62 are open-sided receivers. The receptacles 67 are arranged to register with and receive the fasteners 44 of the mechanical connection and sealing form factors 40. In one example, the receptacles 67 are defined by projections (e.g., ears) that project radially outwardly from the sleeves 62 at the first ends 63. The receptacles 67 can be hooks having open sides configured to receive the fasteners 44 when the sleeve is co-axially aligned with one of the access ports 36, and then rotated about a central axis of the access port 36. Each retention member 67 also may define an abutment surface that the third nut 58 engages to hold the add-on component 60 to the base 26 (see FIG. 9).

To mount the add-on component 60 to the end piece 26, the add-on component 60 is co-axially aligned with the access port 36 and moved axially toward the access port. The threaded studs 44 can be installed in the open-ended receivers 67 by positioning the sleeve 62 over the access port 36 in co-axial alignment with the central port axis and then rotating the cable pass-through sleeve 62 about the central port axis until the threaded studs 44 are received within the open-faced receivers 67. Once the studs 44 have been received within the receptacles 67, the first end of the sleeve 62 can be clamped against an exterior side of the end piece 26 by threading nuts on the studs 44. For example, the third nuts 58 may then be threaded on the fasteners 44 to compress the flanged first end 63 of the sleeve 62 against the end piece 26 to clamp the component 60 in place in alignment with the access port 36 and to axially press the sealing ring 66 into engagement with the seal 42 to provide sealing between the sleeve 62 and the end piece 26.

The sleeves 62 of separate ones of the add-on components can be separately attached to and detached from the end piece 26. This facilitates the assembly process by preventing multiple add-on components 60 from being required to be simultaneously aligned with features of the housing 22 during the assembly process. Also, the cables extending through one add-on component 60 can be accessed without disturbing the cable seals of another one of the add-on components.

The add-on components 60a, 60b can be attached to the end piece 26 while the end piece 26 is detached from the housing body 24, thereby allowing the portions of the cables extending through the access port 36 to be readily anchored to the interior of the end piece 26. Also, optical fibers projecting from the cable ends can be upjacketed and routed to fiber management trays 70 (see FIG. 3) carried on the tower 72 (see FIG. 3) connected to the end piece 26 for optical splicing to optical fibers of other fiber optic cables routed through the end piece 26. After cable anchoring and fiber routing/splicing, the housing body 24 can be coupled to the end piece 26. In certain examples, the cables 81 also can be anchored to an exterior of the end piece 26 (e.g., see FIG. 46). For example, an anchor bracket 183 can be mounted to the end piece 26 adjacent the sleeve 62 and clamps 185 or other fasteners may attach the cable 81 to the anchor bracket 183.

FIGS. 10-13 illustrates one example implementation of a first type of add-on component 60 configured as a cable pass-through sleeve (i.e., a cable sealing sleeve) 136. FIG. 10 illustrates a perspective view of the communications enclosure 20 with an exploded view of the first cable pass-through sleeve 136a. The cable pass-through sleeves 136a, 136b, 136c include a cable sealing gel block 122 (FIG. 12) that mounts in a cable pass-through sleeve 62. The cable sealing gel block 122 includes first and second gel pressurization structures 130, 132 that define cable pass-through locations 135. Positioned axially between the first and second gel pressurization structures 130, 132 is a volume of gel 134 (shown in FIG. 12). The volume of gel 134 conforms about and seals about cables 81 (FIG. 14) that are routed through the cable sealing gel block 122.

Figure 12:
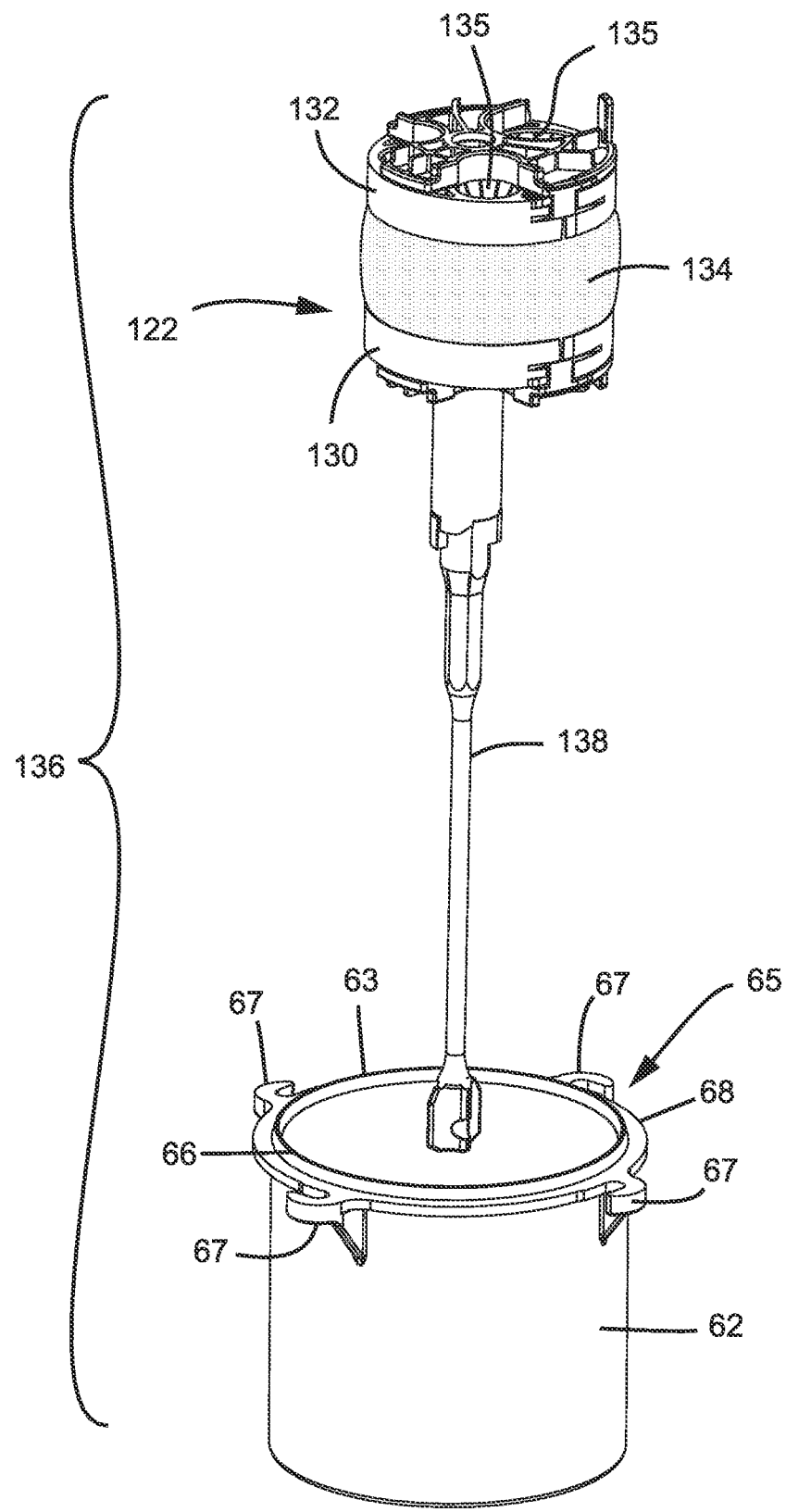
FIG. 12 depicts a gel sealing unit representative of the type of gel sealing unit that can be used with the add-on components of FIG. 1.

FIG. 12 illustrates one of the cable sealing units 122 in alignment with the cable sealing sleeve 62. The cable sealing unit 122 includes a volume of gel 134 positioned axially between first and second gel pressurization structures 130, 132. Each of the gel pressurization structures 130, 132 defines one or more cable pass-through locations 135 that align with the one or more cable pass-through locations of the other pressurization structure 132, 130. The gel 134 can define openings in the gel in alignment with the locations 135 for receiving cables. In some examples, the gel 134 can be segmented to facilitate loading cables in the gel. An actuator 138 enables a user to move the pressurization structures 130, 132 towards each other to pressurize the volume of gel 134. In some examples, the actuator 138 includes a threaded compression mechanism. In other examples, the actuator 138 includes a camming compression mechanism. An example actuator suitable for use with the cable sealing gel block 122 is shown and described in U.S. Pat. No. 9,948,082, the disclosure of which is hereby incorporated herein by reference in its entirety. In some of the figures, the actuator 138 is removed for clarity.

When the cable sealing unit 122 is installed in the cable sealing sleeve 62, pressurizing the volume of gel 134 of the cable sealing unit 122 (e.g., using the actuator 138) provides sealing between a circumferential exterior of the volume of gel 134 and the inner surface of the sleeve 62. The volume of gel 134 also conforms about and seals about cables 81 routed through the cable sealing unit 122 during pressurization. When the volume of gel 134 is depressurized (e.g., using the actuator 138), the circumferential exterior of the volume of gel 134 unseals from inner surface of the sleeve 62, thereby allowing movement (e.g., removal) of the cable sealing unit 122 relative to the sleeve 62. It will be appreciate that fiber optic cables, electrical cables (e.g., power cables, co-axial cables, twisted pair cables) and hybrid fiber/electrical cables can all be sealed by the add-on components and routed into or out of the enclosure.

Figure 13:
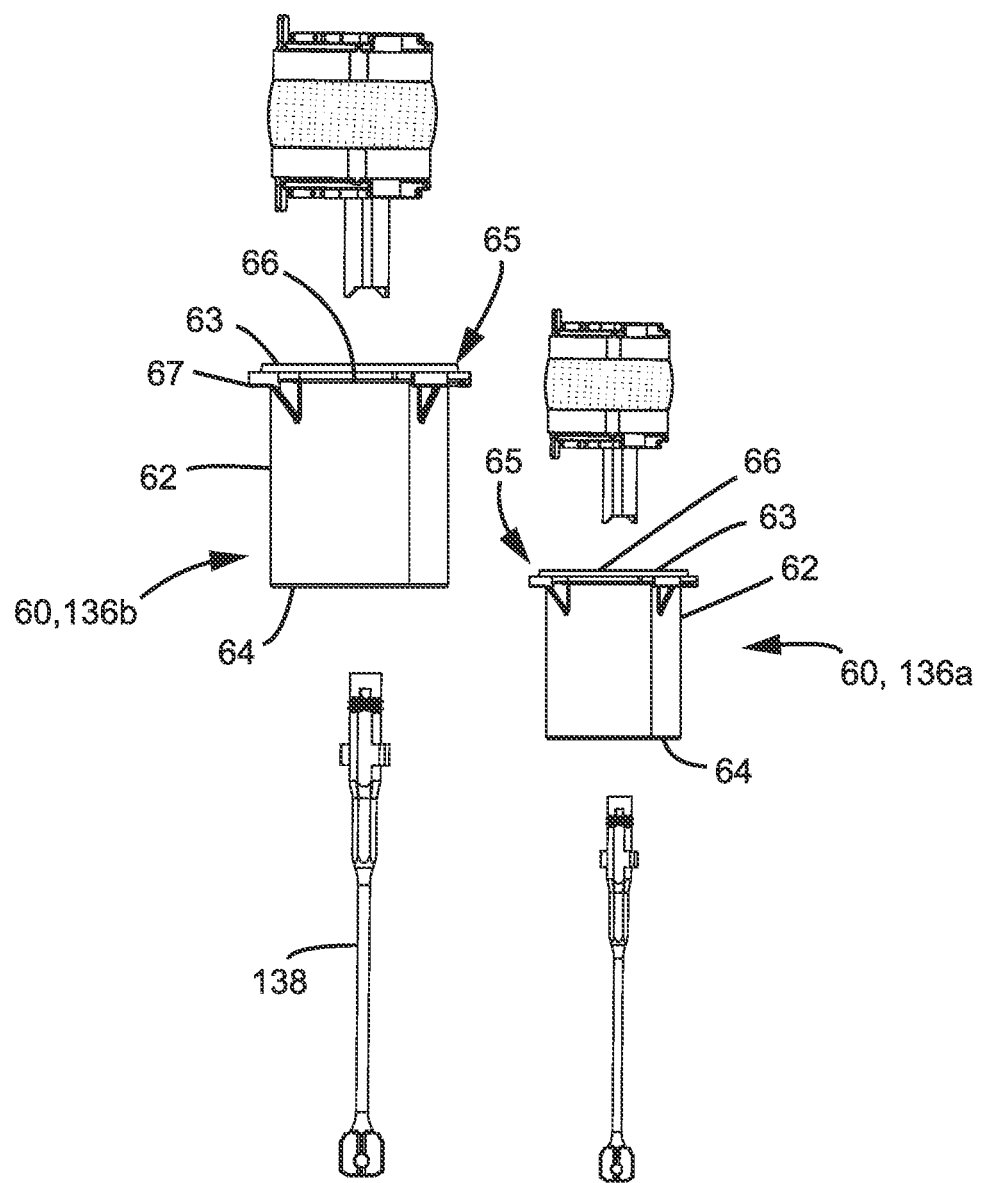
FIG. 13 includes exploded views of add-on components in accordance with the principles of the present disclosure that can be attached to the main housing of FIG. 1, the add-on components include gel sealing units for providing cable sealing with respect to cables desired to be routed in or out of the main housing.

FIG. 13 depicts two cable pass-through sleeves 136a, 136b in accordance with the principles of the present disclosure that can be attached to the main housing of FIGS. 1 and 2 at the access ports 36. The cable pass-through sleeves 136a, 136b include gel sealing units 122 for providing cable sealing with respect to cables desired to be routed in or out of the main housing 22. The cable pass-through sleeves 136a, 136b can each have the same basic configuration but can be sized differently to correspond to the different sizes of the access ports 36. In certain examples, the difference in size allows the cable pass-through sleeves 136a, 136b to accommodate different cable numbers and cable size ranges (e.g., diameter ranges). The cable pass-through sleeves 136a, 136b can also be configured to seal different shapes of cable (e.g., flat cables, round cables, etc.). The gel sealing units 122 load into the cable sealing sleeves 62 through the first ends 63. The second ends 64 can include circumferential retaining lips for preventing the gel sealing units from being withdrawn from the sleeves 62 from the second ends 64.

To secure one of the cable pass-through sleeves 136a, 136b at one of the access ports 36, the sleeve 62 is inserted over cables desired to be routed into the main housing 22 and the cables are routed through the gel block 134 of the sealing unit 122. The sleeve 62 is then inserted over the sealing unit 122 with the sealing unit 122 passing through the first end 63. The insertion step continues until the sealing unit 122 abuts against the retention lip at the second end 64 of the sleeve 62. The sealing unit 122 can then be pressurized within the sleeve 62. The cable pass-through sleeves 136a, 136b is then co-axially aligned with the access port 36 and moved axially toward the access port until inner ends of the cables projecting beyond the first end 63 of the sleeve 62 extend through the end piece 26 the main housing 22. Attachment of the sleeve 62 to the end piece 26 continues as described above.

To add cables to the enclosure, the housing body 24 and the end piece 26 can be decoupled, and then the sleeve 62 corresponding the cable pass-through sleeves 136a, 136b through which it is desired to pass the cable is removed by de-pressurizing the sealing unit 122 and then disengaging the mechanical connection form factor 65 of the sleeve 62 from the complementary mechanical connection form factor 40 provided at the access port 36. Once disengaged from the fasteners 44, the sleeve 62 can be axially slid off the gel block. The new cable is then inserted through the sleeve 62 and through the sealing unit 122 such that an inner end of the cable extends through the access port 36. The inner end of the cable can be anchored to the end piece 26 and fibers of the cable can be routed to the trays 70. Thereafter, the sleeve 62 can be slid back over the gel block and the connection form factors 40, 65 can be coupled together. The gel block can then be pressurized to provide sealing about the cables passing through the sleeve 62.

Figure 34:
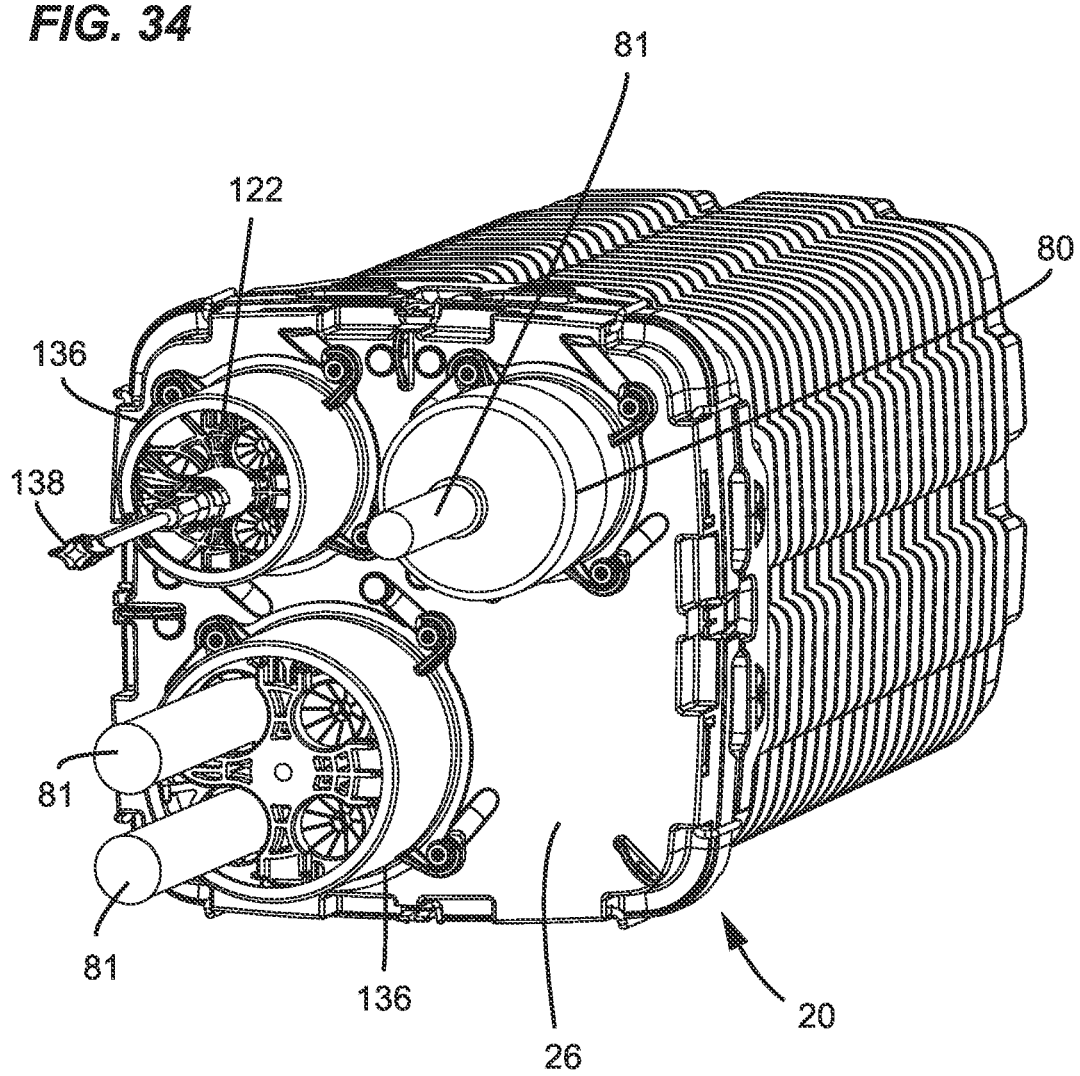
FIG. 34 shows a bottom perspective view of the communications enclosure of FIG. 1 with a various add-on features.

FIG. 34 shows the add-on features as three cable pass-through sleeves 136 with cable sealing blocks 122. One of the cable pass-through sleeves 136 is shown with the actuator 138, another cable pass-through sleeve 136 is shown with two cables 81 running through the cable pass-through sleeve 136 and the third cable pass-through sleeve 136c is shown as a heat-shrink sleeve 75. The heat shrink sleeve 75 can be fit about the exterior of the cable pass-through sleeve 136. The heat shrink sleeve 75 can be a shape memory sleeve and can allow for multiple cables 81 to pass through the sleeve.

Figure 14:
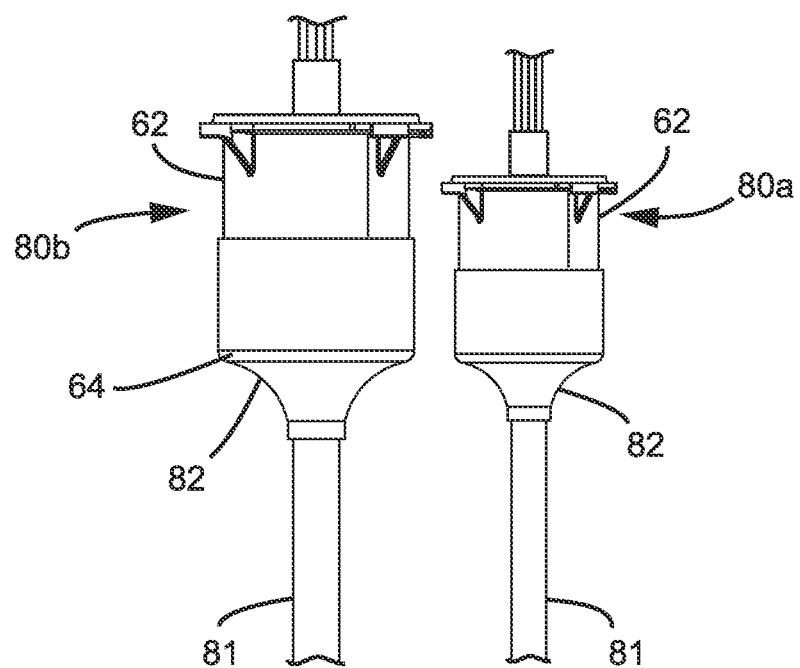
FIG. 14 shows further add-on components in accordance with the principles of the present disclosure that can be attached to the main housing of FIGS. 1 and 2, the add-on components include shape memory sleeves for providing cable sealing with respect to cables desired to be routed in or out of the main housing.
Figure 15:
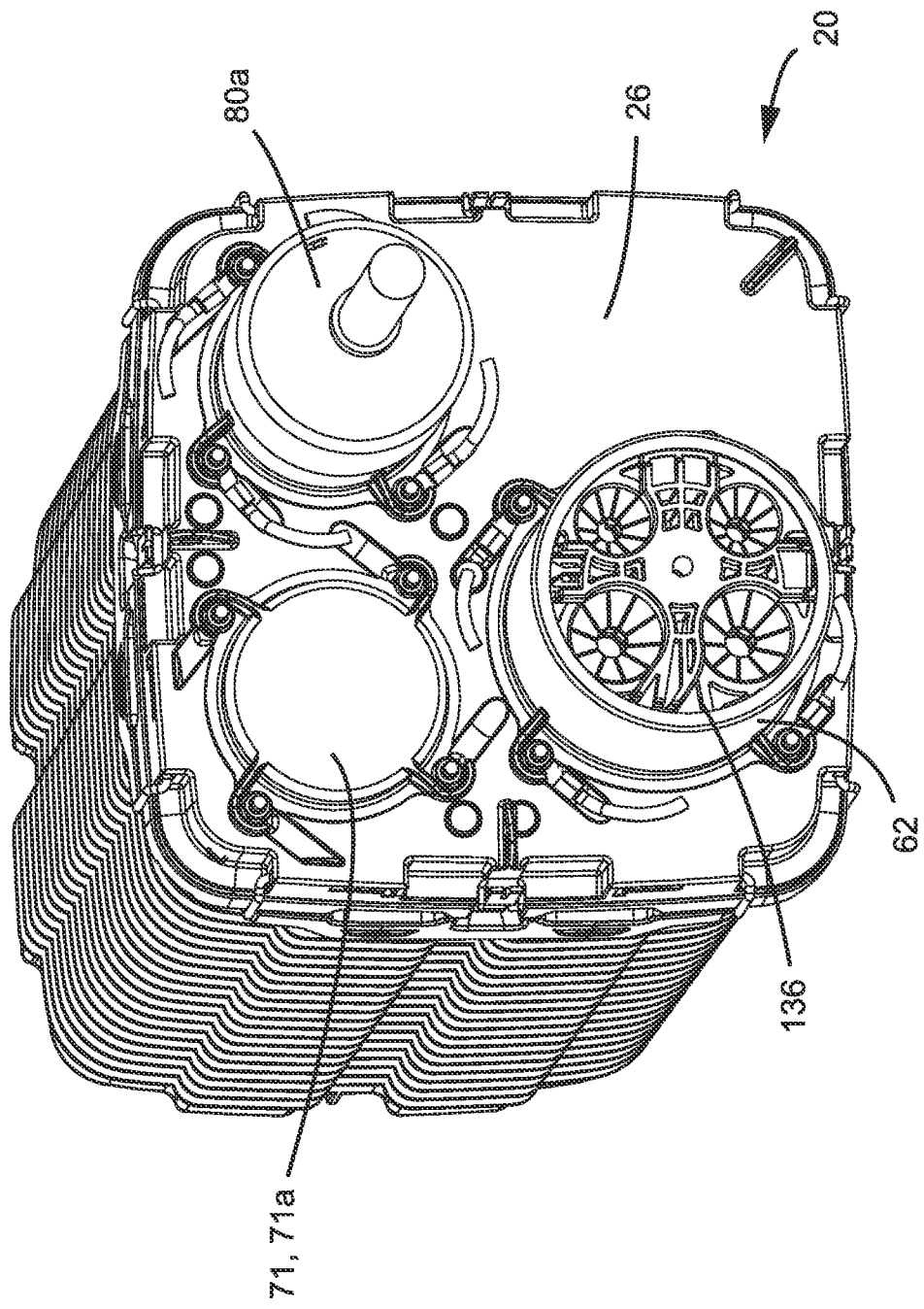
FIG. 15 shows a bottom perspective view of the communications enclosure of FIG. 1 with various add-on features including a blank cover over one access port.

FIG. 14 depicts two add-on components 80a, 80b in accordance with the principles of the present disclosure that can be attached to the main housing 22 of FIGS. 1 and 2 at the access ports 36. The add-on components 80a, 80b can each have the same basic configuration but can be sized differently to correspond to the different sizes of the access ports 36. The add-on components 80a, 80b each include one of the sleeves 62 having a first end including the connection form factor that complements the connection form factors 40 of the access ports 36. The add-on components 80a, 80b also include cables 81 (e.g., fiber optic cables, power cables, hybrid fiber/electrical cables) routed through the sleeves 62. Shape memory sleeves 82 provide sealing between the second ends 64 of the sleeves 62 and the outer jackets of the cables 81. In certain examples, the shape-memory sleeves 82 are heat-shrink sleeves that are adhesively bonded to the outer surfaces of the sleeves 62 and are also adhesively bonded to the outer surfaces of the jackets of the cables 81. When the add-on components 80a, 80b are secured at the access ports 36, the cables 81 extend through the access ports and can be anchored (e.g., clamped) to the end piece 26 and optical fibers or electrical conductors can be accessed for connection to other fibers or electrical conductors within the enclosure 20. FIG. 15 depicts one of the add-on modules 80a secured at one of the smaller access ports 36 of the main housing 22 of the enclosure 20 of FIGS. 1 and 2.

Figure 16:
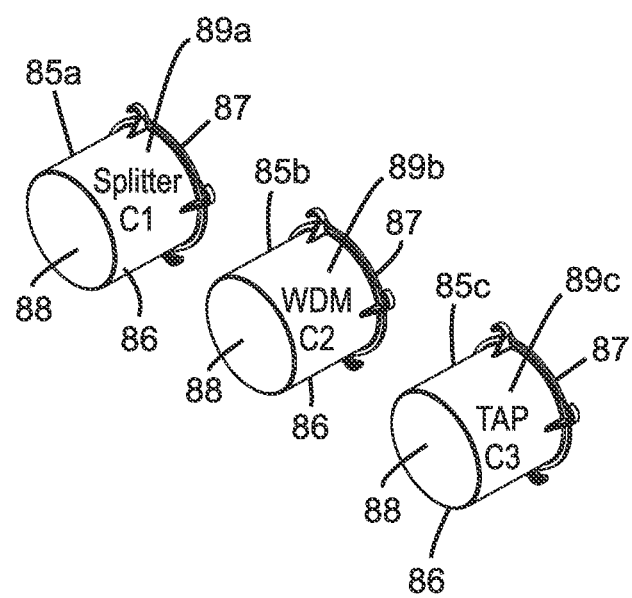
FIG. 16 depicts further add-on components in accordance with the principles of the present disclosure that can be attached to the main housing of FIGS. 1 and 2, the add-on components include value added passive optical devices.
Figure 17:
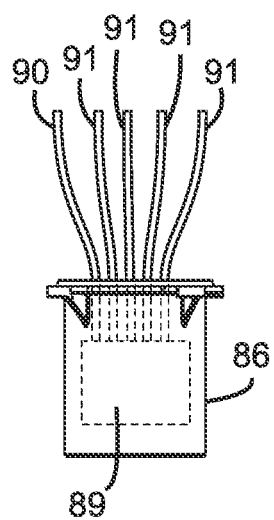
FIG. 17 is a schematic representation of add-on components of the type included at FIG. 16.
Figure 18:
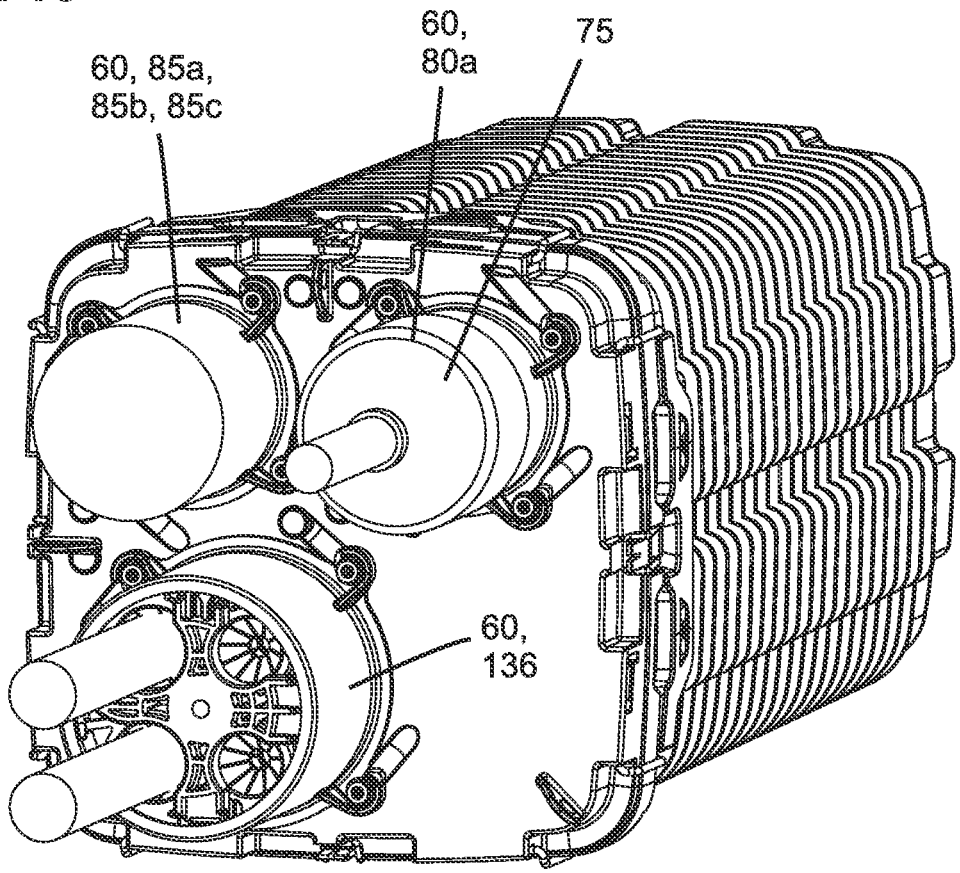
FIG. 18 depicts the enclosure of FIG. 15 with the blank cap replaced with a value added (e.g., passive splitter) add-on component.

Aspects of the present disclosure also relate to the ability to upgrade or customize an enclosure such as a splice enclosure with value added passive optical devices 60. In certain examples, the valued added devices 60 can be added without using space within a main housing 22 of the enclosure 20 without negatively affecting a primary functionality (e.g., high density splicing) of the enclosure 20. In this regard, FIG. 16 depicts add-on components 85a, 85b, 85c that can be sealably and detachably mounted at the access ports 36 of the enclosure 20. The add-on components 85a, 85b, 85c each include a canister 86 (e.g., add-on housing, compartment, module, etc.) having a first end 87 including the mechanical connection form factor 65 adapted for connecting to the connection form factors 40 of the access ports 36, and a second end 88 that is closed. Passive optical devices 89 (see FIG. 17) are mounted in the canisters 86 with optical leads (e.g., and input fiber 90 and output fibers 91) projecting out from the first end 87 of the canister 86. When the components 85a, 85b, 85c are mounted to the housing 22, the input and output fibers 90, 91 extend though corresponding ones of the access ports 36 and are available for connection to other optical fibers within the enclosure. The add-on component 85a includes a passive optical power splitter 89a, the add-on component 85b includes a wavelength division multiplexer 89b and the add-on component 85c includes a passive optical tap 89c. FIG. 18 depicts one of the components 85a, 85b, 85c mounted at one of the smaller access ports 36 of the enclosure 20.

Figure 19:
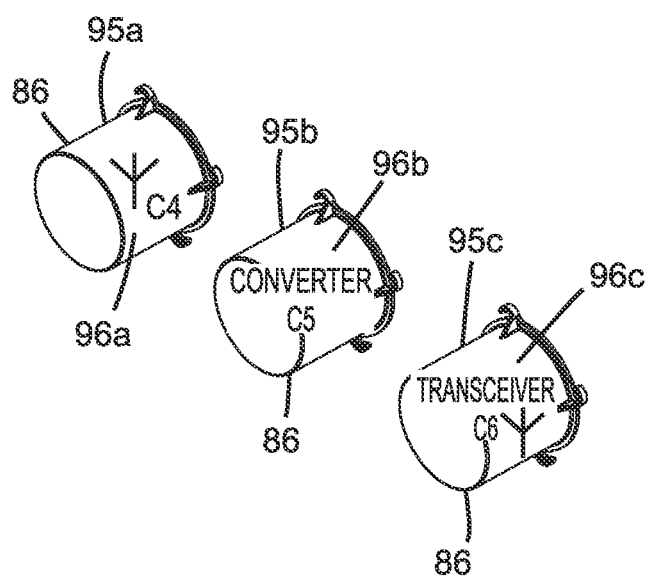
FIG. 19 depicts further add-on components in accordance with the principles of the present disclosure that can be attached to the main housing of FIGS. 1 and 2, the add-on components include active electronic devices.
Figure 20:
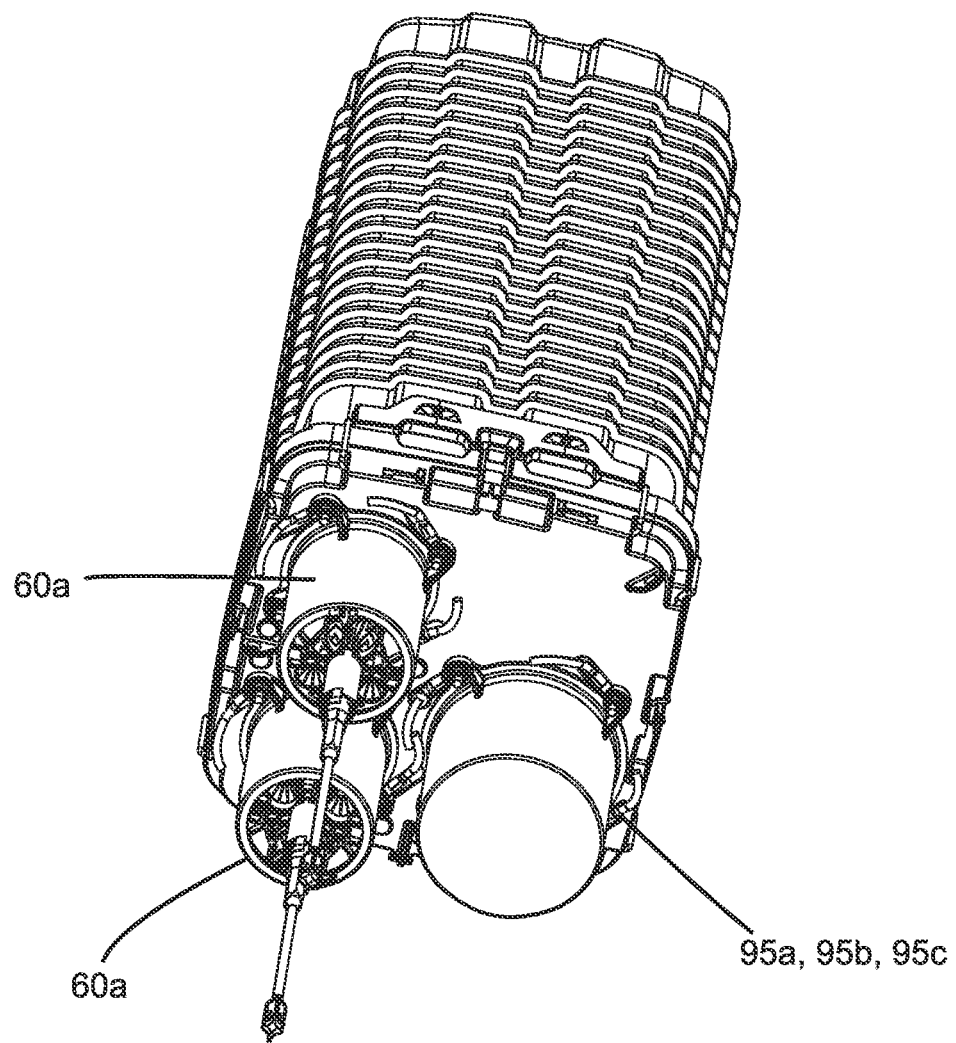
FIG. 20 depicts the enclosure of FIG. 2 with the larger sized cable sealing unit replaced with an active electronic device type add-on component.

Aspects of the present disclosure also relate to the ability to upgrade or customize a primarily optical enclosure 20 such as an optical splice enclosure with active electronic devices or with components used with active electronic devices. In certain examples, the active electronic devices or related devices can be added (e.g., using add-on components 60) without using space within a main housing 22 of the enclosure 20 without negatively affecting a primary functionality (e.g., high density splicing) of the enclosure. In this regard, FIG. 19 depicts add-on components 95a, 95b, 95c that can be sealably and detachably mounted at the access ports 36 of the enclosure 20. The add-on components 95a, 95b, 95c each include one of the canisters 86 including the mechanical connection form factor 65 adapted for connecting to the connection form factors 40 of the access ports 36. The add-on component 95a includes a radio antenna 96a which may include an array of conductors contained in the canister for radiating energy as electromagnetic waves and for intercepting radio waves. In such an example, the canister is made of a material transmissive to radio waves. Alternatively, canister can be eliminated and the array of conductors can be coupled to plate having the connection form factor 65. Leads of the antenna can extend through the access port when the connection form factors 40, 65 are coupled together. The add-on component 95b can include a converter 96b (e.g., optical-to-electrical converter, DC power converter, AC-DC power converter, etc.) within one of the canisters 86 with leads that extend through the access port when the connection form factors 40, 65 are coupled together. The add-on component 95c includes a wireless transceiver 96c within one of canisters 86 with leads that extend through the access port when the connection form factors 40, 65 are coupled together. In one example, the transceiver 96c couples to an antenna inside the canister 86. In such an example, the canister is made of a material transmissive to radio waves. In other examples, the transceiver connects to an antenna provided by another add-on module 95a connected to the enclosure or to another antenna separate from the enclosure. FIG. 20 depicts one of the components 95a, 95b, 95c mounted at one of the larger access ports 36 of the enclosure 20.

As used herein, a "wireless transceiver" is a device or arrangement of devices capable of transmitting and receiving wireless signals (e.g., wireless radio frequency signals) in support of a wireless communication technology (e.g., GSM, CDMA, UMTS, LTE, WiMax, WiFi, 5G NR, etc.). A wireless transceiver typically interfaces with an antenna for enhancing receiving and transmitting the wireless signals. Wireless coverage areas are defined around each of the wireless transceivers. Wireless coverage areas can also be referred to as cells (e.g., small cells, macro-cells, etc.) cellular coverage areas, wireless coverage zones, or like terms. Examples of and/or alternative terms for wireless transceivers include radio-heads, wireless routers, cell sites, wireless nodes, remote radio-heads, etc.

Figure 21:
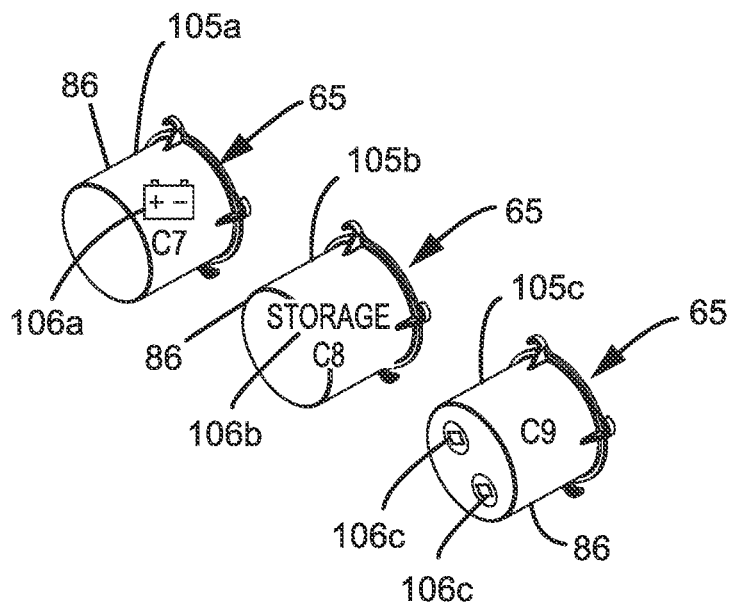
FIG. 21 depicts still further add-on components in accordance with the principles of the present disclosure that can be attached to the main housing of FIGS. 1 and 2.
Figure 22:
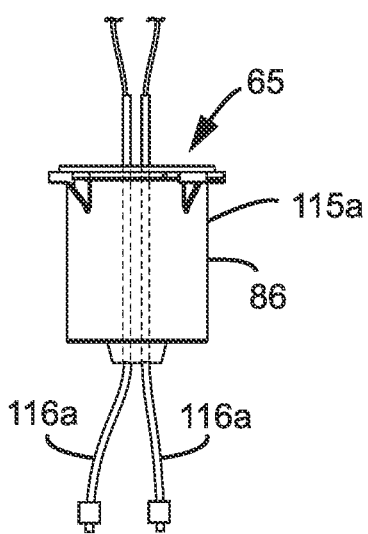
FIG. 22 depicts a further add-on component in accordance with the principles of the present disclosure that can be attached to the main housing of FIGS. 1 and 2, the add-on component includes fiber optic tethers/pigtails having ends terminated with hardened male or female optical connectors.
Figure 23:
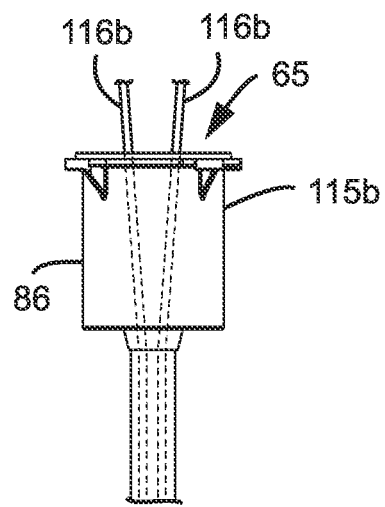
FIG. 23 depicts a further add-on component in accordance with the principles of the present disclosure that can be attached to the main housing of FIGS. 1 and 2, the add-on component includes blow fiber tubes that are arranged in sealed package and all optical fibers to be blown to or from a location such as a subscriber location.
Figure 24:
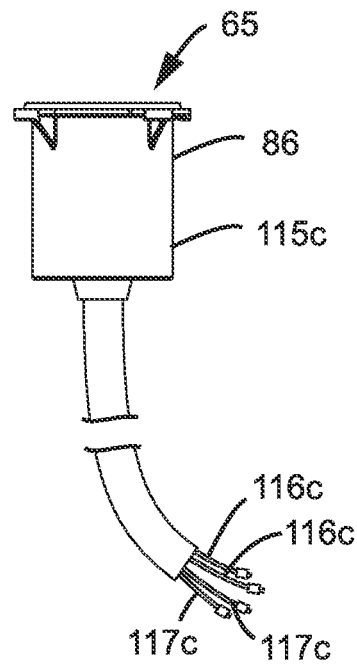
FIG. 24 depicts a further add-on component in accordance with the principles of the present disclosure that can be attached to the main housing of FIGS. 1 and 2, the add-on component includes a break-out cable having tethers for providing optical and power connections to a device such as a transceiver.
Figure 25:
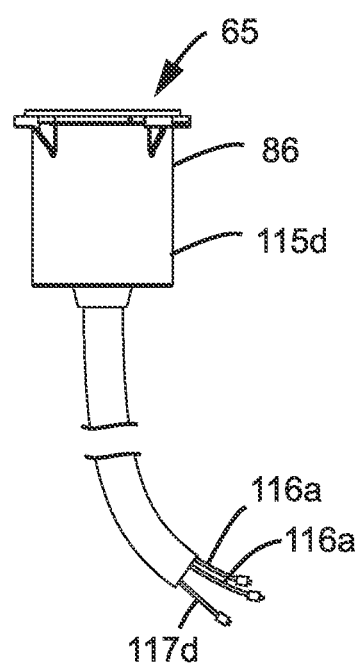
FIG. 25 depicts a further add-on component in accordance with the principles of the present disclosure that can be attached to the main housing of FIGS. 1 and 2, the add-on component includes another break-out cable having tethers for providing optical and power connections to a device such as a transceiver.

Aspects of the present disclosure also relate to the ability to upgrade or customize an enclosure such as an optical splice enclosure with other devices such as energy storage devices (electric batteries) or with other modules such as storage modules or hardened connectivity modules. In this regard, FIG. 21 depicts add-on components 105a, 105b, 105c that can be sealably and detachably mounted at the access ports 36 of the enclosure 20. The add-on components 105a, 105b, 105c each include one of the canisters 86 including the mechanical connection form factor 65 adapted for connecting to the connection form factors 40 of the access ports 36. The add-on component 105a includes a battery 106a capable of providing power to an active electronic component in the main housing, in the same canister as the battery or in another canister. The battery 106a can receive power from a solar cell (e.g., a solar cell on the canister or connected elsewhere to the enclosure) or other power source. The add-on component 105*b* includes a storage compartment 106*b* for storing items such as splice sleeves, seals, and enclosure mounting hardware. The add-on component 105*c* include hardened connector ports 106*c* form making hardened demateable fiber optic connection with hardened connector from outside the enclosure. The hardened connector ports 106*c* can be optically connected to optical fibers within the enclosure (e.g., optical fibers corresponding to fiber optic cables routed into the enclosure through one of the cable sealing add-on modules) such that drop lines terminated by hardened connectors can readily be connected to the optical fibers without requiring the enclosure to be opened.

FIGS. 22-25 depict add-on components 115*a*, 115*b*, 115*c*, 115*d* that can be sealably and detachably mounted at the access ports 36 of the enclosure 20. The add-on components 105*a*, 105*b*, 105*c* each include one of the canisters 86 including the mechanical connection form factor 65 adapted for connecting to the connection form factors 40 of the access ports 36. The add-on component 115*a* of FIG. 22 includes hardened optical pigtails 116*a* that are sealed with respect to the canister and that are terminated at free ends by hardened male or female demateable connection locations. The hardened optical pigtails 116*a* can be optically connected to optical fibers within the enclosure (e.g., optical fibers corresponding to fiber optic cables routed into the enclosure through one of the cable sealing add-on modules) such that drop lines terminated by hardened connectors can readily be connected to the optical fibers without requiring the enclosure to be opened by mating with the hardened male or female demateable connection locations. The add-on component 115*b* of FIG. 23 includes blown fiber tubes 116*b* that are sealed with respect to the canister and allow conduits for optical fiber to be blow into or outwardly from the enclosure. The add-on components 115*c*, 115*d* include tethers (e.g., jumpers) adapted for coupling to transceivers. In certain examples the components can include optical breakouts with optical fiber pigtails terminated by hardened or non-hardened connectors. In certain examples, the assemblies can be hybrid and can include both optical fibers and electrical conductors. In certain examples, the electrical conductors can be connectorized or not connectorized. In certain examples, hybrid connectors having both optical and electrical connection interfaces can be provided. The add-on component 115*c* includes a cable assembly including a breakout including connectorized power pigtails 116*c* and fiber optic pigtails 117*c* connectorized by hardened single fiber connectors. The add-on component 115*d* includes a cable assembly including a breakout including connectorized power pigtails 116*d* and a fiber optic pigtails 117*d* connectorized by a hardened multi-fiber connector (e.g., a duplex fiber optic connector having one or 2 ferrules or a fiber optic connector including more than 2 optical fibers supported by a ferrule.)

In certain examples, hardened demateable connections in accordance with the principles of the present disclosure can include sealed optical connection locations providing connections that can withstand axial pull-out forces equal to or greater than 25 pounds or 50 pounds. In certain examples mechanical fastening can be provided by turn to secure fasteners such as threaded fasteners, bayonet-style fasteners or other turn to interlock fastening arrangement. In other examples, mechanical fastening can be provided by slide clips or other structures.

Generally, a hardened port is adapted to receive a hardened fiber optic connector with sealing provided so that the port is environmentally sealed when the fiber optic connector is secured therein. In certain examples, environmental seals for providing such sealing are carried with the fiber optic connector, provided at the port, or both. Generally, a hardened port has a robust turn-to-secure securement interface such as a threaded interface or a bayonet-type interface that interlocks with a mating interface provided on a fastening element of the hardened fiber optic connector for retaining the fiber optic connector in the port. In another example, a slide-clip can be used to secure a hardened connector within a hardened port. Typically, when the hardened fiber optic connector of a drop cable is inserted within a hardened port, the fiber optic connector of the drop cable optically connects to a corresponding fiber optic connector aligned with the hardened port.

Figure 26:
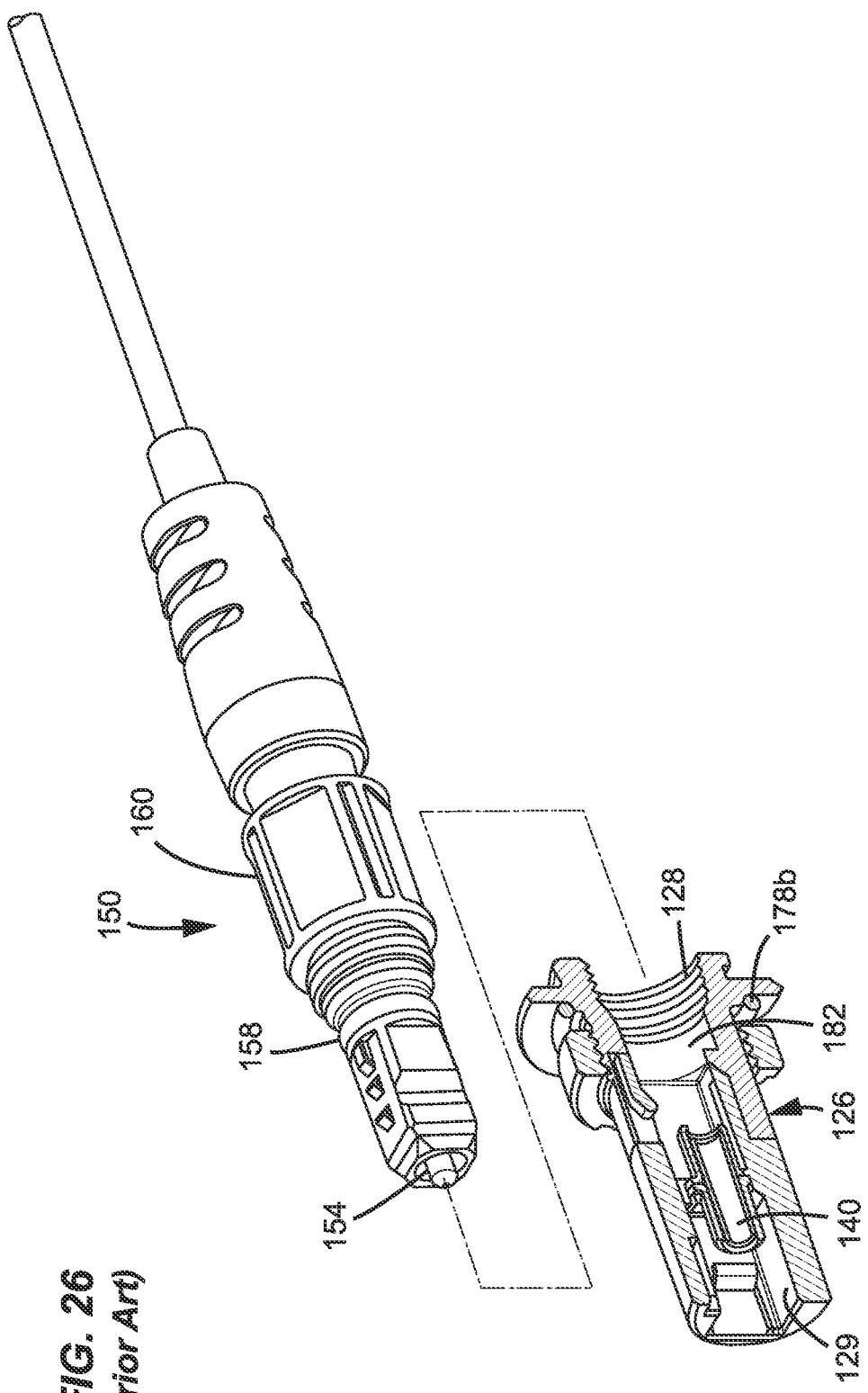
FIG. 26 is a partial cross-sectional view of an example demateable hardened optical connection interface.
Figure 27:
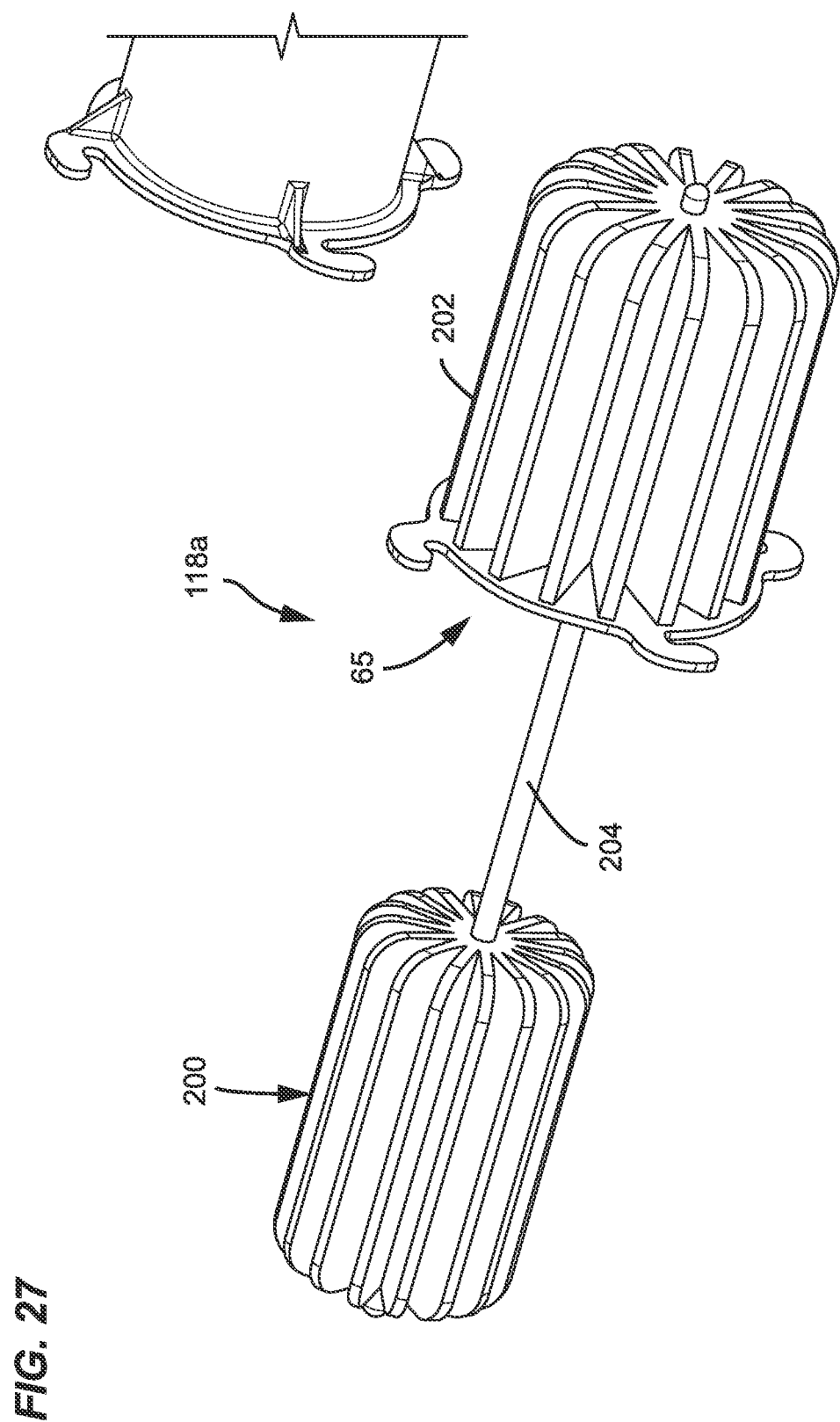
FIG. 27 depicts a further add-on component in accordance with the principles of the present disclosure that can be attached to the main housing of FIGS. 1 and 2, the add-on component includes structure for transferring heat from the interior of the main housing to provide cooling of the enclosure.
Figure 28:
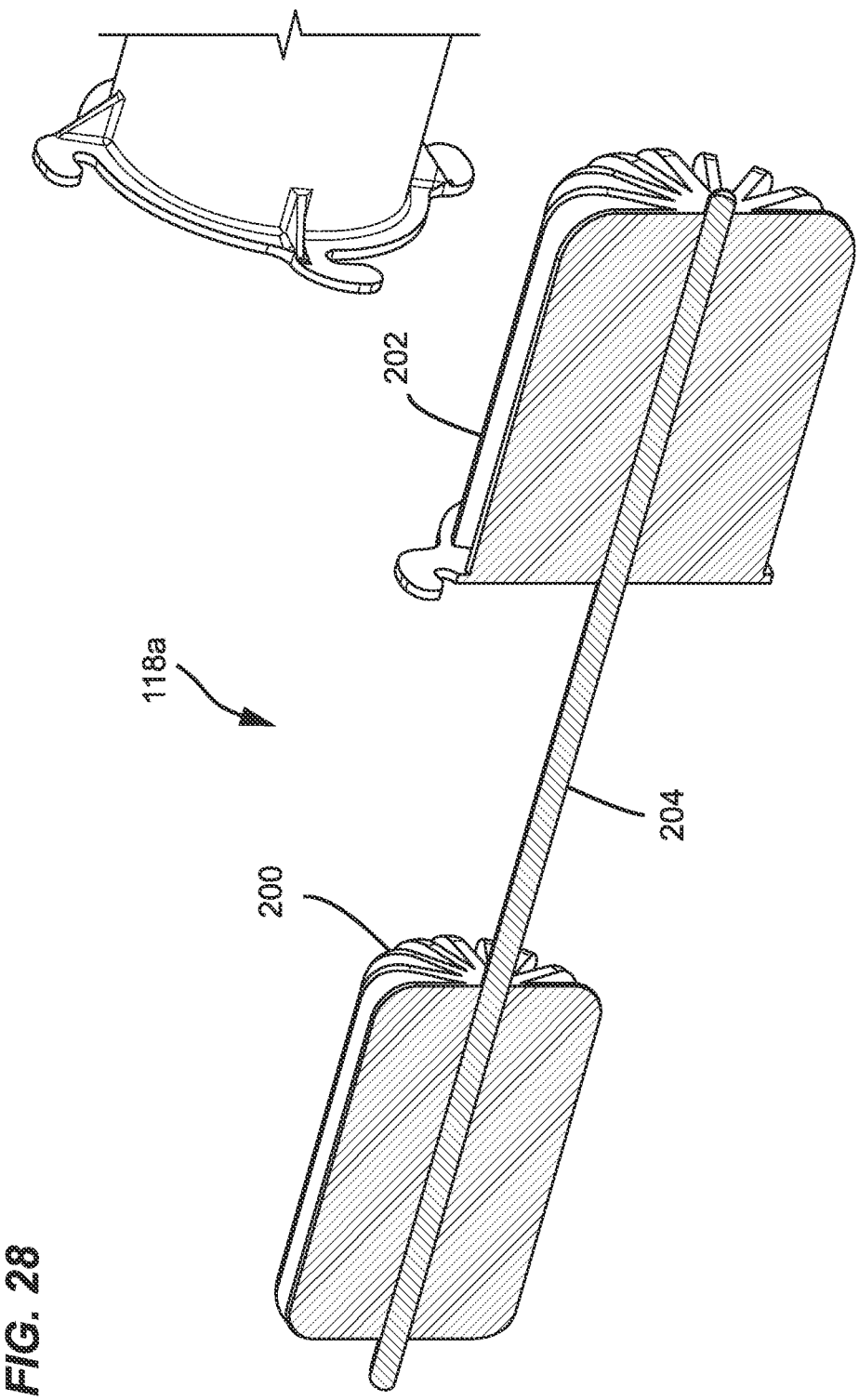
FIG. 28 is a cross-sectional view of the add-on component of FIG. 27.
Figure 29:
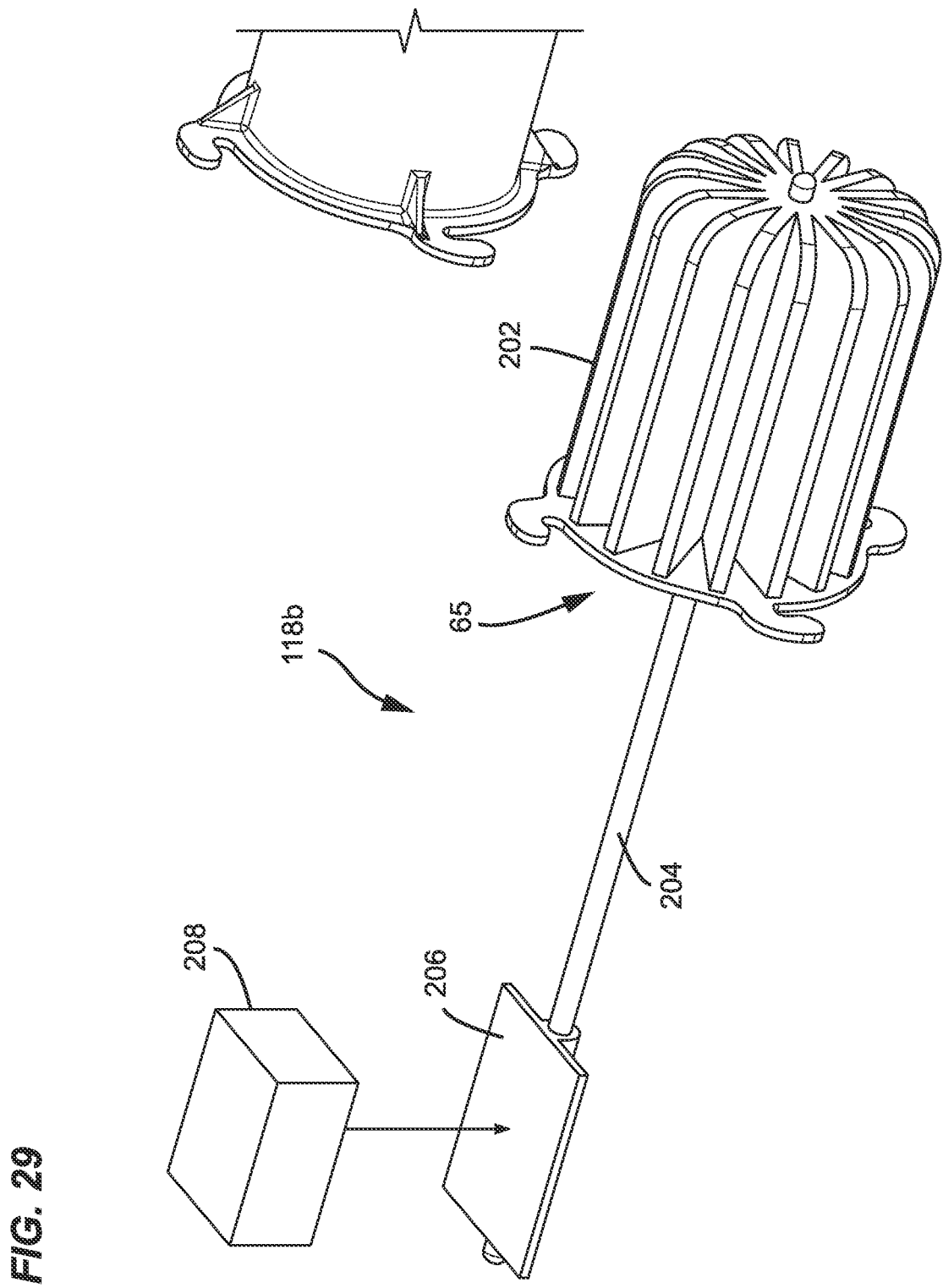
FIG. 29 depicts a further add-on component in accordance with the principles of the present disclosure that can be attached to the main housing of FIGS. 1 and 2, the add-on component includes structure for transferring heat from a heat source in the interior of the main housing to provide cooling of the enclosure.
Figure 30:
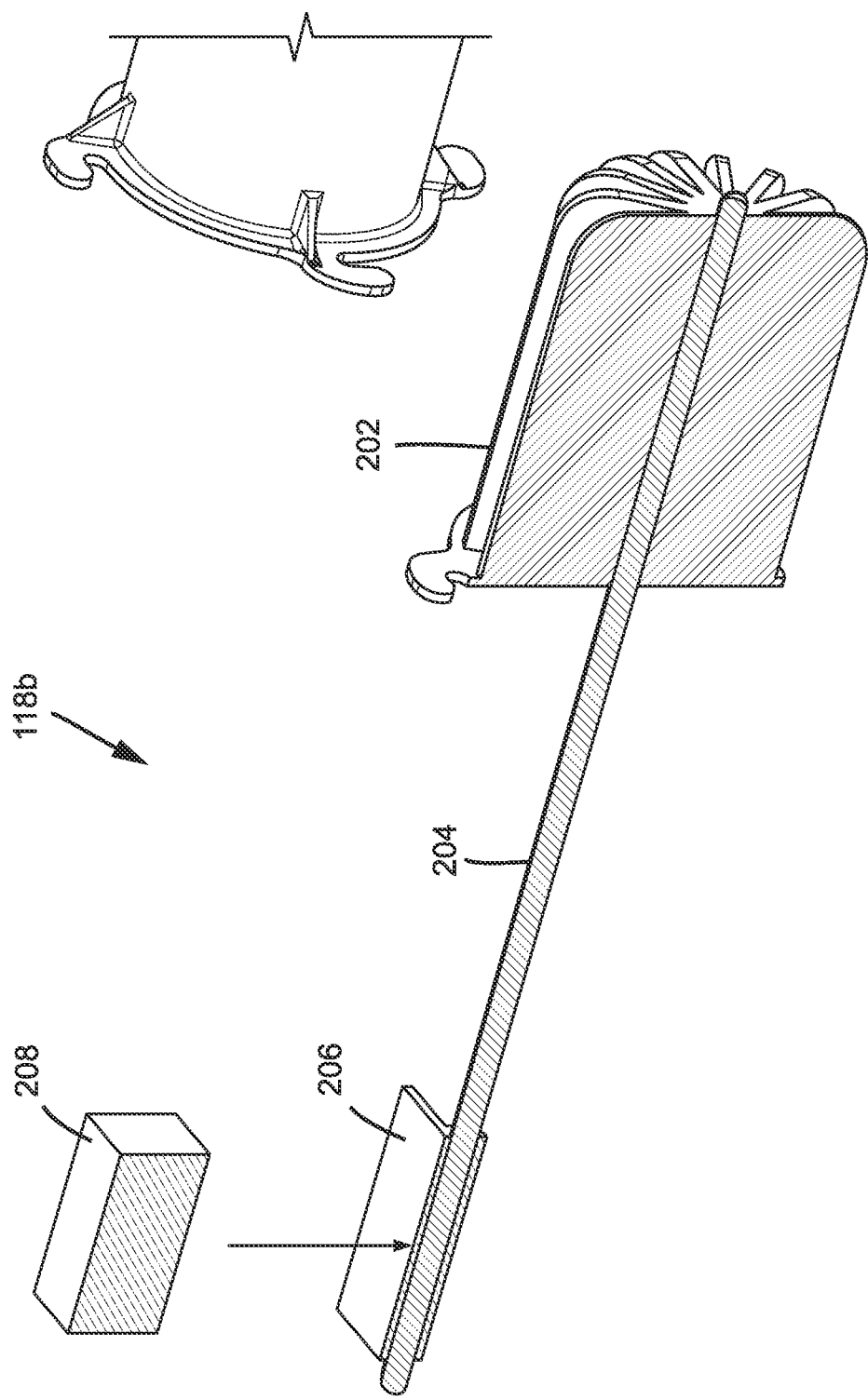
FIG. 30 is a cross-sectional view of the add-on component of FIG. 29.
Figure 31:
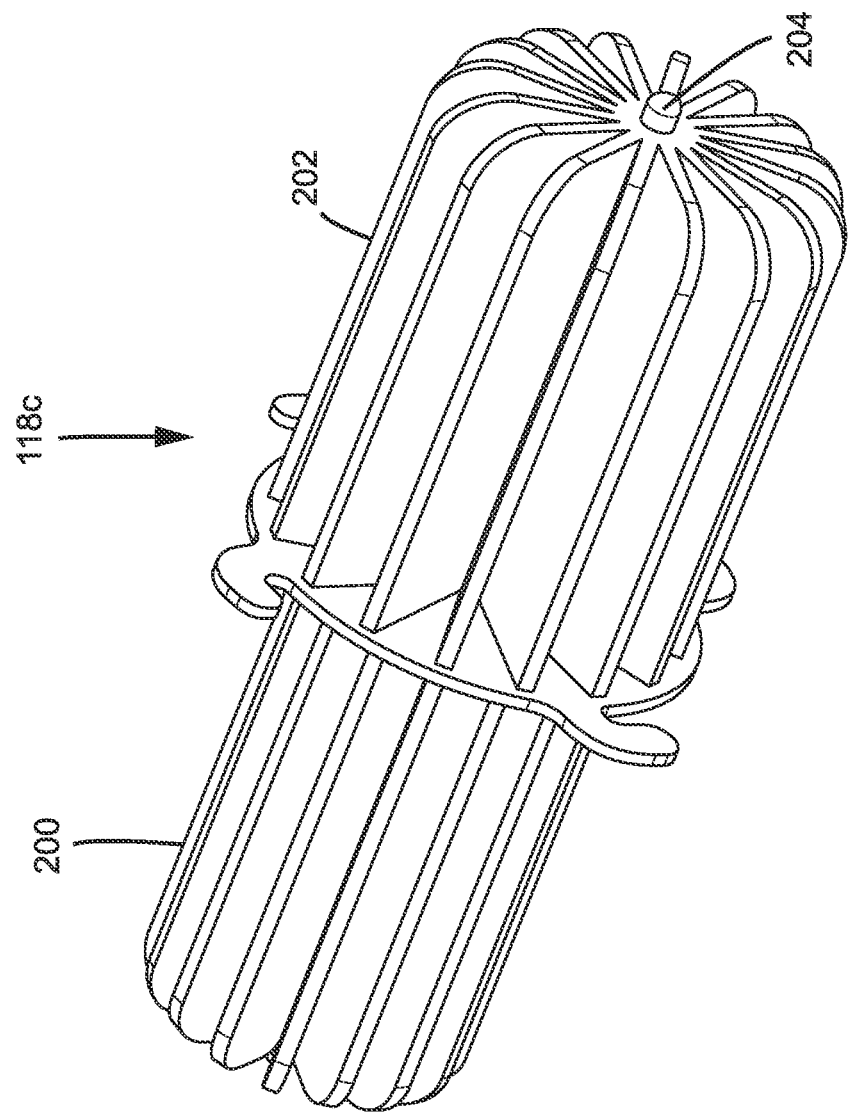
FIG. 31 depicts a further add-on component in accordance with the principles of the present disclosure that can be attached to the main housing of FIGS. 1 and 2, the add-on component includes further structure for transferring heat from the main housing to provide cooling of the enclosure.

FIG. 26 shows an example configuration for a hardened fiber optic adapter 126 that is one example of a way to provide a hardened port. The adapter 126 is adapted to be mounted in sealed relation relative to a housing such as a canister, a cable-mounted housing that is secured at the end of cable, or other type of housing. The hardened fiber optic adapter includes an outer hardened port 128 for receiving a hardened fiber optic connector 150. Either the adapter 126 or the connector 150 preferably has a seal for providing environmental sealing between the adapter 126 and the connector 150 when the connector 150 is inserted in the hardened port 128. As depicted, the connector 150 includes a seal 158 that seals against a sealing surface 182 of the outer port 128 when the connector 150 is inserted therein. The connector 150 also includes a twist-to-secure fastener 160 (e.g., a threaded fastener, a bayonet-style fastener or other structure) that interlocks with a corresponding twist-to-secure fastening arrangement (e.g., threads or bayonet configuration) provided on the adapter 126 to secure the connector 150 within the outer port 128. The adapter 126 also includes internal alignment sleeve 140 for aligning a ferrule 154 of the optical connector 150 with a ferrule of a fiber optic connector that is loaded within an internal port 129 (e.g., a port that is inside a protective housing in which the adapter is integrated or to which the adapter is mounted) of the adapter 126. In this way, when the connectors are loaded in their respective ports, their ferrules are aligned and an optical connection is made between optical fibers supported by the ferrules.

Example hardened fiber optic ports and hardened fiber optic connectors are disclosed by U.S. Pat. Nos. 9,557,493; 7,568,844; 9,122,021; 7,264,402; and 7,744,288, which are hereby incorporated by reference in their entireties. It will be appreciated that hardened demateable connection interfaces in accordance with the principles of the present disclosure can include ports and/or connectors and/or interfaces that are compatible with any of the adapters or connectors disclosed in the above patents.

Another aspect of the present disclosure relates to devices and methods for dissipating heat and providing cooling of telecommunication enclosures. In certain examples, enclosures in accordance with the present disclosure are primarily designed for passive optical applications and therefore are not equipped to provide effective cooling of the enclosures. Certain aspect of the present disclosure relate to adding add-on components with active electronic devices to fiber optic enclosures. The addition of such active electronics can cause the generation of heat within the enclosure which it is desirable to dissipate. Therefor aspects of the present disclosure relate to the use of add-on components having heat transfer capabilities for use in cooling telecommunication enclosures.

FIGS. 27-31 show add-on components in the form of heat transfer/dissipation devices 118a-118c (e.g., a cooling device) each adapted to be mounted at one of the access ports 36 to provide heat transfer out of the enclosure for cooling purposes. Each of the heat transfer devices 118a-118c includes a plate including the mechanical and sealing connection form factor 65 which complements the mechanical and sealing connection form factor 40 corresponding to the access ports 36. The heat transfer devices 118a, 118c of FIGS. 27, 28 and 31 each include an inner high surface area heat transfer array 200 (e.g., an array of heat conductive (e.g., metal) fins that can be arranged in a radial array) and an outer high surface area heat transfer array 202 (e.g., an array of heat conductive (e.g., metal) fins that can be arranged in a radial array). A heat pipe 204 thermally connects the two arrays 200, 202 via a highly thermally conductive pathway and is thermally connected to each of the arrays 200, 202. The outer arrays 202 have axial ends that attached to the plate including the form factor 65. When the devices 118a, 118c are mounted at the access ports 36, the inner arrays 200 are inside the enclosure 20 and the outer arrays 202 are outside the enclosure 20. The inner arrays 200 direct heat from within the enclosure 20 to the heat pipes 204 which convey the heat to the outer arrays 202. The heat is then transferred from the outer arrays 200 to the ambient environment. The devices 118a, 118c have the same configuration, except the arrays 200, 202 are spaced from one another in the device 118a and the arrays 200, 202 are directly adjacent to one another in the device 118c. The heat transfer device 118b of FIGS. 29 and 30 includes the plate defining the form factor 65, the outer array 202 attached to the plate, and the heat pipe 204 thermally connected to the outer heat transfer array 202. However, rather than having an inner heat transfer array 200, the device 118b includes a thermally conductive pad 206 thermally coupled to the heat pipe 204. A heat generating component 208 (e.g., an active electronic component) mounts on the pad 206 such that heat from the component 208 is transferred directly through the pad 206 to the heat pipe 204. The heat pipe conducts the heat from the pad to the outer heat transfer array 202 which transfers the heat to the ambient air surrounding the outer heat transfer array.

It will be appreciated that the various add-on components disclosed herein include add-on housings (e.g., sleeves 62, canisters 86) that are positioned outside the main housing 22 when the add-on components are mounted to the main housing at the access ports 36. Aspects of the present disclosure relate to providing visual identifiers with the add-on housings which are readily visible from outside the main housing 22 when the add-on housings are mounted to the main housing 22. In certain examples, the visual identifiers function as a customer or service provider identifiers. Such identifiers are particularly useful for cable sealing add-on components where different visual identifiers are used to differentiate between different sets of service provider cables at a demarcation location where service is handed-off between two or more service providers. Similarly, such visual identifiers can be used to identify different sets of customer cables and/or different sets of service provider cables routed to one enclosure where multiple service providers are capable of providing service to different or the same customers through optical connections at the same enclosure. In certain examples, the visual identifiers functions to identify a function of each add-on component, and each of the add-on components has a different visual identifier. For example, each of the add-on components 85a, 85b, 85c, 95a, 95b, 95c, 105a, 105b and 105c can have a different or unique exterior visual identifier which is indicative of a function of the add-on components. This is advantageous since the housings of the add-on components, in certain examples, would look the same but for the visual identifiers. In certain examples, the visual identifiers are provided by markings, symbols, numbers or colors integrated with or applied to the add-on housing. The visual identifiers can be applied to the add-on housings by sticker, printing, painting, or the like. In certain examples, the add-on housings are molded plastic parts molded of material having different colors which function as the visual identifiers. Referring to FIG. 16, the add-on components 85a-85c can respectively have canisters with different outer visual identifiers such as different colors C1-C3. Referring to FIG. 19, the add-on components 95a-95c can respectively have canisters with different outer visual identifiers such as different colors C4-C6. Referring to FIG. 21, the add-on components 105a-105c can respectively have canisters with different outer visual identifiers such as different colors C7-C9.

Figure 32:
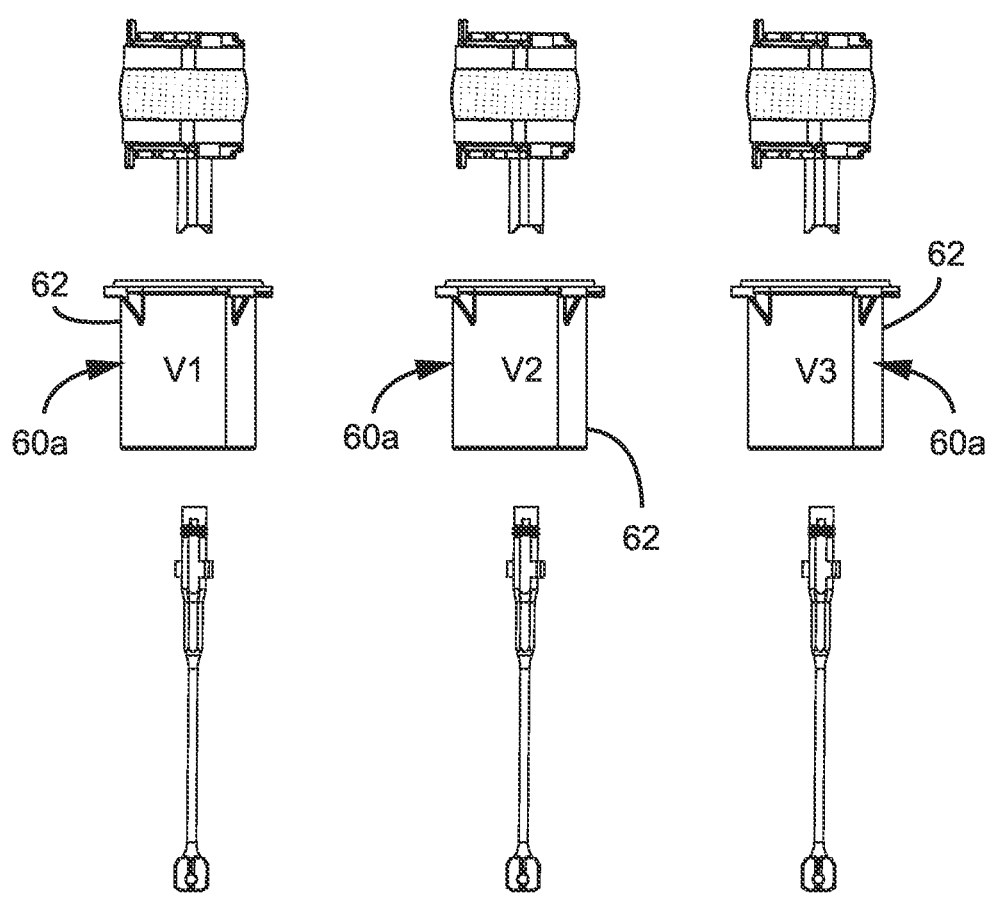
FIG. 32 depicts a number of cable sealing add-on components having visual identification.

FIG. 32 shows three of the add-on components 60a sleeves 62 having different exterior visual indicators V1-V3 of the type described above. The sleeves 62 are the same but for the visual indicators V1-V3. In one example, the visual indicators do not provide a mechanical function and are provided only for identification. In one example, the visual indicator V1 represents a standard indicator (e.g., the sleeve 62 is black in color) for normal cable sealing applications where service provider or customer identification is not needed. In one example, visual indicators V2 and V3 represent custom indicators (e.g., non-standard colors such as blue, green, orange, red, yellow, etc.) which can be used to identify particular service providers (e.g., a color can be universally assigned to each main service provider) or to distinguish between service providers (e.g., the sue of different colors indicates the presence of different service providers at a particular closure, but the colors may not be universally assigned to particular service providers). In other implementations, the visual indicators V1-V3 may include labels 198 mounted to exteriors of the sleeves 62 (e.g., see FIG. 43). The labels 198 may include color indicia, text indicia, numerical indicia, or barcode or QR code indicia. In certain implementations, a label 198 may include an RFID tag or other such transceiver. In some examples, the labels 198 are removably mountable to the sleeves 60. In other examples, the labels 198 are not removable (without breaking the label or sleeve) once mounted.

Figure 33:
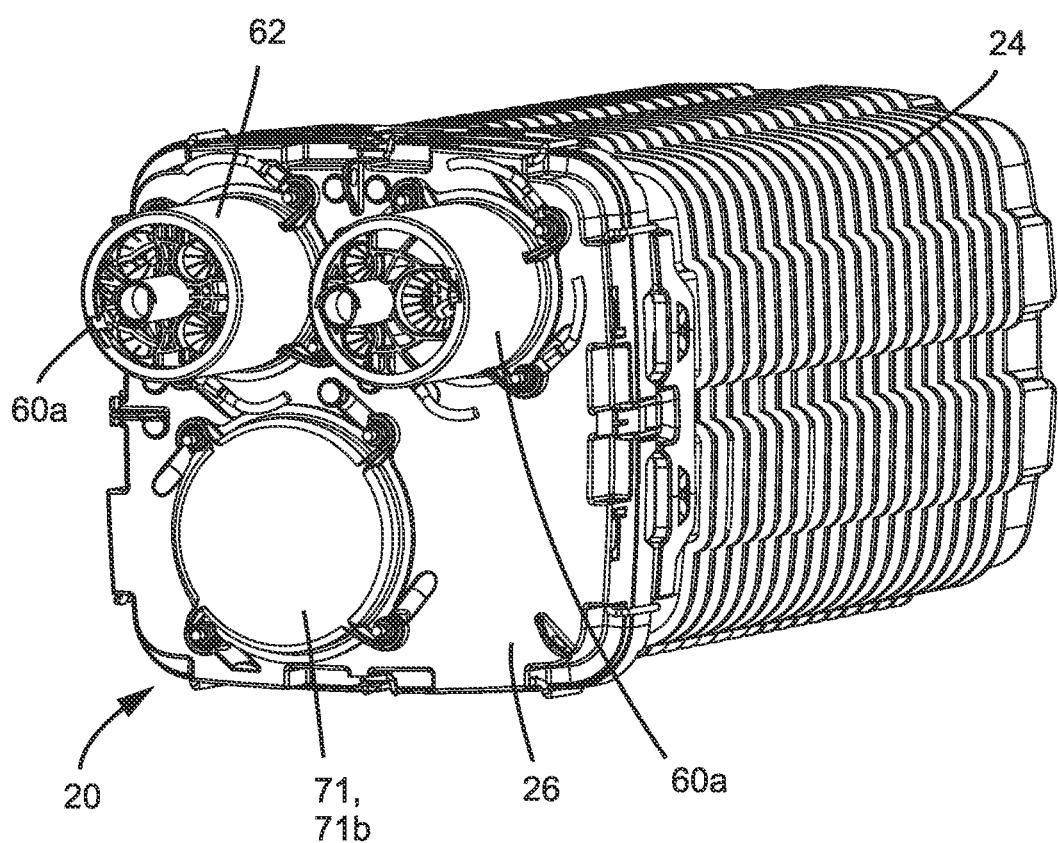
FIG. 33 shows a bottom perspective view of the communications enclosure of FIG. 1 with various add-on features.

In certain implementations, a blank cover 71 can be mounted over a respective one of the access ports 36. FIG. 15 shows one of the two access ports 36 with the same cross-dimension with one having a blank cover 71a over the top of it and the other with a heat shrink sleeve 75 over the top of the add-on component sleeve 62 and the access port 36 with a different cross dimension D2 with a cable pass-through sleeve 136 over the access port 36. In certain implementations, the blank cover 71a has a connection form factor 65 that engages the connection form factor 40 of the smaller access opening 36. FIG. 33 shows two of the add-on components 60a separately mounted in sealed relation to the end piece 26 at the two smaller access openings 36 via connections between the connection and sealing form factors 40, 65. The larger access opening 36 is covered by a block cover 71b having a connection form factor 65 that engages the connection form factor 40 of the larger access opening 36.

Figure 35:
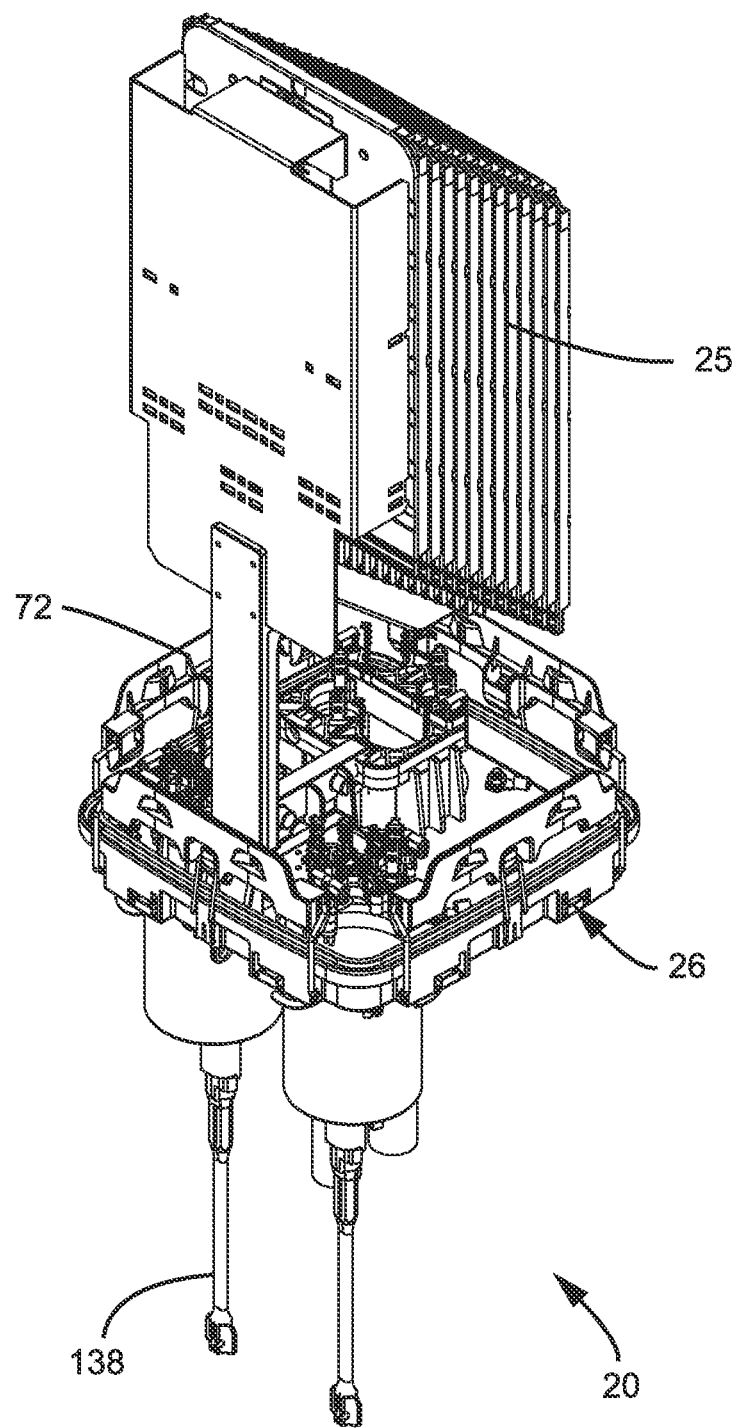
FIG. 35 and FIG. 36 show perspective views of the communications enclosure of FIG. 1 with a housing removed.
Figure 36:
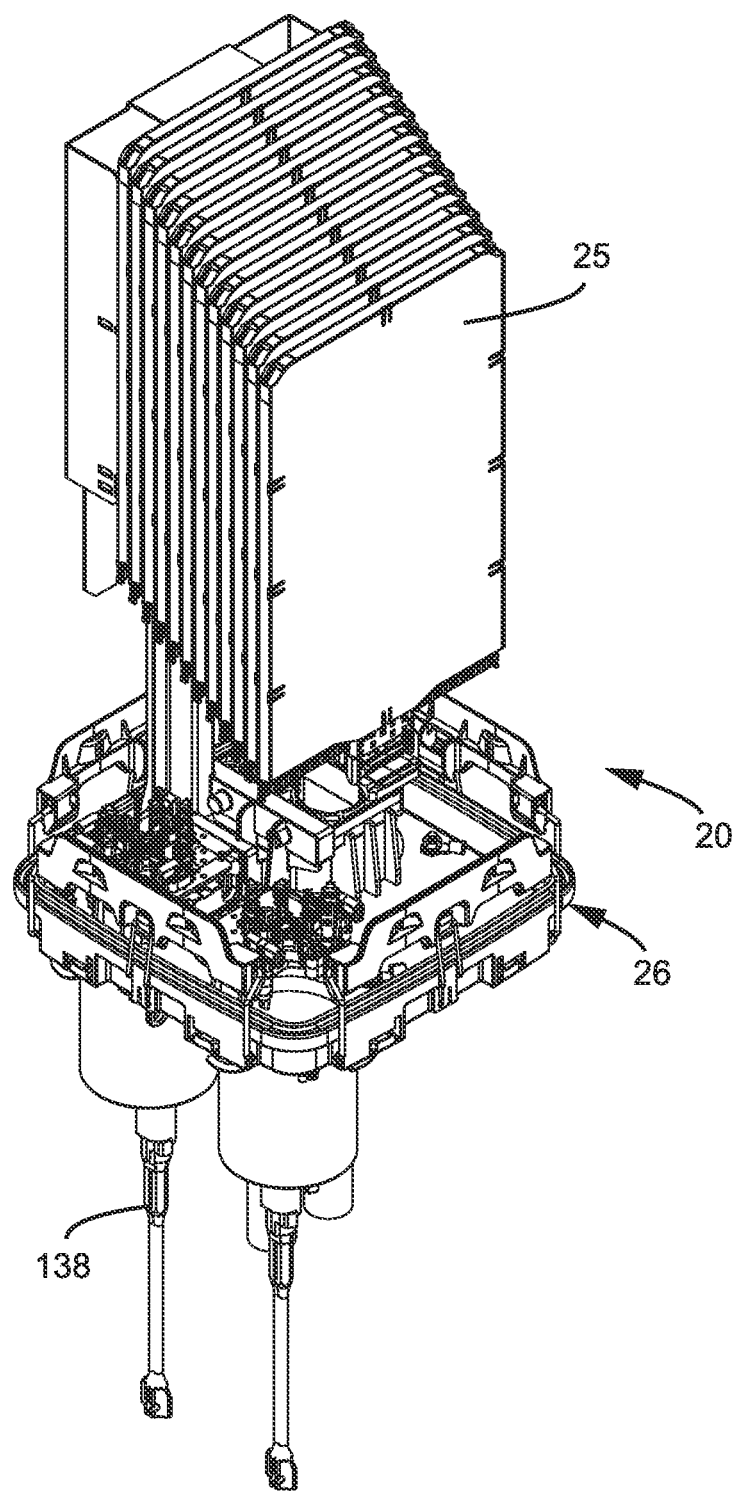

FIGS. 35 and 36 show the communications enclosure 20 with the housing removed. FIG. 35 shows the fiber optic organizer 25 in a first position. The fiber optic organizer 25 includes a plurality of trays 70 for holding fiber optic splices and for managing optical fibers corresponding to the optical splices. The fiber optic organizer 25 also includes a tower 72. The splice trays 70 are pivotally connected to the tower 72. FIG. 36 shows the fiber optic organizer 25 in a second position. The second position is the ninety degrees from the first position.

In certain implementations the tower 72 is mounted to the end piece 26 using one or more fasteners (e.g., screws, bolts, etc.). In other implementations the tower 72 is mounted to the end piece 26 using latches. In still other implementations the tower 72 can have a friction fit with the end piece 26. In some implementations, the first and second tower positions are indicated (e.g., visually marked) on the end piece 26. In accordance with other aspects of the present disclosure, a communication (e.g., telecommunications) enclosure 20 functions as a fiber distribution hub 300.

Referring to FIGS. 37-42, an optical connection field 312 is disposed within the interior 310 of the enclosure 300. The optical connection field 312 includes a plurality of optical adapters 314 that each define first and second oppositely facing ports. The hub enclosure 300 extends between opposite first and second ends 302, 304. The enclosure 300 includes a base 306 defining the first end 302 and a cover 308 defining the second end 304. The base 306 and cover 308 cooperate to form a main housing defining an interior 310 in which communication components are disposed. In the example shown in FIGS. 37-39, the cover 308 is a dome-style cover.

In certain implementations, the cover 308 is detachably mounted to the base 306. In the example shown, the domed cover 308 defines an open end at which the base 306 releasably attaches. In some implementations, the cover 308 is latched to the base 306. In other implementations, the cover 308 is clamped to the base 306 using movable clasps. In other implementations, the cover 308 is threaded onto the base 306. In certain examples, the cover 308 includes a pivoting door that provides access to the interior 310 without removing the cover 308 from the base 306 (e.g., see FIG. 38).

In certain implementations, the enclosure 300 provides a connection point between one or more feeder cables 320 from a service provider and one or more distribution cables 330 routed towards various end users. Optical plug connectors 226 terminating either feeder cable fibers 322 or intermediate fibers 324 optically coupled to the feeder cable 320 are plugged into the first ports of the optical adapters 314. Optical plug connectors 336 terminating optical fibers 332 of the distribution cable(s) 330 (e.g., or intermediate fibers coupled thereto) are plugged into the second ports of the optical adapters 314. Accordingly, the distribution cable(s) 330 are optically coupled to the feeder cable(s) 320. In some implementations, the optical plug connectors 326, 336 are single-fiber connectors, such as LC plug connectors or SC plug connectors. In other implementations, the optical plug connectors 326, 336 are multi-fiber connectors, such as MPO plug connectors.

Figure 37:
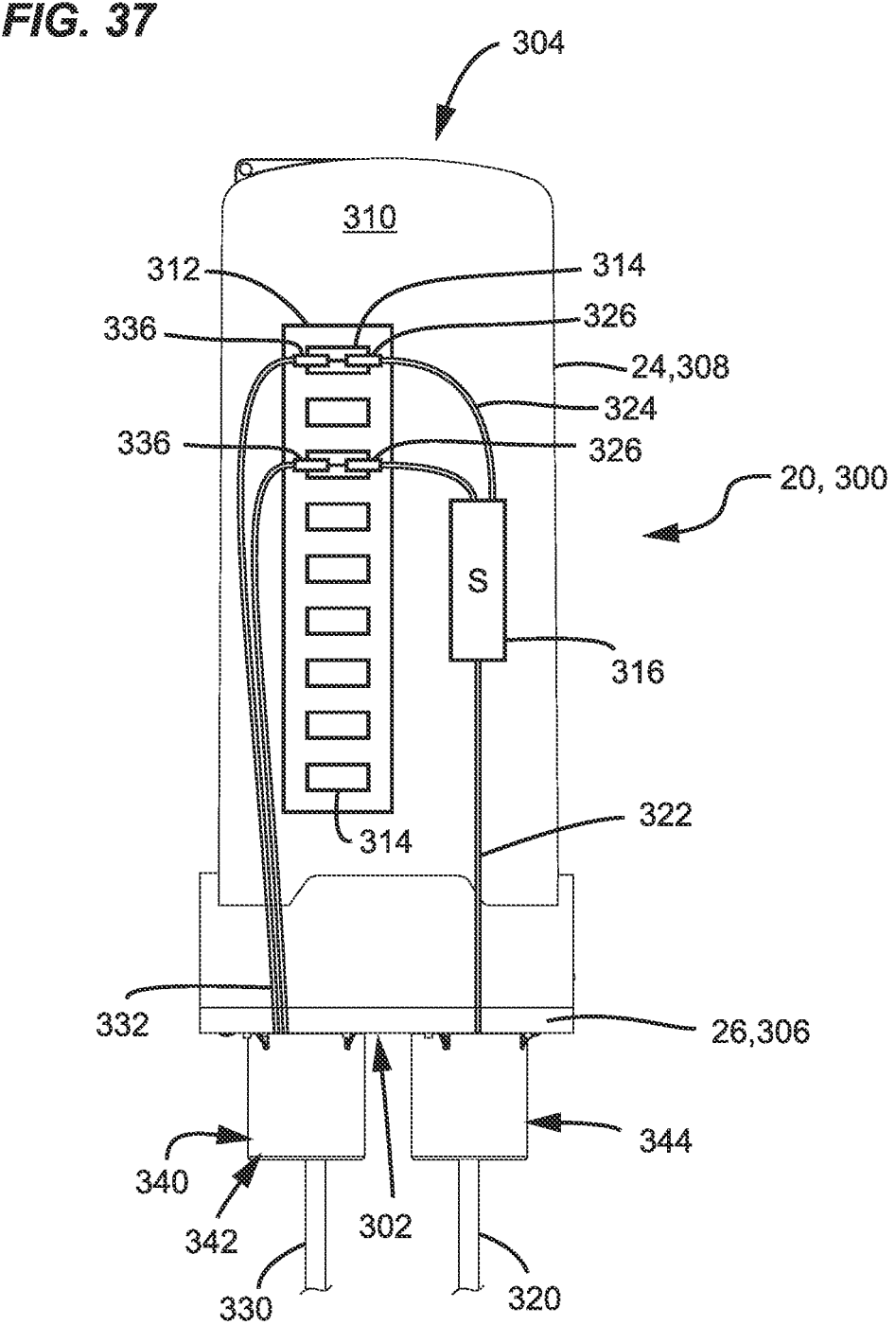
FIG. 37 is a schematic diagram of an example enclosure forming a fiber distribution hub, the enclosure including a plurality of add-on components including a cable breakout assembly.
Figure 38:
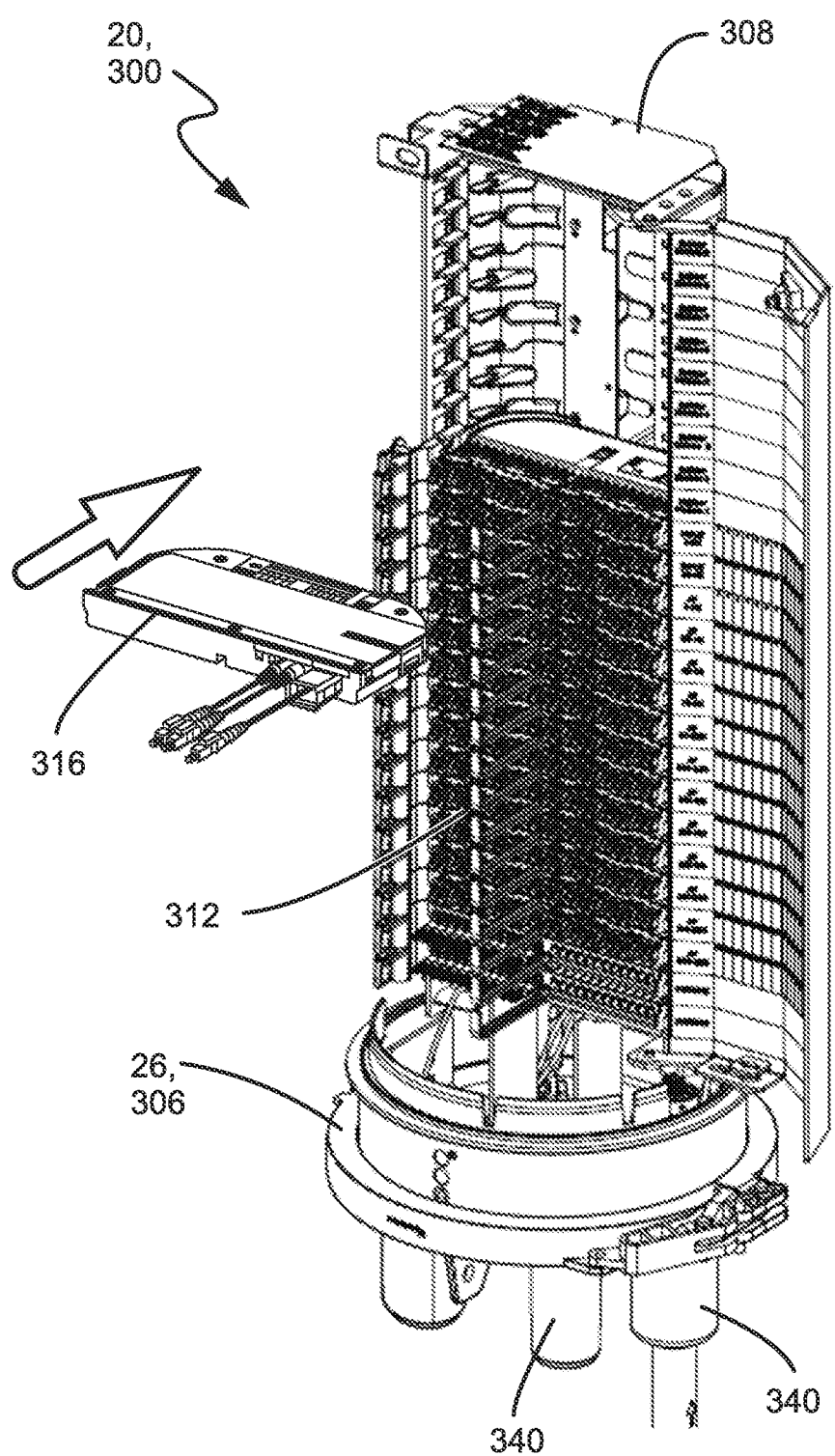
FIG. 38 is a perspective view of an example enclosure including a cover detachably and sealingly connected to a base.
Figure 39:
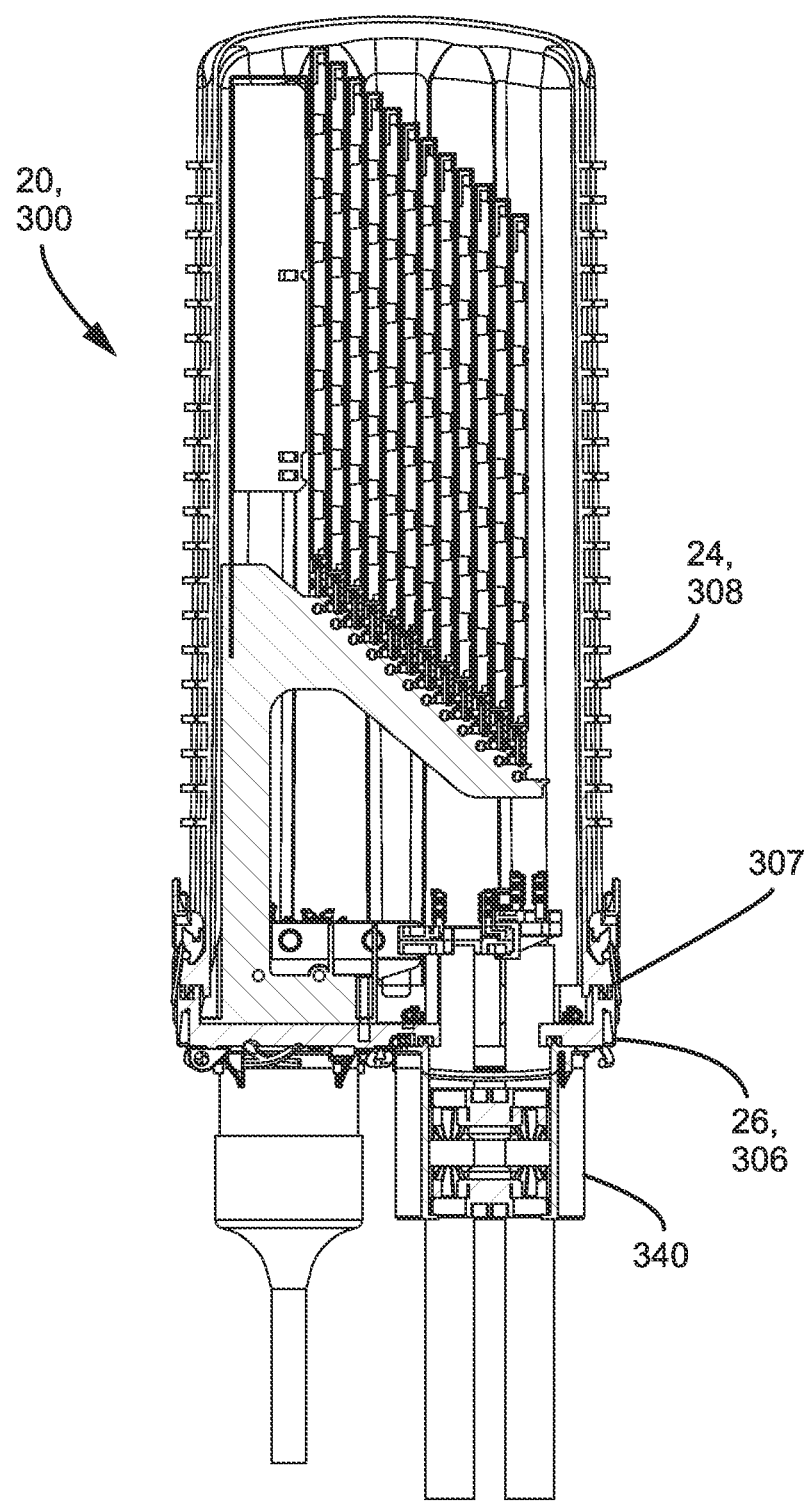
FIG. 39 is a cross-sectional view of an example enclosure including a cover detachably and sealingly connected to a base and an add-on component detachably and sealingly connected to the base, the enclosure forming a spliced connection point.

In some implementations, the optical adapters 314 are mounted at a panel disposed within the enclosure interior 310 (e.g., see FIG. 37). In other implementations, the optical adapters are disposed at modules or cassettes mounted within the enclosure interior 310 (e.g., see FIG. 38). As the term is used herein, a "module" refers to a body supporting one or more adapters defining front ports and one or more adapters defining one or more rear ports. The adapters defining the front ports are optically coupled to the adapters defining the rear port by optical circuitry within the body. As the term is used herein, a "cassette" refers to a body supporting one or more adapters defining front ports. A cable is routed into the body and connectorized ends of the cable are plugged into rear ports of the adapters.

In certain implementations, one or more optical splitters 316 (e.g., passive optical splitters such as optical power splitters, wave division multiplexers, etc.) optically couple the optical plug connectors 326 to the feeder cable(s) 320. For example, one or more fibers 322 of the feeder cable(s) 320 can be routed to an input of the one or more optical splitter 316. Each optical splitter 316 splits optical signals carried over the feeder cable fiber(s) 322 and outputs the split optical signals onto a plurality of intermediate fibers (e.g., connectorized pigtails) 324. The optical plug connectors 326 terminate the connectorized pigtails 324. In some examples, the optical splitter(s) 316 are disposed within the interior 310 of the enclosure 300. In other examples, the optical splitter(s) 316 are disposed within an add-on component 60, 340 (described in more detail herein) mounted to the enclosure 300 and accessible from the interior 310 of the enclosure. In other examples, one or more feeder cable fibers can be terminated by optical plug connectors 326 without being split.

In certain implementations, other optical components can be mounted within the enclosure 300. For example, fiber management and/or routing components (e.g., spools, bend radius limiters, retention fingers, guides, etc.) may be disposed within the enclosure 300. One or more splice trays holding optical splices can be mounted within the enclosure 300 (e.g., see FIG. 39). In some examples, the optical splices can be used in place of the optical adapters 314 to optically couple fibers within the enclosure 300. In other examples, the optical splices may couple unconnectorized feeder cable fibers 322 to connectorized pigtails or splitter input pigtails. Similarly, the optical splices may couple unconnectorized distribution cable fibers 332 to connectorized pigtails terminated by the plug connectors 336. In other examples, optical-to-electrical converters may be disposed within the enclosure 300.

Figure 40:
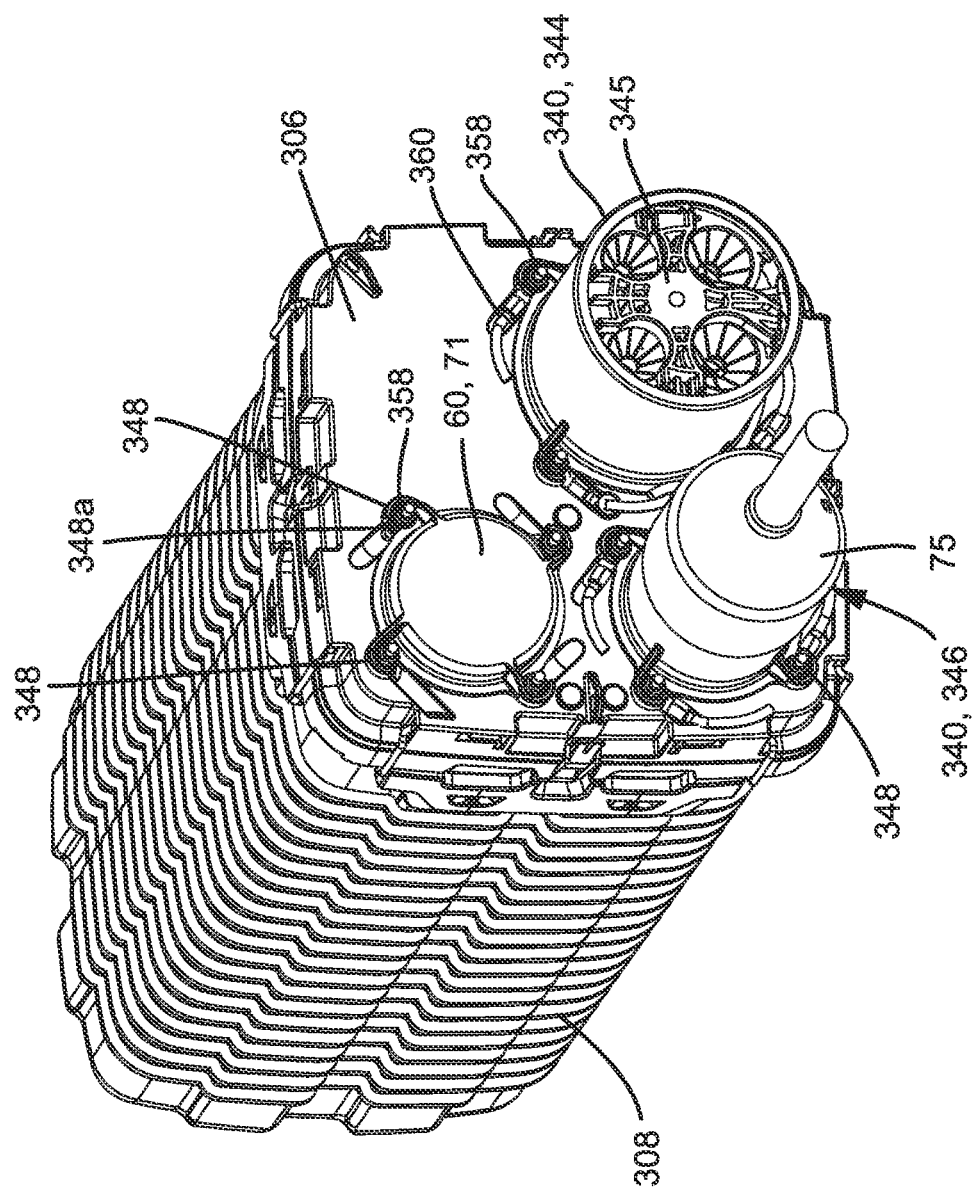
FIG. 40 shows a bottom perspective view of an example enclosure to which three different types of add-on components are mounted at the access ports.

Referring to FIGS. 37 and 40, one or more add-on components 340 can be detachably coupled to the base 306 at the access ports 315 with the access port gaskets 347 providing sealing between the base 306 and the add-on components 340. Various types of add-on components 340 can be mounted to the base 306. For example, one type of add-on component 340 includes a blank cover 71 that extends across the respective access port 315 to block access to the interior 310 of the enclosure 300 when the access port 315 is not needed. Other types of add-on components 340 define secondary interiors that join with the interior 310 of the main housing. In some examples, the secondary interiors can be closed at an end distal from the main housing to define a secondary interior accessible only from within the interior 310 of the enclosure 300 in which various components (e.g., splitter(s) 316) can be disposed. One or more optical splitters 316, a battery, a transceiver and/or antenna, a heat distributor, or other desired component can be housed within the add-on component 340. Example add-on components 340 forming secondary interiors are disclosed in U.S. Application No. 63/012,776, filed Apr. 20, 2020, titled "Fiber Optic Enclosed with Ability to Customerize and/or Upgrade," the disclosure of which is hereby incorporated herein by reference in its entirety.

In other examples, one or more cables can be routed through the secondary interior of an add-on component. For example, one example type of add-on component 340 includes a cable sealing sleeve 344 for sealing cables (e.g., feeder cables, distribution cables, etc.) entering the enclosure 300. The cable sealing sleeve 344 includes an outer sleeve that contains a cable sealing unit 345 through which one or more cables can be routed. The cable sealing unit 345 includes sealing gel and an actuator for pressurizing the sealing gel within the outer sleeve to seal about the one or more cables routed through the cable sealing sleeve 344. An example cable sealing sleeve 344 suitable for use as an add-on component is disclosed in U.S. Application No. 63/012,689, filed Apr. 20, 2020, titled "Cable Sealing Unit with Multiple Configurations," the disclosure of which is hereby incorporated herein by reference in its entirety.

In certain implementations, visual identifiers can be provided on one or more of the add-on components 340. The visual identifiers are readily visible from outside the main housing of an enclosure 300 when the add-on components 340 are mounted to the main housing. In certain examples, the visual identifiers function as a customer or service provider identifiers. In certain examples, the visual identifiers functions to identify a function (e.g., cable sealing, power, cooling, signal conversion, etc.) of each add-on component 340. In certain examples, the visual identifiers are provided by markings, symbols, numbers or colors integrated with or applied to add-on housings of the add-on components 340. Example visual identifiers suitable for use with add-on components 340 are disclosed in U.S. Application No. 63/012,767, filed Apr. 20, 2020, titled "Fiber Optic Enclosure with Add-on Components Having Visual Identification," the disclosure of which is hereby incorporated herein by reference in its entirety.

Figure 41:
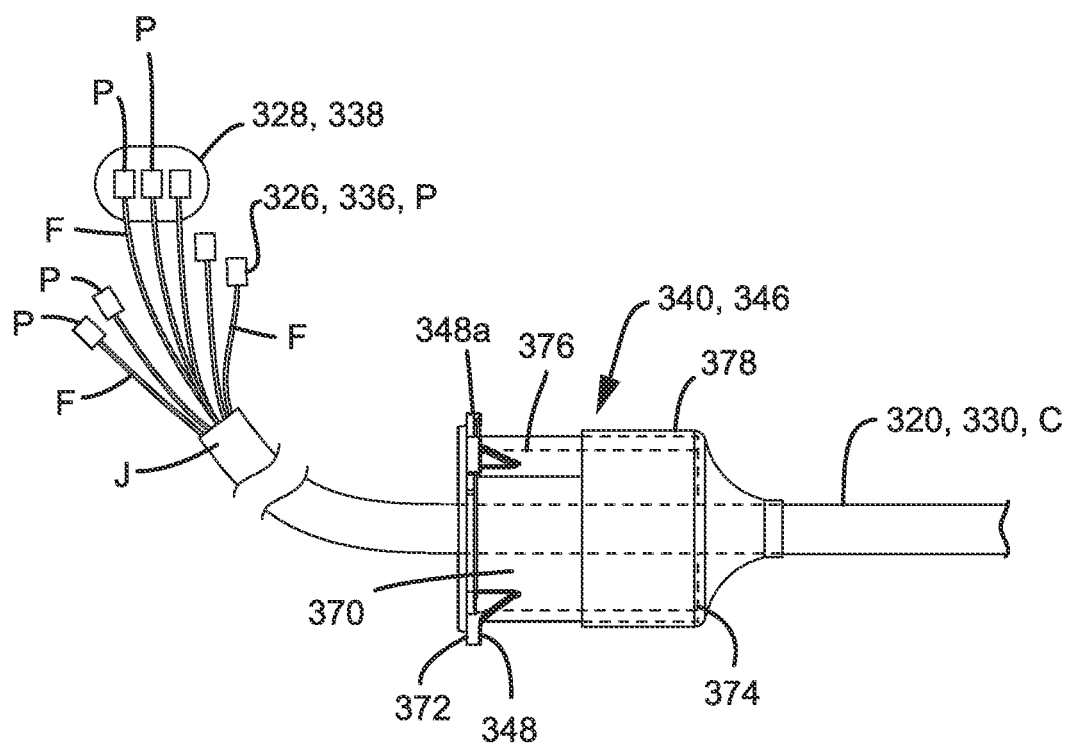
FIG. 41 is a schematic diagram of an example cable breakout assembly including a connectorized multi-fiber cable sealed to cable pass-through sleeve.
Figure 42:
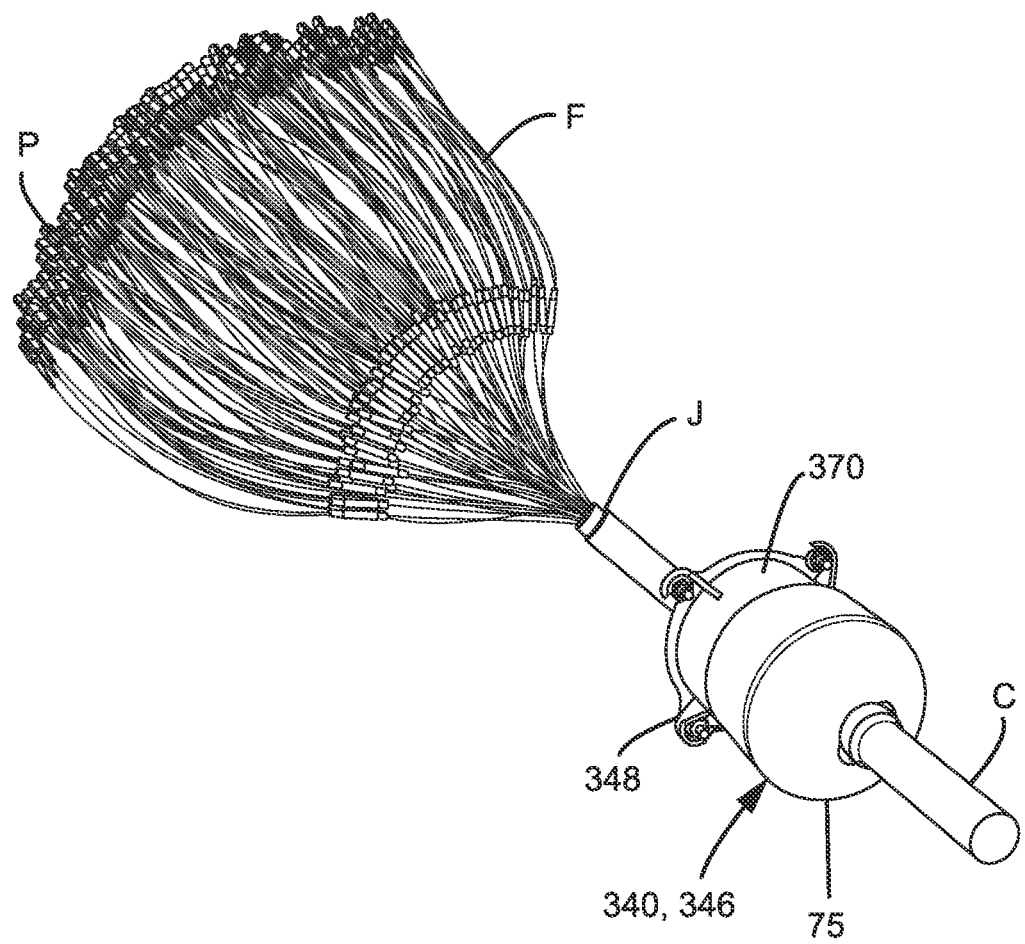
FIG. 42 is a perspective view of an example implementation of the cable breakout assembly of FIG. 41.
Figure 43:
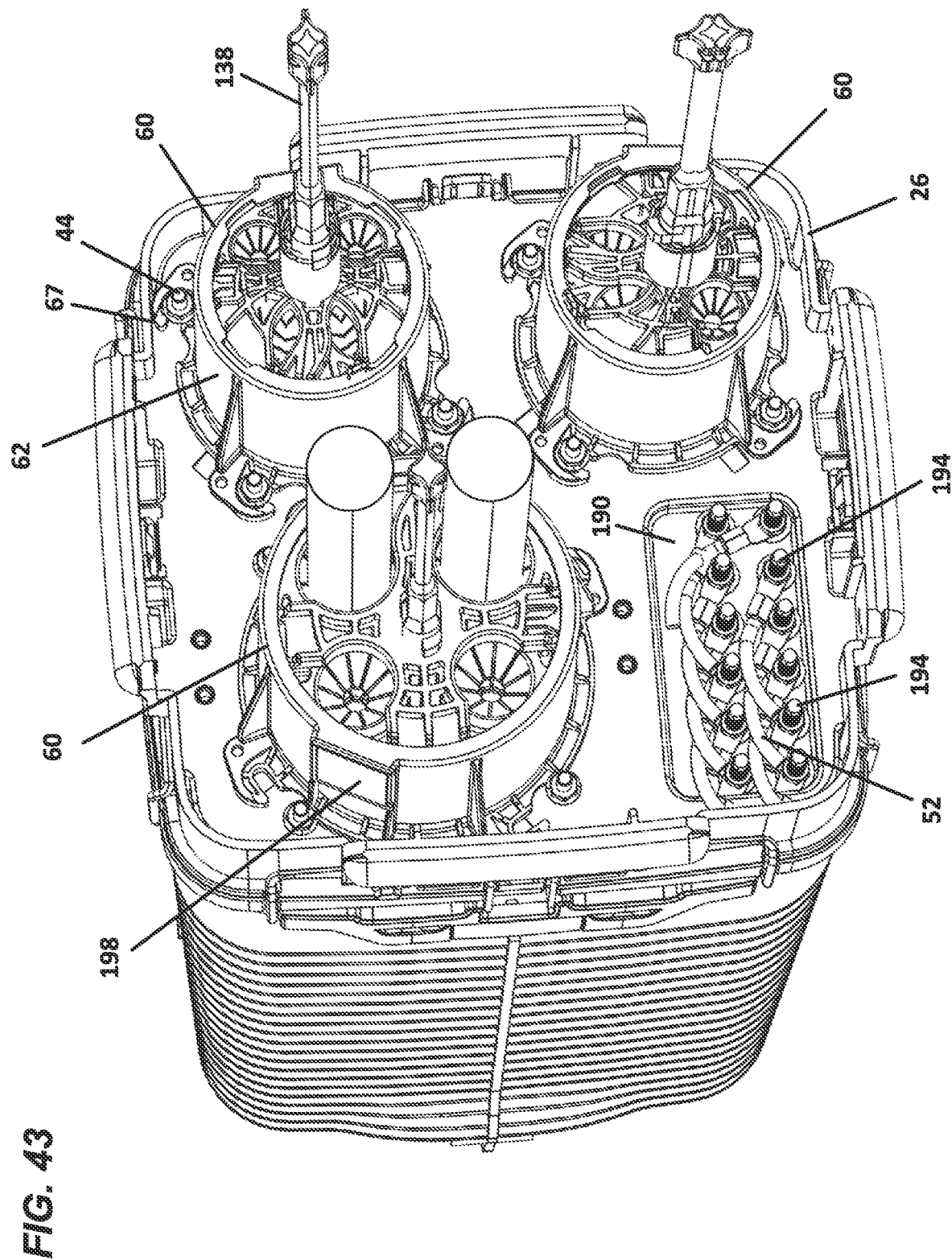
FIG. 43 is a bottom perspective view of an enclosure configured to receive one or more add-on components in accordance with the principles of the disclosure, the enclosure having a grounding termination region separate from access ports at which the add-on components can be mounted.
Figure 44:
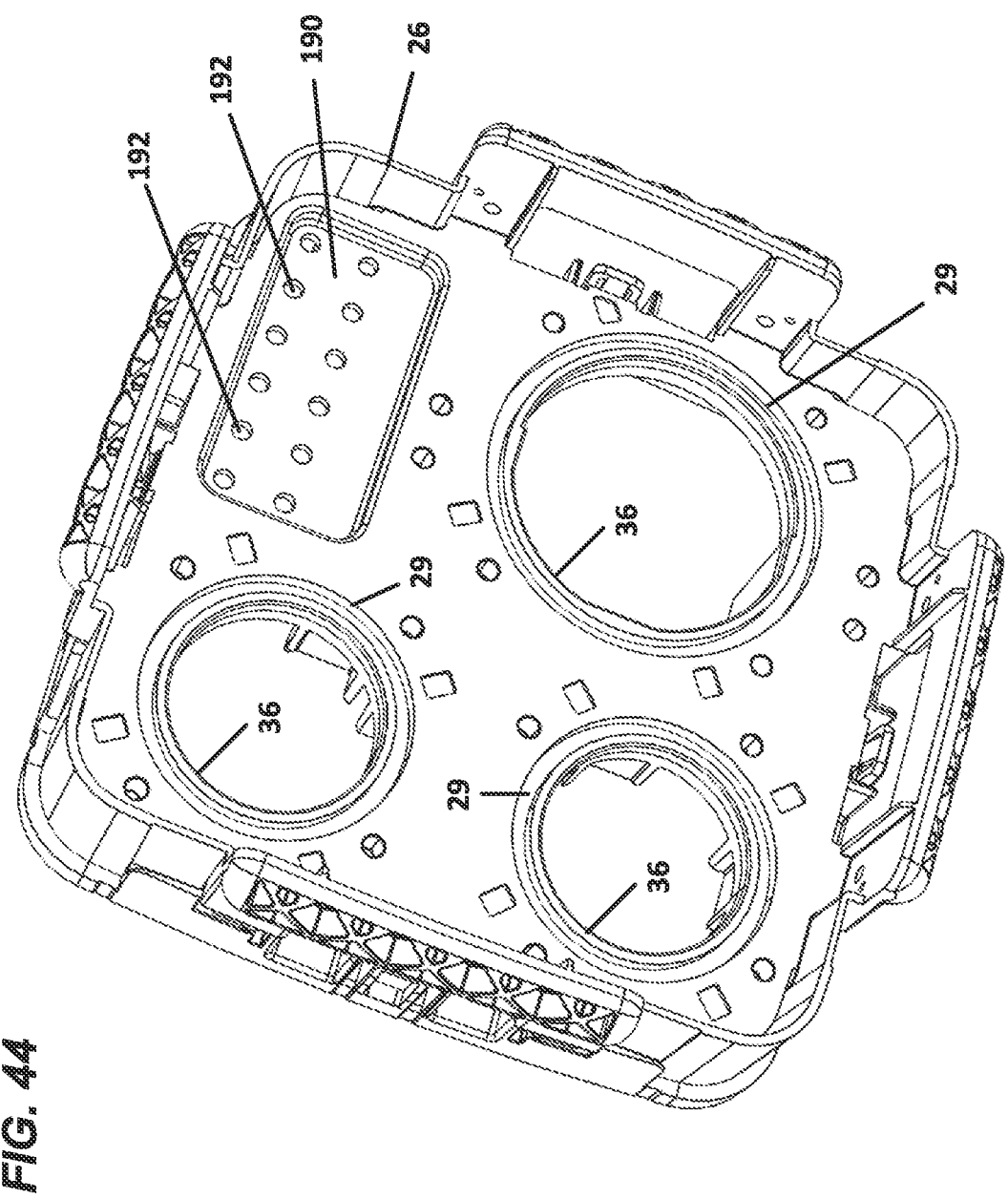
FIG. 44 is a bottom perspective view of an example end piece suitable for use with the enclosure of FIG. 43.
Figure 45:
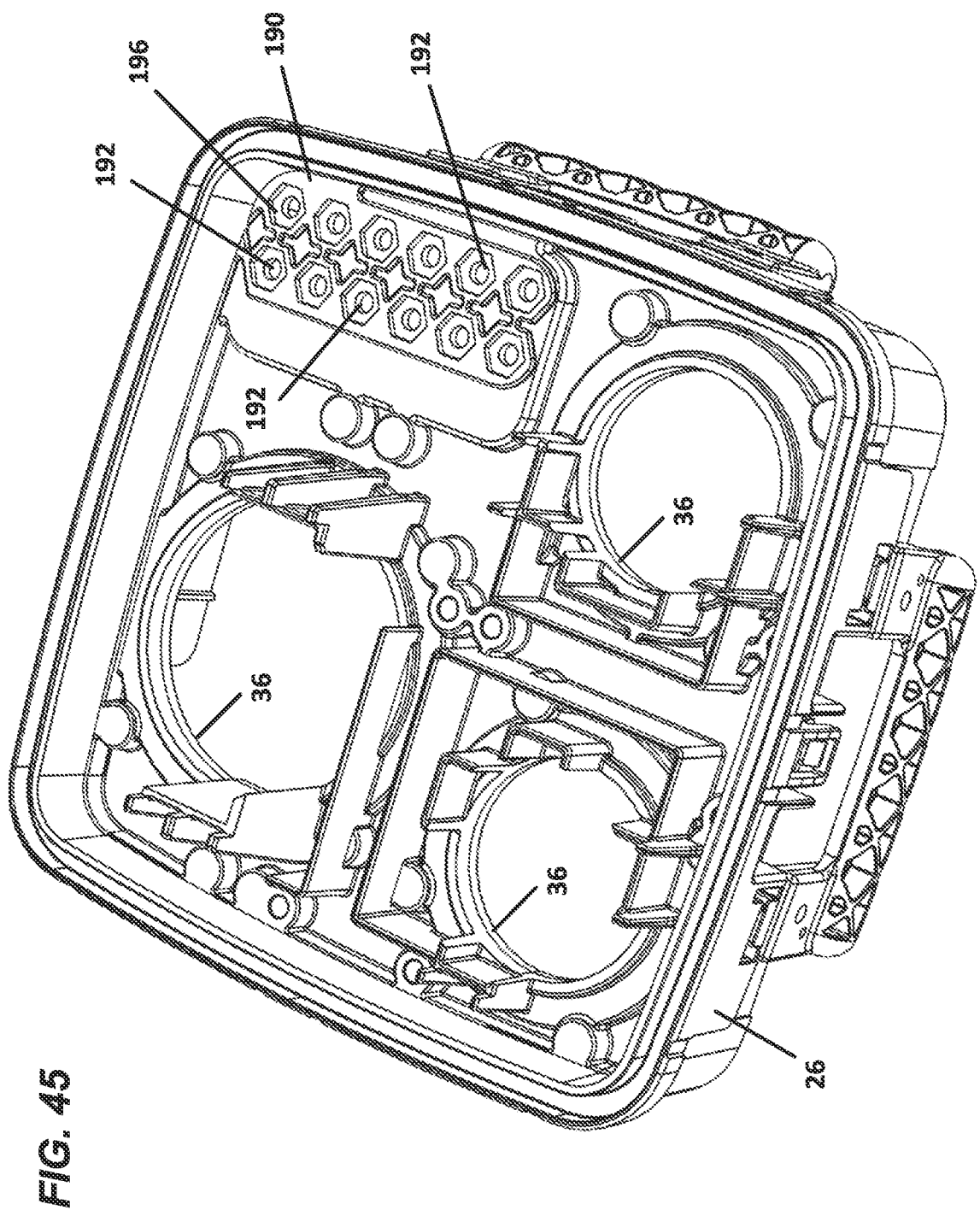
FIG. 45 is a top perspective view of the end piece of FIG. 44.
Figure 46:
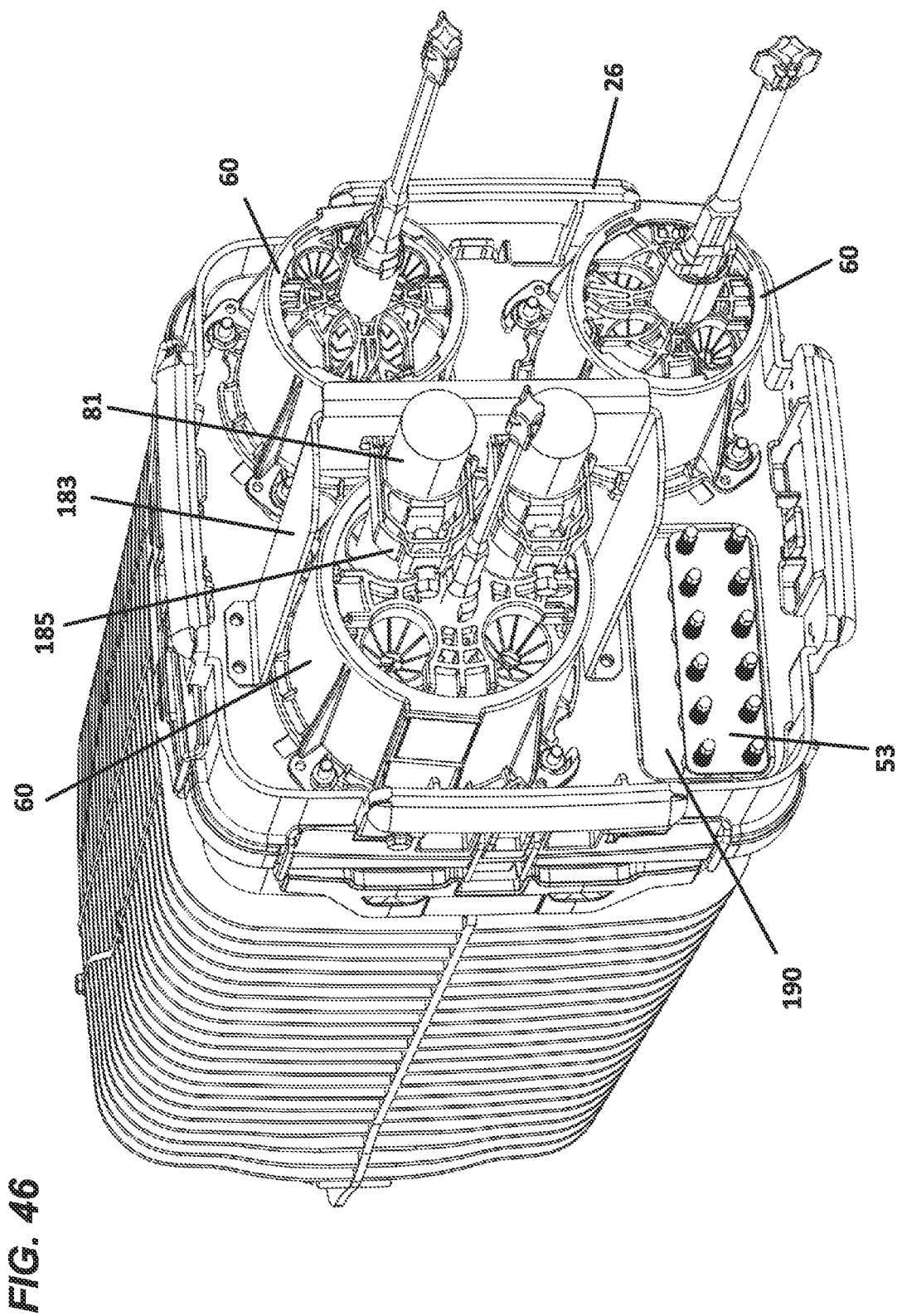
FIG. 46 is a bottom perspective view of the enclosure of FIG. 43 with a grounding plate and cable anchor bracket mounted thereto.

FIGS. 41 and 42 illustrate another example type of add-on component 340—called a break-out component 346—that facilitates securing a connectorized cable assembly to the enclosure 300. The break-out component 346 includes a cable pass-through sleeve 370 that extends between opposite first and second axial ends 372, 374. The pass-through sleeve 370 defines a passage 376 extending between openings at the first and second axial ends 372, 374. The retention members 348 are disposed at the first axial end 372 of the cable pass-through sleeve 370. As noted above, the retention members 348 are configured to facilitate attaching the cable pass-through sleeve 370 to an enclosure 300 so that the passage 376 is aligned with a respective access port 315 of the enclosure 300.

A fiber optic cable C (e.g., feeder cable 320, distribution cable 330, etc.) extends through the passage 376 of the cable pass-through sleeve 370. The cable C includes a plurality of optical fibers F (e.g., feeder fibers 322, distribution fibers 332, etc.) surrounded by a cable jacket J. The optical fibers F are terminated by optical plug connectors P (e.g., plug connectors 326, plug connectors 336, etc.). In some examples, the optical plug connectors P include single-fiber connectors. In other examples, the optical plug connectors P include multi-fiber connectors that terminate multiple fibers F of the cable C. In certain examples, the fibers F are upjacketed between the plug connectors P and a terminated end of the jacket J. The fiber optic cable C extends through the passage 376 so that the cable pass-through sleeve 370 is disposed at an intermediate location along the fiber optic cable C. The optical plug connectors P are spaced from the first axial end 372 of the cable pass-through sleeve 370.

A shape memory sleeve (e.g., heat shrink tube) 378 seal between the cable C and the cable pass-through sleeve 370. The shape memory sleeve 378 extends over the second axial end 174 of the cable pass-through sleeve 370 and also extends over the cable jacket J of the fiber optic cable C. The shape memory sleeve 378 is bonded to an exterior of the cable pass-through sleeve 370 and also is bonded to the cable jacket J of the fiber optic cable C. The shape memory sleeve 378 and the cable access gasket 347 seal the interior 310 of the enclosure 300 from an exterior of the enclosure 300 when the break-out component 346 is mounted to the base 306.

As shown in FIG. 4118, the optical plug connectors P can be grouped together in one or more bundles 328, 338. For example, a mesh sleeve or other packaging can be disposed around the plug connectors P of each bundle 328, 338. The packaging protects the plug connectors P during installation at the enclosure 300. In some implementations, each bundle 328, 338 includes sufficiently few plug connectors P that the bundle 328, 338 can pass through the access port 315 at which the break-out component 346 is mounted. In other implementations, the plug connectors P are staggered within the bundle(s) 328, 338 to enable passage of the bundle 328, 338 through the access port 315. In certain examples, the fibers F associated with each bundle 328, 338 have a common length. In certain examples, the fibers F of each bundle 328, 338 are intended for insertion at common location within the enclosure 300 (e.g., at a common row of the termination field 312).

In use, the cable pass-through sleeve 370 is installed on the cable C prior to the optical plug connectors P being routed through one of the access ports 315 of the base 306. In certain implementations, the cable pass-through sleeve 370 is routed onto the cable C before the cable is connectorized. For example, an unconnectorized end of the cable C may be routed through the shape memory sleeve 378 and the cable pass-through sleeve 370. In certain implementations, the cable pass-through sleeve 370 is positioned along the cable C (e.g., along a jacketed portion of the cable C) and the shape memory sleeve 378 is positioned partially over the cable pass-through sleeve 370 and partially over the cable C. The shape memory sleeve 378 is shrunk around the cable pass-through sleeve 370 and around the cable 178 to seal therebetween.

The unconnectorized end can then be prepared for connectorization (e.g., at the factory or in the field). The cable jacket J can be stripped to expose the ends of the fibers F). The exposed fibers F can be upjacketed (e.g., can be threaded through protective tubes). The end faces of the optical fibers F are polished and the plug connectors P are installed to the ends of the fibers F to form the cable breakout assembly 346. In certain implementations, the plug connectors P can be bundled together in one or more groups 328, 338 to protect the plug connectors P during shipping to an installation site, to protect the plug connectors P during installation at the enclosure 300, and/or to facilitate installation at the enclosure 300. For example, the plug connectors P can be bundled with packaging (e.g., a mesh sleeve, a plastic bag, a hard plastic case, etc.) that holds the plug connectors C together in the group 328, 338 during shipping and installation.

In certain examples, the connector installation and polishing steps occur at the factory after the cable C has been sealed to the cable pass-through sleeve 370 with the shape memory sleeve 378 and before the cable C has been fed through the access port 315 and into the enclosure 300. In certain implementations, the polishing step occurs at the factory before the plug connectors P are fully assembled (e.g., a connector core is polished while an outer plug housing is subsequently installed). In such implementations, the polishing step occurs at the factory after the cable C has been sealed to the cable pass-through sleeve 370 with the shape memory sleeve 378 and before the cable C has been fed through the access port 315 and into the enclosure 300.

After the cable breakout assembly 346 is assembled, the cable breakout assembly 346 can be installed at the enclosure 300. For example, the plug connectors P (e.g., the bundled group or groups 328, 338 of plug connectors P) can be threaded through one of the access ports 315 of the base 310. The first axial end 372 of the cable pass-through sleeve 370 is positioned so that the passage 376 aligns with the port 315. The first axial end 372 is pressed against the base 306 and then secured to the base 306 using threaded fasteners 350. For example, the cable pass-through sleeve 370 can be rotated relative to the base 306 so that the retention members 348 rotate until the threaded fasteners 350 slide through lateral openings in the retention members 348 and the second nuts 358 slide over engagement surfaces defined by the retention members 348. The second nuts 358 can then be tightened down onto the engagement surfaces to secure the cable pass-through sleeve 370 to the base 306. Accordingly, the threaded studs 350 and the second nuts 358 can be pre-installed at the base 306 reducing the number of loose components for the installer to keep track of during installation of the cable C.

The plug connectors P can be routed to adapter ports of the termination field 312, which can be mounted to the base 306. In certain examples, the plug connectors P are routed to the termination field 312 after the cable pass-through sleeve 370 is secured to the base 306. In certain implementations, the groups 328, 338 of plug connectors P are unbundled from their packaging and routed to corresponding adapter ports. In some examples, the unbundling and plugging steps occur in the factor before the enclosure 300 is shipped to an installation site. In other example, the unbundling and plugging steps occur in the field during or after installation of the enclosure 300. When the cable pass-through sleeve 370 is secured to the base 306 and the plug connectors P are installed at corresponding ports, the cover 308 can be installed at the base 306.

In accordance with certain aspects of the disclosure, the base 306 may be damaged during use of the enclosure 300. The cable pass-through sleeve 370 allows the broken base 306 to be replaced with a new base 306 without replacing the entire cable assembly 346. To replace the broken base 306, the cover 108 is removed from the base 306 to provide access to the enclosure interior 310. The plug connector P are removed from their ports and the cable pass-through sleeve 370 is detached from the broken base 306. The connectors P are slid through the access port 315 as the cable pass-through sleeve 370 is moved away from the broken base 306. The termination field 312 and other components (e.g., splitter 316) are detached from the broken base 306 and reattached to a replacement base 306. The cable breakout assembly 346 is then fed through a cable access port 315 of the replacement base 306. The cable pass-through sleeve 370 is secured to the replacement base 306 at the cable access port 315 (e.g., using retention members 348 as described above). The plug connectors P are routed back to their adapter ports at the termination field 312. The cover 108 is attached to the replacement base 306.

This replacement process is advantageous over the previous process when the cable assembly was sealed directly to the base with a shape memory sleeve. In the previous process, the sealed shape memory sleeve would need to be removed (e.g., broken) and the cable assembly would need to be resealed to the new base. In the new process described above, none of the seals are broken during the replacement process. The shape memory sleeve 378 remains sealing between the cable C and the cable pass-through sleeve 370. The first axial end 372 of the cable pass-through sleeve 370 seals to the replacement base 306 with either a new access port gasket 347 carried by the replacement base 306 or by the old access port gasket 347 if carried by the cable pass-through sleeve 370.

Example Aspects of the Disclosure

Aspect 1. A telecommunication enclosure comprising: a main housing having at least one access port; and an add-on component that sealably and detachably mechanically attaches to the main housing at the access port.

Aspect 2. The enclosure of Aspect 1, wherein a majority of the add-on component is located outside the main housing upon attachment to the main housing.

Aspect 3. The enclosure of Aspects 1 or 2, wherein a visual indicator is provided on an outside of the add-on component.

Aspect 4. The enclosure of any of Aspects 1-3, wherein the visual indicator indicates component function or provides differentiation between customers or service providers.

Aspect 5. The enclosure of any of Aspects 1-4, wherein the main housing includes externally threaded fasteners for securing the add-on component to the main housing.

Aspect 6. The enclosure of Aspect 5, wherein the threaded fasteners include threaded studs having inner threaded ends inside the main housing and outer threaded ends outside the main housing.

Aspect 7. The enclosure of Aspect 6, wherein the threaded fasteners form earth ground connection locations.

Aspect 8. The enclosure of any of Aspects 1-7, wherein a gasket provides sealing between the add-on component and the main housing.

Aspect 9. The enclosure of any of Aspects 1-8, wherein the main housing defines a plurality of the access ports.

Aspect 10. The enclosure of any of Aspects 1-9, wherein the main housing includes a dome and a base that releasably and sealable attaches to an open end of the dome, and wherein the access port is defined by the base or the access ports are defined by the base.

Aspect 11. The enclosure of Aspect 10, further comprising a tower that attaches to an inside of the base, and a plurality of splice trays supported by the tower.

Aspect 12. The enclosure of any of Aspects 1-11, wherein the add-on component includes a cable sealing sleeve containing a cable sealing unit including gel and an actuator for pressurizing the gel within the cable sealing sleeve.

Aspect 13. The enclosure of any of Aspects 1-12, wherein the enclosure includes first and second add-on components detachably and sealably secured at the access ports, the first and second add-on components including cable sealing sleeves containing cable sealing units including volumes of gel and including actuators for pressurizing the volumes of gel within the cable sealing sleeves.

Aspect 14. The enclosure of any of Aspects 1-13, wherein the add-on component includes or one of the add-on components includes a passive optical power splitter and/or a wavelength divisional multi-plexer and/or an optical tap device.

Aspect 15. The enclosure of any of Aspects 1-14, wherein the add-on component includes or one of the add-on components includes an active electronic device.

Aspect 16. The enclosure of any of Aspects 1-15, wherein the add-on component includes or one of the add-on components includes an antenna and/or an electric battery and/or a transceiver and/or a storage compartment and/or a converter and/or an exterior hardened demateable connection interface and/or a cable arrangement adapted for connection to a transceiver.

Aspect 17. The enclosure of any of Aspects 1-16, wherein the add-on component includes or one of the add-on components includes a heat transfer device including an array of heat transfer members for transferring heat from an interior of the main housing to the ambient air surrounding the enclosure.

Aspect 18. A telecommunication enclosure comprising:
a main housing including: a housing body having an open end; and an end piece that detachably mounts to the housing body at the open end of the housing body for closing the open end of the housing body, the end piece defining at least one access port;
a main housing gasket for sealing between the end piece and the housing body when the end piece is mounted at the open end of the housing body;
a cable pass-through sleeve that detachably mounts to the end piece at a mounting location corresponding to the access port, the cable pass-through sleeve having a first end and an opposite second end, the first end of the cable pass-through sleeve being configured to detachably connect to the end piece at the mounting location, and the sleeve being positioned to surround the access port when connected to the end piece at the mounting location;
an access port gasket that surrounds the access port for sealing between the first end of the cable pass-through sleeve and the end piece when the cable pass-through sleeve is mounted at the mounting location of the end piece; and
a cable sealing gel block that mounts in the cable pass-through sleeve, the cable sealing gel block including first and second gel pressurization structures defining cable pass-through locations, a volume of gel positioned axially between the first and second gel pressurization structures, and an actuator for forcing the first and second gel pressurization structures axially toward one another to pressurize the volume of gel, wherein when the volume of gel of the cable sealing gel block is pressurized while the cable sealing gel block is installed in the cable pass-through sleeve, a circumferential exterior of the volume of gel provides circumferential sealing with respect to a circumferential interior of the cable pass-through sleeve and the volume of gel also conforms about and seals about cables routed through the cable sealing gel block.

Aspect 19. The telecommunication enclosure of aspect 18, wherein the actuator includes a trigger that is used to pressurize the volume of gel, wherein the trigger is accessible at the second end of the sleeve when the cable sealing gel block is installed in the cable pass-through sleeve.

Aspect 20. The telecommunication enclosure of aspect 18, wherein the cable sealing gel block loads into the cable pass-through sleeve through the first end of the cable pass-through sleeve, and wherein the second end of the cable pass-through sleeve includes a gel block retention lip for axially retaining the cable sealing gel block within the cable pass-through sleeve.

Aspect 21. The telecommunication enclosure of aspect 18, wherein the cable sealing gel block is too large to fit through the access port.

Aspect 22. The telecommunication enclosure of aspect 20, wherein the cable sealing gel block is required to be loaded into the cable pass-through sleeve before the cable pass-through sleeve is connected to the end piece, and wherein the cable pass-through sleeve is required to be detached from the end piece to remove the cable sealing gel block from the cable pass-through sleeve.

Aspect 23. The telecommunication enclosure of aspect 18, wherein the housing body is a dome having a closed end opposite the open end, and wherein the end piece is a base.

Aspect 24. The telecommunication enclosure of aspect 18, wherein the first end of the cable pass-through sleeve is connected to the end piece by fasteners.

Aspect 25. The telecommunication enclosure of aspect 24, wherein the access port defines a central port axis, wherein the fasteners include threaded studs that extend through the end piece and are individually sealed relative to the end piece, and wherein the threaded studs are circumferentially spaced about the central port axis.

Aspect 26. The telecommunication enclosure of aspect 25, wherein the cable pass-through sleeve includes outer radial projections at the first end of the cable pass-through sleeve, wherein the radial projections each define a stud receptacle for receiving one of the threaded studs, and wherein once the threaded studs have been received within the stud receptacles the first end of the cable pass-through sleeve can be clamped against an exterior side of the end piece by threading nuts on the threaded studs.

Aspect 27. The telecommunication enclosure of aspect 26, wherein the stud receptacles are open-sided receivers, and wherein the studs can be installed in the open-sided receivers by positioning the cable pass-through sleeve over the access port in co-axial alignment with the central port axis and then rotating the cable pass-through sleeve about the central port axis until the threaded studs are received within the open-sided receivers.

Aspect 28. The telecommunication enclosure of aspect 27, wherein the open-sided receivers are hooks.

Aspect 29. The telecommunication enclosure of aspect 24, wherein the fasteners are ground wire terminals.

Aspect 30. The telecommunication enclosure of aspect 29, wherein the ground wire terminals each include a threaded stud having a first threaded end projecting inwardly from an interior side of the end piece, a second threaded end projecting outwardly from an exterior side of the end piece, and an intermediate flange that abuts the interior side of the end piece.

Aspect 31. The telecommunication enclosure of aspect 30, wherein fastener seals are compressed between the intermediate flanges and the interior side of the end piece.

Aspect 32. The telecommunication enclosure of aspect 31, wherein each threaded stud is part of a connection assembly, each connection assembly including: a) one of the threaded studs; b) a first nut that threads on the first threaded end of the threaded stub for securing a terminal lug of an interior grounding wire to the threaded stud; c) a second nut that threads on the second threaded end of the threaded stud for securing a terminal lug of an exterior grounding wire to the threaded stud and for abutting the intermediate flange against the interior side of the end piece such that the threaded stud is secured to the end piece; and d) a third nut threaded on the second end of the threaded stud for securing the cable pass-through sleeve to the threaded stud.

Aspect 33. The telecommunication enclosure of aspect 32, wherein the cable pass-through sleeve defines stud receptacles for receiving the second threaded ends of the threaded studs, and wherein the first end of the cable pass-through sleeve is pressed against the exterior side of the end piece by threading the third nuts on the second threaded ends of the threaded studs.

Aspect 34. The telecommunication enclosure of aspect 33, wherein the exterior side of the end piece defines recessed regions for receiving the terminal lugs of the exterior grounding wires and for receiving portions of the exterior grounding wires.

Aspect 35. The telecommunication enclosure of aspect 18, wherein the end piece defines a plurality of the access ports.

Aspect 36. The telecommunication enclosure of aspect 18, wherein access port is a first access port surrounded by the access port gasket, and wherein the end piece also defines a second access port surrounded by another access port gasket and a third access port surrounded by a further access port gasket.

Aspect 37. The telecommunication enclosure of aspect 36, wherein the cable pass-through sleeve is a first cable pass-through sleeve that detachably mounts at the first access port and seals against the corresponding access port gasket, wherein a second cable pass-through sleeve detachably mounts at the second access port and seals against the corresponding access port gasket, and wherein a blank cover mounts at the third access port and seals against the corresponding access port gasket.

Aspect 38. The telecommunication enclosure of aspect 36 or 37, wherein at least two of the first, second and third access ports have different sizes or shapes.

Aspect 39. The telecommunication enclosure of aspect 36 or 37, wherein at least two of the first, second and third access ports have different cross-dimensions.

Aspect 40. The telecommunication enclosure of aspect 36 or 37, wherein the first, second and third access ports are circular and at least two of the first, second and third access ports have different diameters.

Aspect 41. The telecommunication enclosure of any of aspects 18-40, further comprising latches for detachably securing the end piece to the main housing body.

Aspect 42. The telecommunication enclosure of any of aspects 18-41, wherein the main housing body and the end piece mate at an interface having a generally rectangular shape.

Aspect 43. A telecommunication enclosure comprising:
a main housing including:
  a housing body having an open end;
  an end piece that detachably mounts to the housing body at the open end of the housing body for closing the open end of the housing body, the end piece defining a plurality of access ports;
a main housing gasket for sealing between the end piece and the housing body when the end piece is mounted at the open end of the housing body;
a plurality of access port gaskets, each of the access port gaskets surrounding one of the access ports;
a plurality of add-on components adapted to be detachably coupled to the end piece at the access ports with the access port gaskets providing sealing between the end piece and the add-on components, wherein when the add-on components are coupled to the end piece, each add-on component is positioned at a different one of the access ports.

Aspect 44. The telecommunication enclosure of aspect 43, wherein the access port gaskets are either mounted to the end piece or carried with the add-on components.

Aspect 45. The telecommunication enclosure of aspect 43 or 44, wherein at least two of the access ports have different sizes or shapes.

Aspect 46. The telecommunication enclosure of aspect 43 or 44, wherein at least two of the access ports have different cross-dimensions.

Aspect 47. The telecommunication enclosure of aspect 43 or 44, wherein the access ports are circular and at least two of the access ports have different diameters.

Aspect 48. The telecommunication enclosure of aspect 46 or 47, wherein at least two of the access ports have the same cross-dimension.

Aspect 49. The telecommunication enclosure of any of aspects 43-48, wherein the housing body includes a dome having a closed end opposite the open end, and wherein the end piece includes a base.

Aspect 50. The telecommunication enclosure of any of aspects 43-49, wherein at least one of the add-on components includes a blank cover.

Aspect 51. The telecommunication enclosure of any of aspects 43-50, wherein at least one of the add-on components includes a cable pass-through sleeve for sealing cables entering the enclosure.

Aspect 52. The telecommunication enclosure of any of aspects 43-50, wherein at least two of the add-on components are cable pass-through sleeves for sealing cables entering the enclosure.

Aspect 53. The telecommunication enclosure of aspect 52, wherein the cable pass-through sleeves have the same cross-dimensions.

Aspect 54. The telecommunication enclosure of aspect 52, wherein the cable pass-through sleeves have different cross-dimensions.

Aspect 55. The telecommunication enclosure of any of aspects 51-54, wherein the cable pass-through sleeve contains a cable sealing unit including sealing gel and an actuator for pressurizing the sealing gel within the cable pass-through sleeve to seal about one or more cables routed through the cable pass-through sleeve.

Aspect 56. The telecommunication enclosure of any of aspects 51-54, wherein a cable routed through the cable pass-through sleeve is sealed relative to the cable pass-through sleeve by a shape memory sleeve bonded about an exterior of the cable and about an exterior of the cable pass-through sleeve.

Aspect 57. The telecommunication enclosure of any of aspects 43-56, wherein the add-on components are detachably coupled to the end piece by threaded fasteners.

Aspect 58. The telecommunication enclosure of aspect 57, wherein the threaded fasteners include a plurality of threaded studs spaced circumferentially about each of the access ports.

Aspect 59. The telecommunication enclosure of aspect 58, wherein the threaded studs are extend through the end piece and a secured to the end piece.

Aspect 60. The telecommunication enclosure of aspect 59, wherein the threaded studs are each sealed with respect to the end piece.

Aspect 61. The telecommunication enclosure of any of aspects 57-60, wherein the threaded studs function as grounding terminals.

Aspect 62. The telecommunication enclosure of any of aspects 18-61, wherein the enclosure is a splice closure.

Aspect 63. The telecommunication enclosure of aspect 62, further comprising a fiber optic organizer that mounts within the housing.

Aspect 64. The telecommunication enclosure of aspect 63, wherein the fiber optic organizer includes a plurality of trays for holding fiber optic splices and for managing optical fibers corresponding to the optical splices.

Aspect 65. The telecommunication enclosure of aspect 64, wherein the fiber organizer includes a tower coupled to the end piece, wherein the splice trays are pivotally connected to the tower.

Aspect 66. The telecommunication enclosure of any of aspects 18-65, wherein the housing has a molded, plastic construction.

Aspect 67. The telecommunication enclosure of any of aspects 18-66, wherein the gaskets are ring style gaskets.

Aspect 68. A telecommunication enclosure comprising:
a main housing defining a plurality of access ports;
a plurality of access port gaskets, each of the access port gaskets surrounding one of the access ports;
a plurality of add-on components adapted to be detachably coupled to the main housing at the access ports with the access port gaskets providing sealing between the main housing and the add-on components and with the add-on components being positioned outside the housing, wherein at least one of the add-on component includes an add-on housing having a visual identifier visible from outside the main housing, wherein when the add-on components are coupled to the main housing, each add-on component is positioned at a different one of the access ports.

Aspect 69. The telecommunication enclosure of aspect 68, wherein the visual identifier functions as a customer or service provider identifier.

Aspect 70. The telecommunication enclosure of aspect 68, wherein the visual identifier functions to identify a function of the add-on component.

Aspect 71. The telecommunication enclosure of aspect 68, wherein the visual identifier is provided by a marking, symbol, number or color integrated with or applied to the add-on housing.

Aspect 72. The telecommunication enclosure of aspect 68, wherein add-on housing is a molded plastic part molded of a material having a particular color which functions as the visual identifier.

Aspect 73. The telecommunication enclosure of aspect 68, wherein the add-on housing contains a passive optical power splitter, a wavelength division multi-plexer, or an optical power tapping device.

Aspect 74. The telecommunication enclosure of aspect 68, wherein the add-on housing defines a storage compartment for storing spare parts.

Aspect 75. The telecommunication enclosure of aspect 68, wherein the add-on housing contains an active electronic device including a radio transceiver for wireless communication, a converter for converting between optical and electrical signals, a power converter, or a battery.

Aspect 76. The telecommunication enclosure of any of aspects 68-75, wherein the add-on housing is a canister having an open end that seals against the main housing and an opposite closed end.

Aspect 77. The telecommunication enclosure of aspect 68, wherein the add-on housing includes a cable pass-through sleeve for sealing cables entering the enclosure.

Aspect 78. The telecommunication enclosure of aspect 77, wherein the cable pass-through sleeve contains a cable sealing unit including sealing gel and an actuator for pressurizing the sealing gel within the cable pass-through sleeve to seal about one or more cables routed through the cable pass-through sleeve.

Aspect 79. The telecommunication enclosure of aspect 77, wherein a cable routed through the cable pass-through sleeve is sealed relative to the cable pass-through sleeve by a shape memory sleeve bonded about an exterior of the cable and about an exterior of the cable pass-through sleeve.

Aspect 80. The telecommunication enclosure of aspect 68, wherein the access port gaskets are either mounted to the end piece or carried with the add-on components.

Aspect 81. The telecommunication enclosure of any of aspects 68-80, wherein the main housing includes a dome having a closed end opposite the open end, and a base that mounts at the open end, and wherein the access ports are defined by the base.

Aspect 82. The telecommunication enclosure of any of aspects 68-81, wherein at least one of the add-on components includes a blank cover.

Aspect 83. The telecommunication enclosure of any of aspects 68-82, wherein the add-on components are detachably coupled to the main housing by threaded fasteners.

Aspect 84. The telecommunication enclosure of aspect 83, wherein the threaded fasteners include a plurality of threaded studs spaced circumferentially about each of the access ports.

Aspect 85. The telecommunication enclosure of aspect 83, wherein the threaded studs extend through a wall of the housing and are secured to the wall.

Aspect 86. The telecommunication enclosure of aspect 85, wherein the threaded studs are each sealed with respect to the wall.

Aspect 87. The telecommunication enclosure of any of aspects 83-86, wherein the threaded studs function as grounding terminals.

Aspect 88. The telecommunication enclosure of any of aspects 68-87, wherein the enclosure is a splice closure.

Aspect 89. The telecommunication enclosure of aspect 88, further comprising a fiber optic organizer that mounts within the housing.

Aspect 90. The telecommunication enclosure of aspect 89, wherein the fiber optic organizer includes a plurality of trays for holding fiber optic splices and for managing optical fibers corresponding to the optical splices.

Aspect 91. The telecommunication enclosure of aspect 90, wherein the fiber organizer includes a tower coupled to a base of the main housing, wherein the splice trays are pivotally connected to the tower.

Aspect 92. The telecommunication enclosure of any of aspects 68-91, wherein the gaskets are ring style gaskets.

Aspect 93. The telecommunication enclosure of any of aspects 68-92, wherein another of the add-on components includes a cable pass-through sleeve for sealing cables entering the enclosure.

Aspect 94. The telecommunication enclosure of aspect 93, wherein the cable pass-through sleeve contains a cable sealing unit including sealing gel and an actuator for pressurizing the sealing gel within the cable pass-through sleeve to seal about one or more cables routed through the cable pass-through sleeve.

Aspect 95. A telecommunication enclosure system comprising:
a main housing defining a plurality of access ports;
a plurality of access port gaskets, each of the access port gaskets surrounding one of the access ports; and
a plurality of add-on components that can be selected for detachable coupling to the main housing at the access ports with the access port gaskets providing sealing between the main housing and the add-on components and with the add-on components being positioned outside the housing, wherein the add-on components that can be selected include a first add-on component having a first add-on housing having a first visual identifier visible from outside the main housing when the first add-on housing is coupled to the main housing, and wherein the add-on components that can be selected include a second add-on component having a second add-on housing having a second visual identifier visible from outside the main housing when the second add-on housing is coupled to the main housing, the first and second visual identifiers being different from one another, wherein when the add-on components are coupled to the main housing, each add-on component is positioned at a different one of the access ports.

Aspect 96. The telecommunication enclosure system of aspect 95, wherein the first and second add-on housings are identical but for the different first and second visual identifiers.

Aspect 97. The telecommunication enclosure system of aspect 95 or aspect 96, wherein the first add-in housing contains a first passive optical component and the second add-on housing contains a second passive optical component providing a different function from a function of the first passive optical component.

Aspect 98. The telecommunication enclosure system of aspect 97, wherein the first passive optical component is a passive optical power splitter and the second passive optical component is a wavelength division multi-plexer.

Aspect 99. The telecommunication enclosure system of aspect 95 or aspect 96, wherein the first and second add-on housings are a cable pass-through sleeves for sealing cables entering the enclosure.

Aspect 100. The telecommunication enclosure system of aspect 99, wherein the first and second add-on housings are both coupled to the main housing.

Aspect 101. The telecommunication enclosure system of aspect 95 or aspect 96, wherein the first add-in housing contains a passive optical component and the second add-on housing contains an active electronic component.

Aspect 102. The telecommunication enclosure of any of aspects 95-101, wherein the enclosure is a splice closure Aspect 103. The telecommunication enclosure of aspect 102, further comprising a fiber optic organizer that mounts within the housing, wherein the fiber optic organizer includes a plurality of trays for holding fiber optic splices and for managing optical fibers corresponding to the optical splices.

Aspect 104. The telecommunication enclosure of any of aspects 95-103, wherein the housing includes a dome having a closed end opposite the open end, and a base that mounts at the open end, and wherein the access ports are defined by the base.

Aspect 105. A telecommunications enclosure comprising:
a housing including a dome and a base that detachably and sealably mounts at an open end of the base, the base defining first, second and third access ports;
first and second add-on components that separately detachably connect to the base in sealed relation to the base respectively at the first and second access ports, each of the first and second add-on components being configured for sealing about fiber optic cables routed into the housing through the base; and
a third add-on component that detachably connects to the base in sealed relation to the base at the third access port, and wherein each of the first, second and third components project axially from the base and are visible outside the main housing when connected to the base.

Aspect 106. The telecommunication enclosure of aspect 105, wherein the enclosure includes a tower that attaches to an inside of the base and is carried with the base when the base is detached from the dome, and a plurality of splice trays that are supported by the tower.

Aspect 107. The telecommunication enclosure of aspect 105 or aspect 106, wherein the third add-on component include an active electronic device.

Aspect 108. The telecommunication enclosure of any of aspects 105-107, wherein the third add-on component includes a battery.

Aspect 109. The telecommunication enclosure of any of aspects 105-108, wherein the third add-on component includes a transceiver and/or an antenna.

Aspect 110. The telecommunication enclosure of any of aspect 105 and aspect 106, wherein the third add-on component includes a storage chamber.

Aspect 111. The telecommunication enclosure of any of aspect 105 and aspect 106, wherein the third add-on component includes a cable assembly including a break-out configured for connection to a transceiver.

Aspect 112. The telecommunication enclosure of aspect 111, wherein the breakout provides power and fiber optics to the transceiver.

Aspect 113. The telecommunication enclosure of any of aspect 105 or aspect 106, wherein the third add-on component includes a passive optical power splitter, a wavelength division multi-plexer or a passive optical tap device.

Aspect 114. The telecommunication enclosure of any of aspects 105-113, wherein the first and second add-on components each include: a cable sealing sleeve that detachably attaches to the base; a volume of gel contained in the cable sealing sleeve; and an actuator for pressurizing the volume of gel within the cable sealing sleeve to form the gel about cables routed through the gel, and wherein the actuator is a manual actuator accessible from outside the cable sealing sleeve when the cable sealing sleeve is attached to the base.

Aspect 115. The telecommunication enclosure of any of aspects 105-113, wherein at least one of the first and second add-on components includes a shape memory sleeve that seals a cable with respect to a molded plastic portion of the add-on component.

Aspect 116. The telecommunication enclosure of any of aspects 105-115, wherein the base includes axially extending, externally threaded fasteners for securing the add-on components to the base.

Aspect 117. The telecommunication enclosure of aspect 116, wherein the threaded fasteners include threaded studs having inner threaded ends inside the base and outer threaded ends outside the base.

Aspect 118. The telecommunication enclosure of aspect 117, wherein the threaded studs form earth ground connection locations.

Aspect 119. The telecommunication enclosure of any of aspects 105-118, wherein separate first, second and third gaskets provides sealing respectively between the first, second and third add-on components and the base.

Aspect 120. A telecommunications enclosure comprising:
a housing defining a plurality of access ports;
a first add-on components that detachably connects to the base in sealed relation to the base at one of the access ports, the first add-on components being configured for sealing about fiber optic cables routed into the housing through the corresponding access port at which the first add-on component is secured;
an active electronic device that generates heat within the housing;

a second add-on component that detachably connects to the housing in sealed relation to the housing at another one of the access ports, and wherein the second add-on component transfers heat from inside the housing and includes an array of heat transfer fins positioned outside the housing.

Aspect 121. A telecommunication enclosure comprising:
a main housing including:
  a dome having an open end;
  a base that detachably mounts to the dome at the open end of the dome for closing the open end of the dome, the base defining a plurality of access ports;
a main housing gasket for sealing between the base and the dome when the base is mounted at the open end of the dome;
an optical connection field positioned within the main housing, the optical connection field including a plurality of fiber optic adapters for coupling together optical connectors, the fiber optic adapters each including a first port and a second port;
a passive optical power splitter having fiber optic outputs with connectorized ends that plug into the first ports of the fiber optic adapters;
a plurality of access port gaskets, each of the access port gaskets surrounding one of the access ports;
a plurality of add-on components adapted to be detachably coupled to the base at the access ports with the access port gaskets providing sealing between the base and the add-on components, at least one of the add-on components including a break-out component including:
  a) a cable pass-through sleeve having a first end that detachably connects to the base at one of the access ports, the cable pass-through sleeve also including a second end opposite the first end;
  b) a fiber optic cable sealed relative to the cable pass-through sleeve by a shape memory sleeve that extends over the second end of the cable pass-through sleeve and that also extends over an outer jacket of the fiber optic cable, the shape memory sleeve being bonded to the exterior of the cable pass-through sleeve and also being bonded to the outer jacket of the fiber optic cable; and
  c) optical plug connectors terminating optical fibers of the fiber optic cable, the optical plug connectors being configured to plug into the second ports of the fiber optic adapters such that the optical fibers of the fiber optic cable are optically coupled to the fiber outputs of the passive optical power splitter; and
wherein when the add-on components are coupled to the base, each add-on component is positioned at a different one of the access ports.

Aspect 122. The telecommunication enclosure of aspect 121, wherein the access port gaskets are either mounted to the base.

Aspect 123. The telecommunication enclosure of aspect 121, wherein the access port gaskets are carried with the add-on components.

Aspect 124. The telecommunication enclosure of any of aspects 121-123, wherein at least two of the access ports have different sizes or shapes.

Aspect 125. The telecommunication enclosure of any of aspects 121-124, wherein at least one of the add-on components includes a blank cover.

Aspect 126. The telecommunication enclosure of any of aspects 121-125, wherein at least one of the add-on components includes a cable sealing sleeve for sealing cables entering the enclosure, wherein the cable sealing sleeve contains a cable sealing unit including sealing gel and an actuator for pressurizing the sealing gel within the cable sealing sleeve to seal about one or more cables routed through the cable sealing sleeve.

Aspect 127. The telecommunication enclosure of any of aspects 121-126, wherein the add-on components are detachably coupled to the base by threaded fasteners.

Aspect 128. The telecommunication enclosure of aspect 127, wherein the threaded fasteners include a plurality of threaded studs spaced circumferentially about each of the access ports.

Aspect 129. The telecommunication enclosure of any of aspects 121-128, wherein the main housing contains one or more splice trays for holding optical splices.

Aspect 130. The telecommunication enclosure of aspect 121, wherein the connectorized ends include LC or SC type fiber optic connectors.

Aspect 131. The telecommunications enclosure of any of aspects 121-130, wherein the cable pass-through sleeve defines a through passage sized large enough to allow the connectorized ends of multiple ones of the optical plug connectors to be passed though the cable pass-through sleeve.

Aspect 132. The telecommunication enclosure of any of aspects 121-131, wherein the optical plug connectors are directly terminated to ends of the optical fibers of the fiber optic cable.

Aspect 133. The telecommunication enclosure of any of aspect 121-131, wherein the optical fibers of the fiber optic cable are optically spliced to pre-connectorized pigtails.

Aspect 134. The telecommunication enclosure of any of aspect 121-133, wherein one of the add-on components defines a secondary housing with an interior that joins with the interior of the main housing to form an expanded enclosure.

Aspect 135. The telecommunication enclosure of aspect 124, wherein the splitter is disposed within the secondary housing.

Aspect 136. The telecommunication enclosure of any of aspects 121-134, wherein the splitter is disposed within the main housing.

Aspect 137. A cable breakout assembly comprising:
a pass-through sleeve extending along a longitudinal axis between opposite first and second axial ends, the pass-through sleeve defining a passage extending between openings at the first and second axial ends;
retention members disposed at the first axial end of the pass-through sleeve, the retention members being configured to facilitate attaching the pass-through sleeve to a surface so that the passage is aligned with a port defined in the surface;
a fiber optic cable including a plurality of optical fibers surrounded by a cable jacket, the optical fibers being terminated by optical plug connectors, the fiber optic cable extending through the passage of the pass-through sleeve so that the pass-through sleeve is disposed at an intermediate location along the fiber optic cable, wherein the optical plug connectors are spaced from the first axial end of the pass-through sleeve; and
a shape memory sleeve sealing between the cable and the pass-through sleeve, the shape memory sleeve extending over the second axial end of the pass-through sleeve and also extending over the cable jacket of the fiber optic cable, the shape memory sleeve being bonded to an exterior of the pass-through sleeve and also being bonded to the cable jacket of the fiber optic cable.

Aspect 138. The cable breakout assembly of aspect 137, wherein the retention members extend radially outwardly from the first axial end of the pass-through sleeve.

Aspect 139. The cable breakout assembly of aspect 138, wherein the retention members define laterally access openings.

Aspect 140. The cable breakout assembly of aspect 137, further comprising a gasket disposed at the first axial end of the conduit body, the gasket being carried with the pass-through sleeve.

Aspect 141. The cable breakout assembly of aspect 140, wherein the gasket is an H-seal.

Aspect 142. The cable breakout assembly of aspect 137, wherein the optical plug connectors include single-fiber plug connectors.

Aspect 143. The cable breakout assembly of aspect 137, wherein the optical fibers are upjacketed between a terminated end of the cable jacket to the optical plug connectors.

What is claimed is:

1. A telecommunication enclosure comprising:
   a main housing including:
      a housing body having an open end;
      an end piece that detachably mounts to the housing body at the open end of the housing body for closing the open end of the housing body, the end piece defining at least one access port;
   a main housing gasket for sealing between the end piece and the housing body when the end piece is mounted at the open end of the housing body;
   a cable pass-through sleeve that detachably mounts to the end piece at a mounting location corresponding to the access port, the cable pass-through sleeve having a first end and an opposite second end, the first end of the cable pass-through sleeve being configured to detachably connect to the end piece at the mounting location, and the sleeve being positioned to surround the access port when connected to the end piece at the mounting location;
   an access port gasket that surrounds the access port for sealing between the first end of the cable pass-through sleeve and the end piece when the cable pass-through sleeve is mounted at the mounting location of the end piece; and
   a cable sealing gel block that mounts in the cable pass-through sleeve, the cable sealing gel block including first and second gel pressurization structures defining cable pass-through locations, a volume of gel positioned axially between the first and second gel pressurization structures, and an actuator for forcing the first and second gel pressurization structures axially toward one another to pressurize the volume of gel, wherein when the volume of gel of the cable sealing gel block is pressurized while the cable sealing gel block is installed in the cable pass-through sleeve, a circumferential exterior of the volume of gel provides circumferential sealing with respect to a circumferential interior of the cable pass-through sleeve and the volume of gel also conforms about and seals about cables routed through the cable sealing gel block.

2. The telecommunication enclosure of claim 1, wherein the actuator includes a trigger that is used to pressurize the volume of gel, wherein the trigger is accessible at the second end of the sleeve when the cable sealing gel block is installed in the cable pass-through sleeve.

3. The telecommunication enclosure of claim 1, wherein the cable sealing gel block loads into the cable pass-through sleeve through the first end of the cable pass-through sleeve, and wherein the second end of the cable pass-through sleeve includes a gel block retention lip for axially retaining the cable sealing gel block within the cable pass-through sleeve.

4. The telecommunication enclosure of claim 1, wherein the cable sealing gel block is too large to fit through the access port.

5. The telecommunication enclosure of claim 3, wherein the cable sealing gel block is required to be loaded into the cable pass-through sleeve before the cable pass-through sleeve is connected to the end piece, and wherein the cable pass-through sleeve is required to be detached from the end piece to remove the cable sealing gel block from the cable pass-through sleeve.

6. The telecommunication enclosure of claim 1, wherein the housing body is a dome having a closed end opposite the open end, and wherein the end piece is a base.

7. The telecommunication enclosure of claim 1, wherein the first end of the cable pass-through sleeve is connected to the end piece by fasteners.

8. The telecommunication enclosure of claim 7, wherein the access port defines a central port axis, wherein the fasteners include threaded studs that extend through the end piece and are individually sealed relative to the end piece, and wherein the threaded studs are circumferentially spaced about the central port axis.

9. The telecommunication enclosure of claim 8, wherein the cable pass-through sleeve includes outer radial projections at the first end of the cable pass-through sleeve, wherein the radial projections each define a stud receptacle for receiving one of the threaded studs, and wherein once the threaded studs have been received within the stud receptacles the first end of the cable pass-through sleeve can be clamped against an exterior side of the end piece by threading nuts on the threaded studs.

10. The telecommunication enclosure of claim 9, wherein the stud receptacles are open-sided receivers, and wherein the studs can be installed in the open-sided receivers by positioning the cable pass-through sleeve over the access port in co-axial alignment with the central port axis and then rotating the cable pass-through sleeve about the central port axis until the threaded studs are received within the open-sided receivers.

11. The telecommunication enclosure of claim 10, wherein the open-sided receivers are hooks.

12. The telecommunication enclosure of claim 7, wherein the fasteners are ground wire terminals, wherein the ground wire terminals each include a threaded stud having a first threaded end projecting inwardly from an interior side of the end piece, a second threaded end projecting outwardly from an exterior side of the end piece, and an intermediate flange that abuts the interior side of the end piece.

13. The telecommunication enclosure of claim 12, wherein each threaded stud is part of a connection assembly, each connection assembly including: a) one of the threaded studs; b) a first nut that threads on the first threaded end of the threaded stub for securing a terminal lug of an interior grounding wire to the threaded stud; c) a second nut that threads on the second threaded end of the threaded stud for securing a terminal lug of an exterior grounding wire to the threaded stud and for abutting the intermediate flange against the interior side of the end piece such that the threaded stud is secured to the end piece; and d) a third nut threaded on the second end of the threaded stud for securing the cable pass-through sleeve to the threaded stud.

14. A telecommunication enclosure comprising:
   a main housing including:
      a housing body having an open end;

an end piece that detachably mounts to the housing body at the open end of the housing body for closing the open end of the housing body, the end piece defining a first access port, a second access port, and a third access port;

a main housing gasket for sealing between the end piece and the housing body when the end piece is mounted at the open end of the housing body;

a cable pass-through sleeve that detachably mounts to the end piece at a mounting location corresponding to the access port, the cable pass-through sleeve having a first end and an opposite second end, the first end of the cable pass-through sleeve being configured to detachably connect to the end piece at the mounting location, and the sleeve being positioned to surround the access port when connected to the end piece at the mounting location;

a first access port gasket that surrounds the first access port for sealing between the first end of the cable pass-through sleeve and the end piece when the cable pass-through sleeve is mounted at the mounting location of the end piece, the second access port surrounded by another access port gasket and the third access port surrounded by a further access port gasket; and a cable sealing gel block that mounts in the cable pass-through sleeve, the cable sealing gel block including first and second gel pressurization structures defining cable pass-through locations, a volume of gel positioned axially between the first and second gel pressurization structures, and an actuator for forcing the first and second gel pressurization structures axially toward one another to pressurize the volume of gel, wherein when the volume of gel of the cable sealing gel block is pressurized while the cable sealing gel block is installed in the cable pass-through sleeve, a circumferential exterior of the volume of gel provides circumferential sealing with respect to a circumferential interior of the cable pass-through sleeve and the volume of gel also conforms about and seals about cables routed through the cable sealing gel block.

15. The telecommunication enclosure of claim 14, wherein the cable pass-through sleeve is a first cable pass-through sleeve that detachably mounts at the first access port and seals against the corresponding access port gasket, wherein a second cable pass-through sleeve detachably mounts at the second access port and seals against the corresponding access port gasket, and wherein a blank cover mounts at the third access port and seals against the corresponding access port gasket.

16. The telecommunication enclosure of claim 1, wherein the housing has a molded, plastic construction.

17. The telecommunication enclosure of claim 1, wherein the gaskets are ring style gaskets.

* * * * *